United States Patent [19]

Omi

[11] Patent Number: 4,837,614
[45] Date of Patent: Jun. 6, 1989

[54] COLOR IMAGE PROCESSING METHOD

[75] Inventor: Kyoji Omi, Kawasaki, Japan

[73] Assignee: Ricoh Company, Ltd., Japan

[21] Appl. No.: 87,261

[22] Filed: Aug. 18, 1987

[30] Foreign Application Priority Data

Aug. 20, 1986 [JP] Japan .................. 61-194712
Aug. 20, 1986 [JP] Japan .................. 61-194713

[51] Int. Cl.$^4$ ............................................. H04N 1/46
[52] U.S. Cl. .................................... 358/75; 358/44
[58] Field of Search .................. 358/75, 80, 44, 43, 358/41, 48

[56] References Cited

U.S. PATENT DOCUMENTS

| | | | |
|---|---|---|---|
| 4,193,092 | 3/1980 | Stoffel | 358/260 X |
| 4,246,601 | 1/1981 | Sato et al. | 358/48 X |
| 4,468,693 | 8/1984 | Fujita et al. | 358/75 X |
| 4,580,160 | 4/1986 | Ochi et al. | 358/48 |
| 4,591,900 | 5/1986 | Heeb et al. | 358/44 |
| 4,605,956 | 8/1986 | Cok | 358/44 |
| 4,620,222 | 10/1986 | Baba et al. | 358/44 X |
| 4,626,898 | 12/1986 | Baba et al. | 358/44 X |
| 4,641,183 | 2/1987 | Kinoshita | 358/48 X |
| 4,642,678 | 2/1987 | Cok | 358/43 X |
| 4,663,655 | 5/1987 | Freeman | 358/43 X |
| 4,672,433 | 6/1987 | Yamamoto et al. | 358/75 X |
| 4,712,141 | 12/1987 | Tomohisa et al. | 358/80 X |
| 4,716,455 | 12/1987 | Ozawa et al. | 358/44 |
| 4,734,759 | 3/1988 | Kobori et al. | 358/75 |

FOREIGN PATENT DOCUMENTS 0006715 1/1980 European Pat. Off. ........... 358/260

Primary Examiner—James J. Groody
Assistant Examiner—E. Anne Faris
Attorney, Agent, or Firm—Mason, Fenwick & Lawrence

[57] ABSTRACT

A color image processing method and system uses a color image sensor which includes a plurality of photoelectric elements arranged in the form of an array and a plurality of color-separating filters, each of which is provided for the corresponding one of the plurality of photoelectric elements. In the preferred embodiment, there are provided three different kinds (R, G and B) of color-separating filters and these three kinds of filters are arranged in a predetermined pattern in repetition. Each photoelectric element can obtain a color data from a pixel of interest opposite to the element and the color of the color data is determined by the color-separating filter provided for the element. In accordance with the present invention, outputs from at least two other photoelectric elements having another kind of color-separating filter and located on opposite sides of the photoelectric element opposite to the pixel of interest are processed in a predetermined manner to thereby obtain a second color data for the pixel of interest. In this manner, two or more additional color data for the same pixel of interest can be obtained, and using such a multiple of color data, a color balance distortion resulting from the particular structure of the image sensor can be corrected.

3 Claims, 48 Drawing Sheets

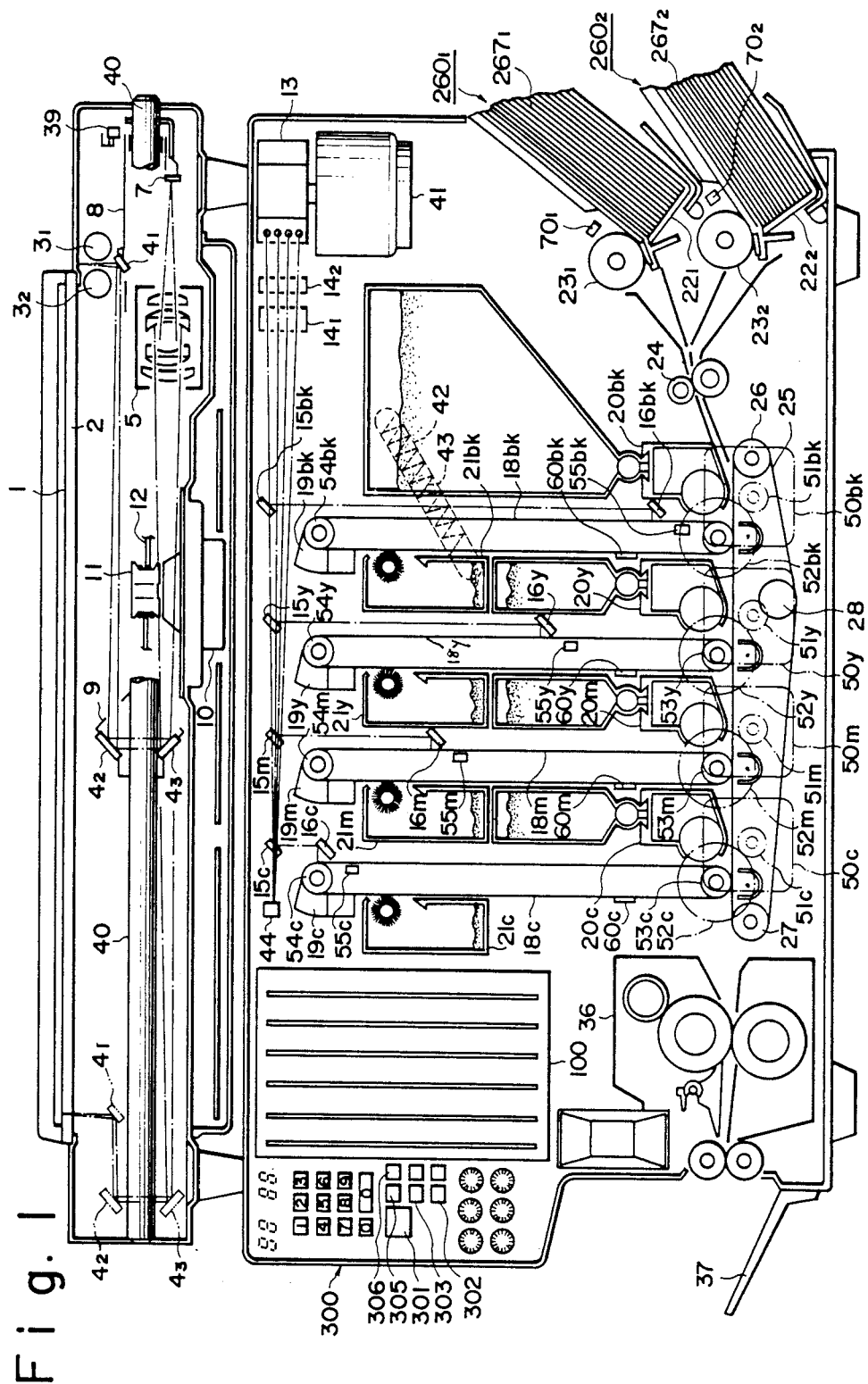

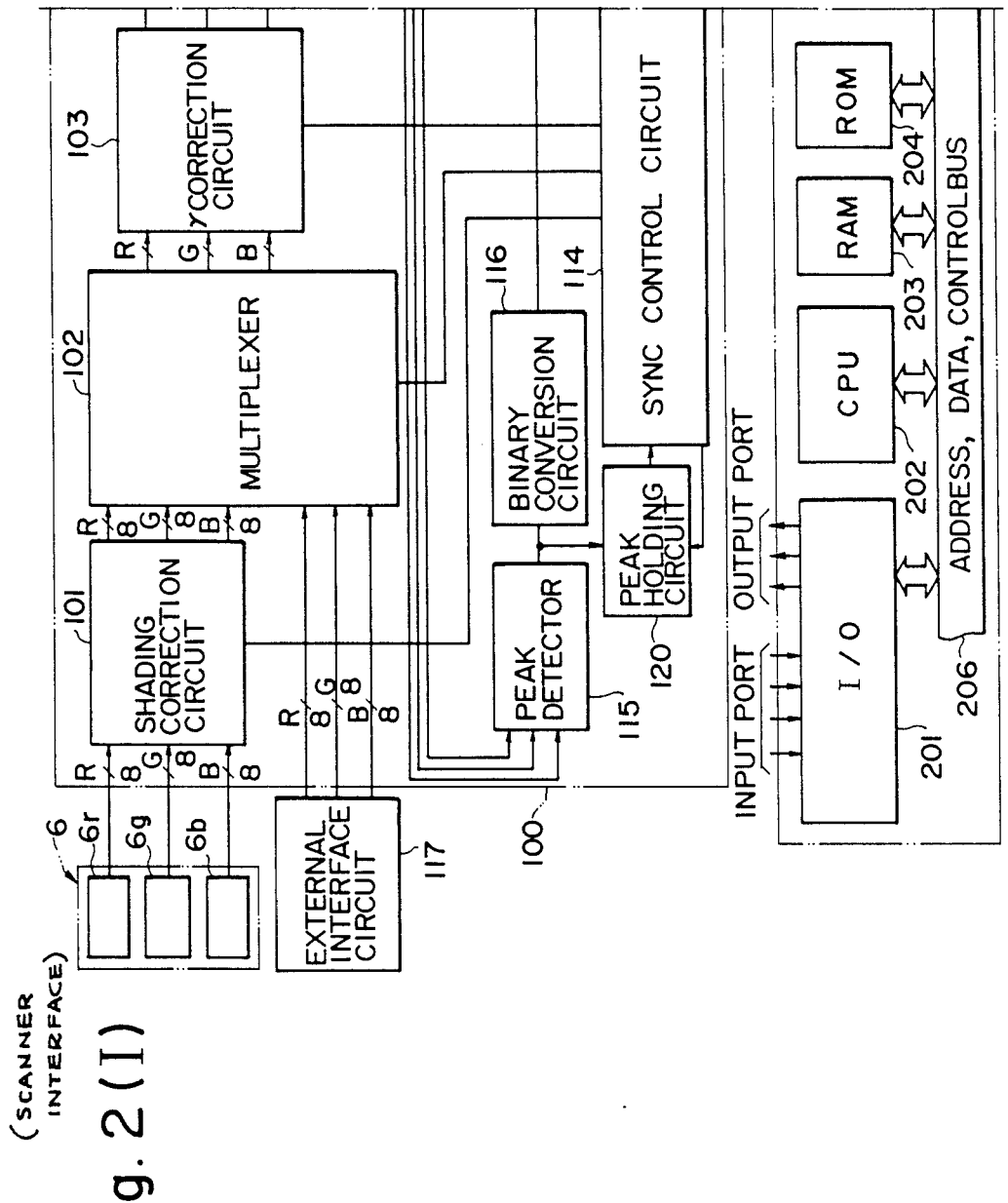

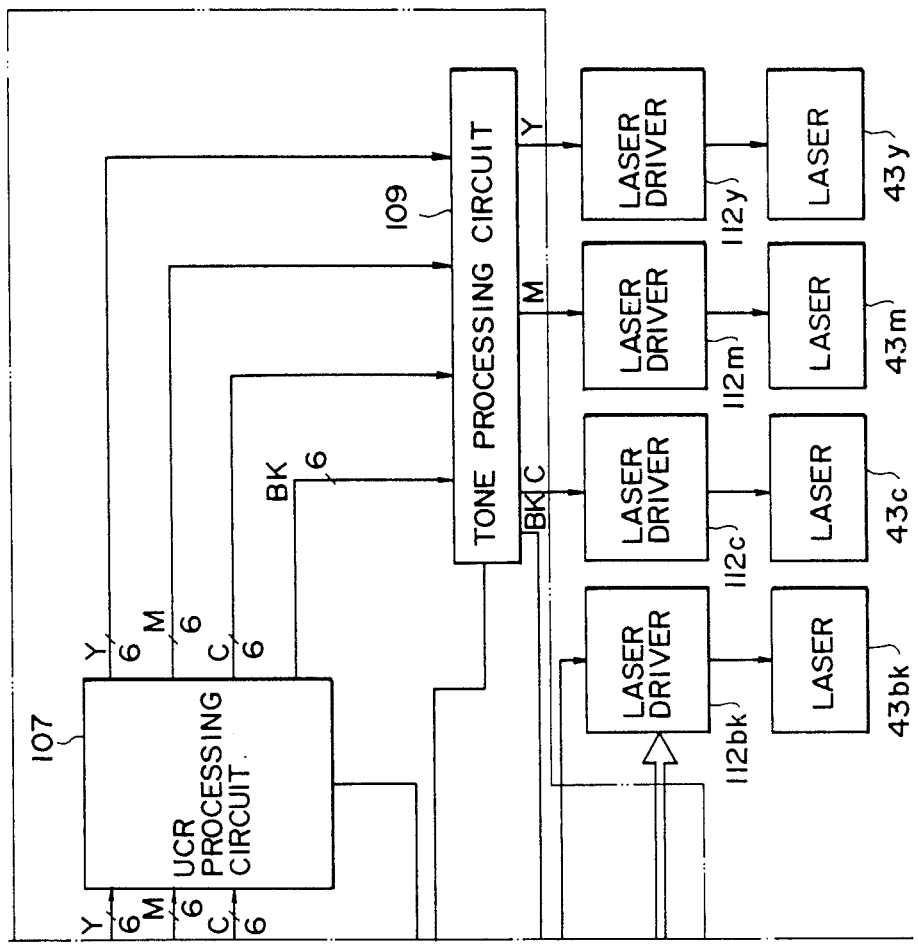

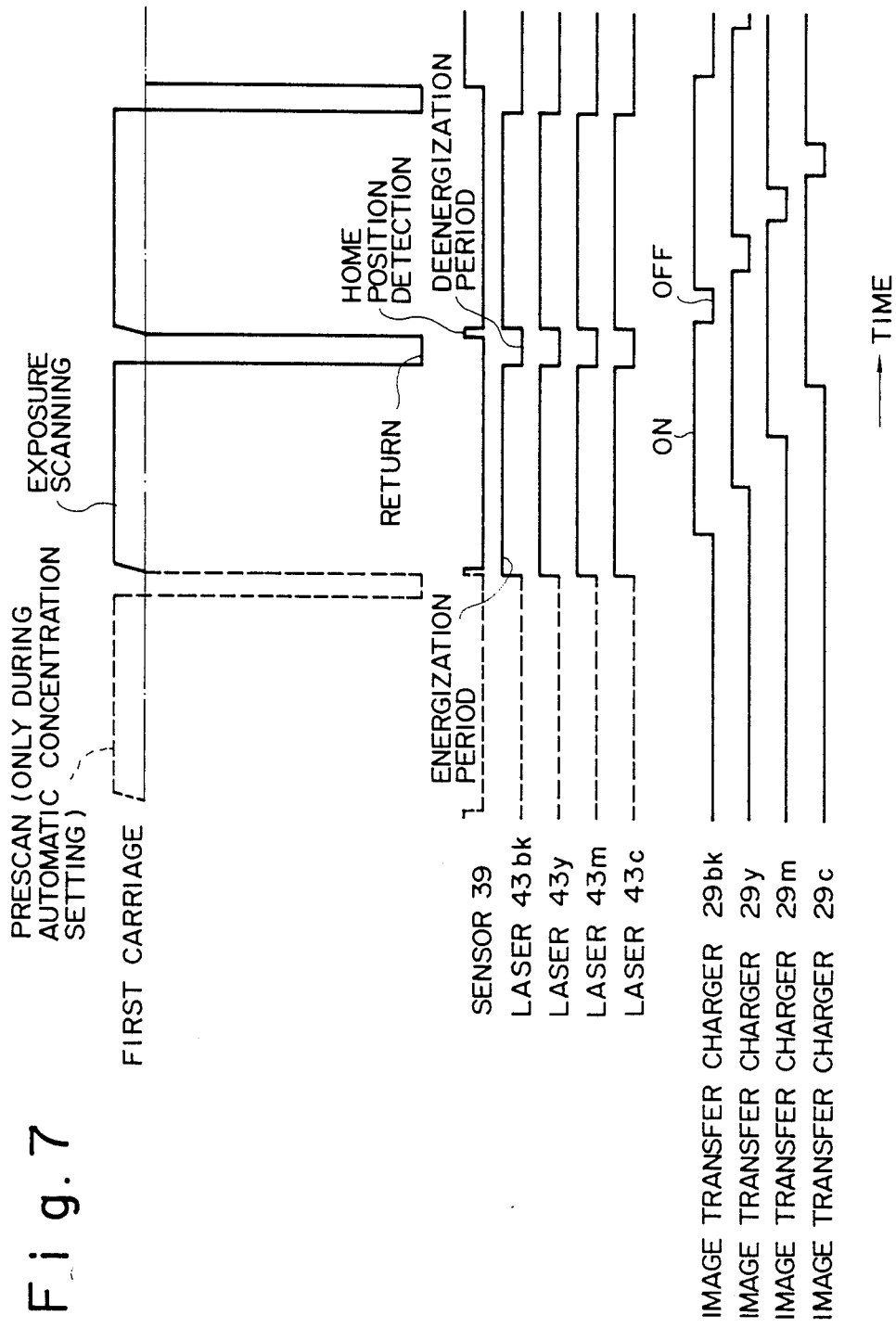

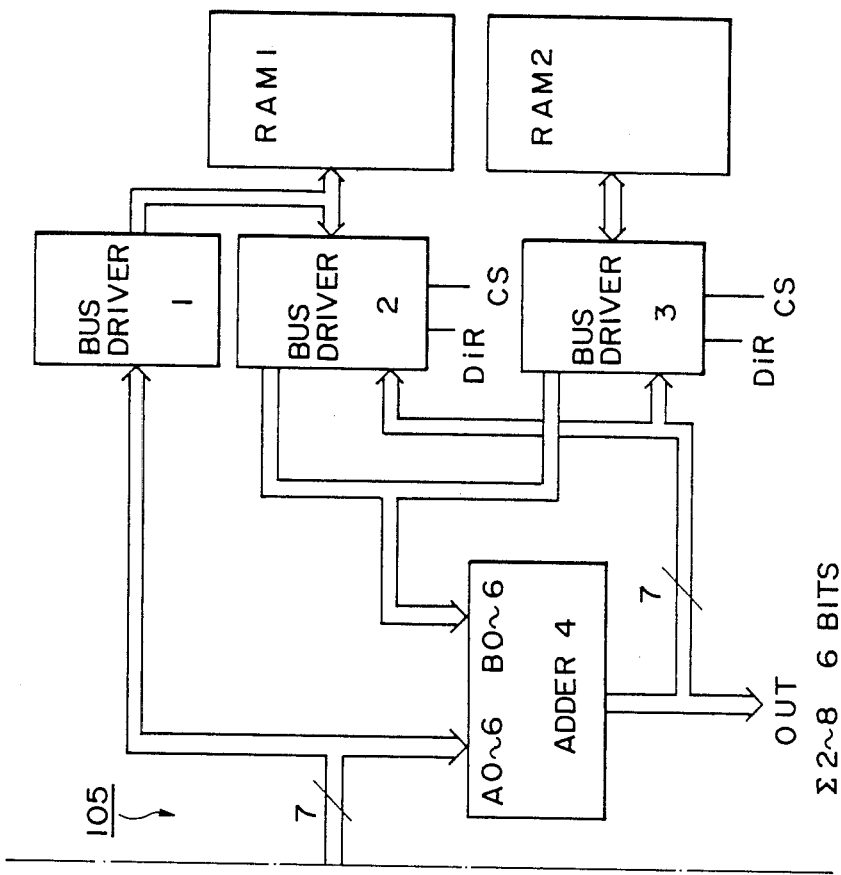
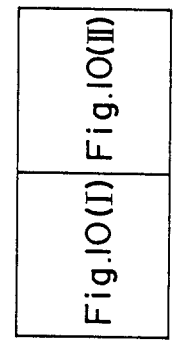
Fig.10(II)
Fig.10

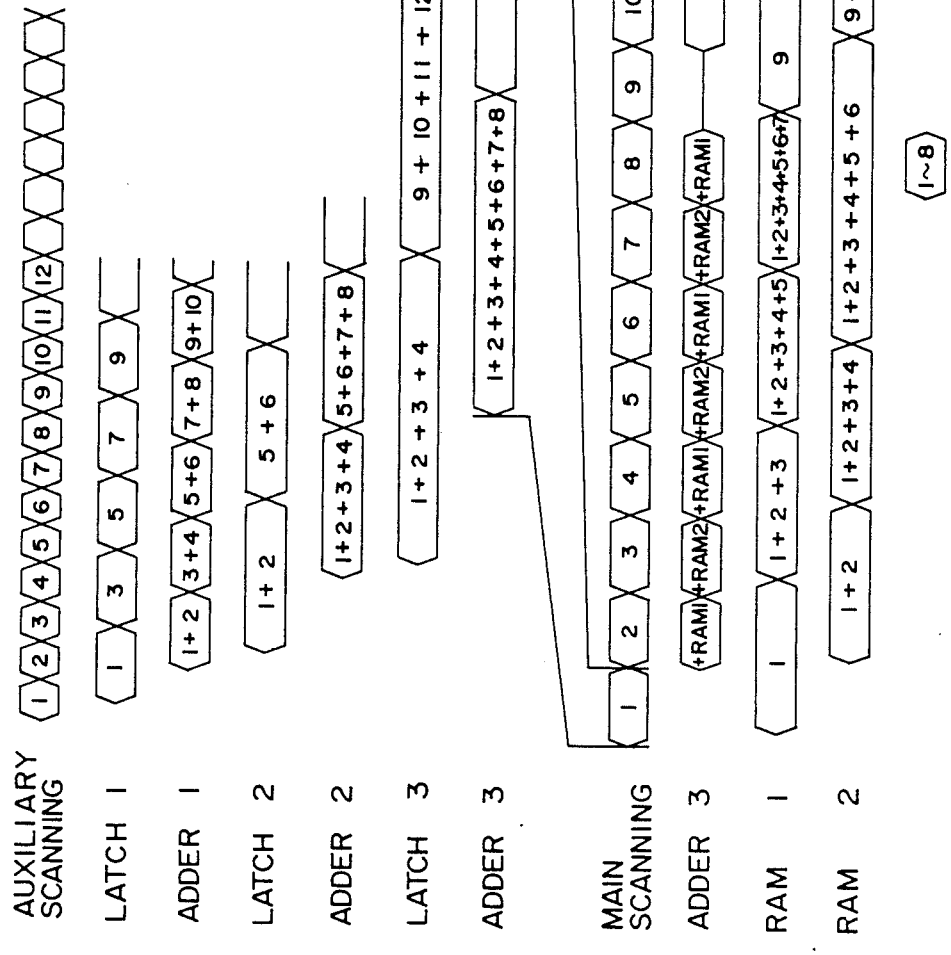

Fig.12a
Fig.12b
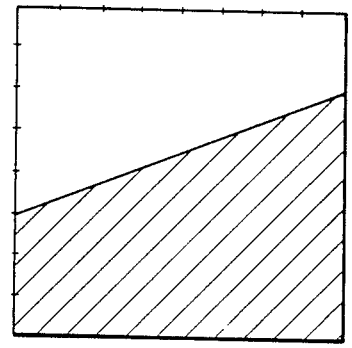
INPUT DATA: BLACK $3 \times 8 + \frac{1}{2} \times 3 \times 8 = 36$
Fig.12c
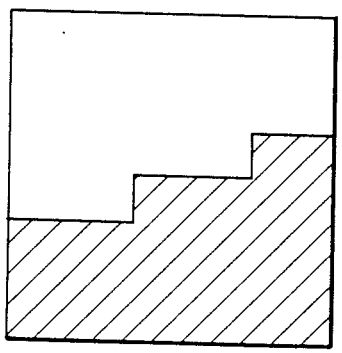
BLACK SEPARATION OUTPUT
Fig.12d
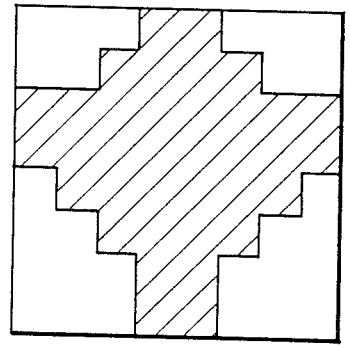
UCR DENSITY PATTERN OUTPUT OF METHOD(a)

OUTPUT OF METHOD(b)

OUTPUT OF METHOD(c)

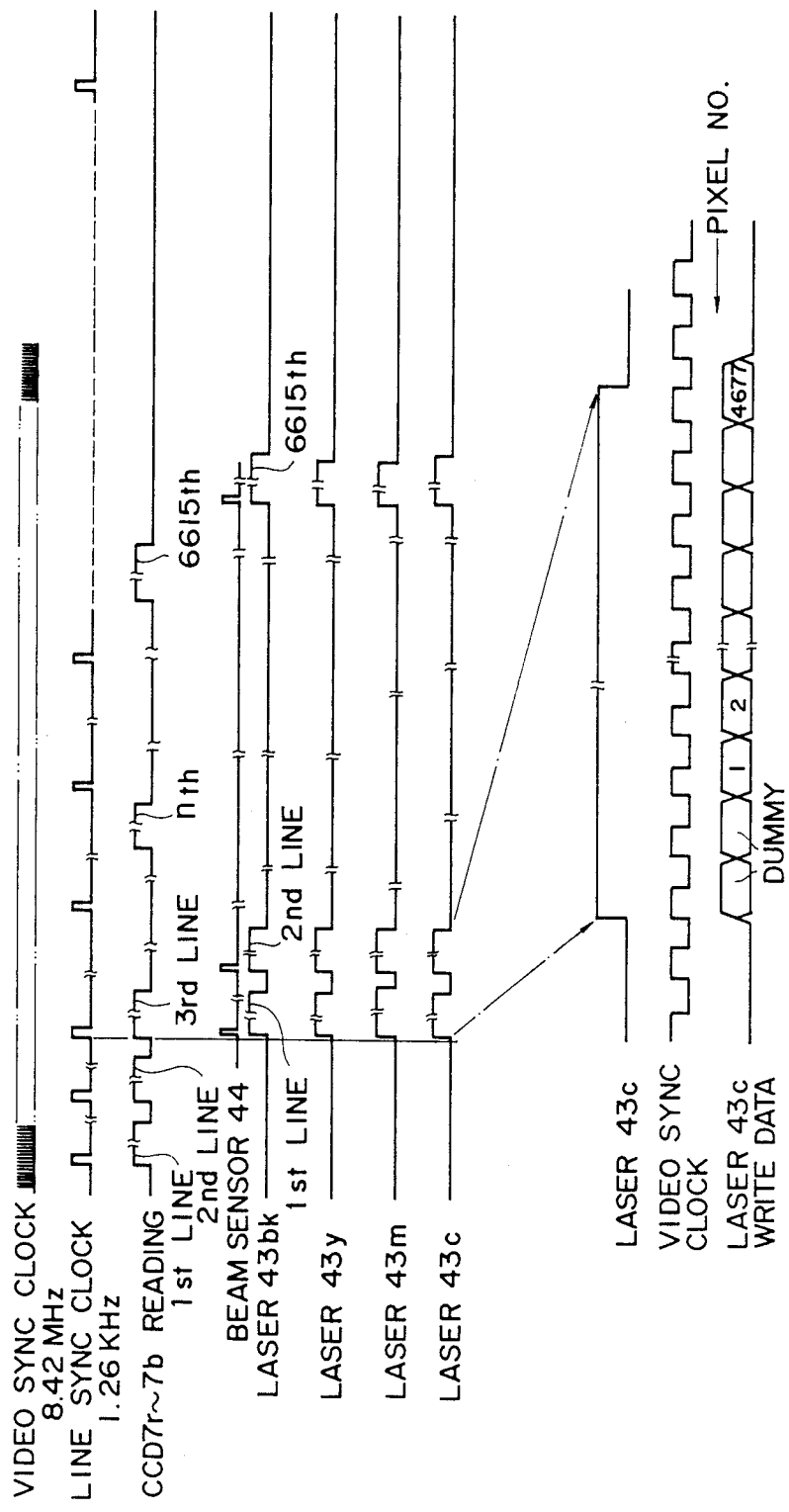

Fig. 17b(II)
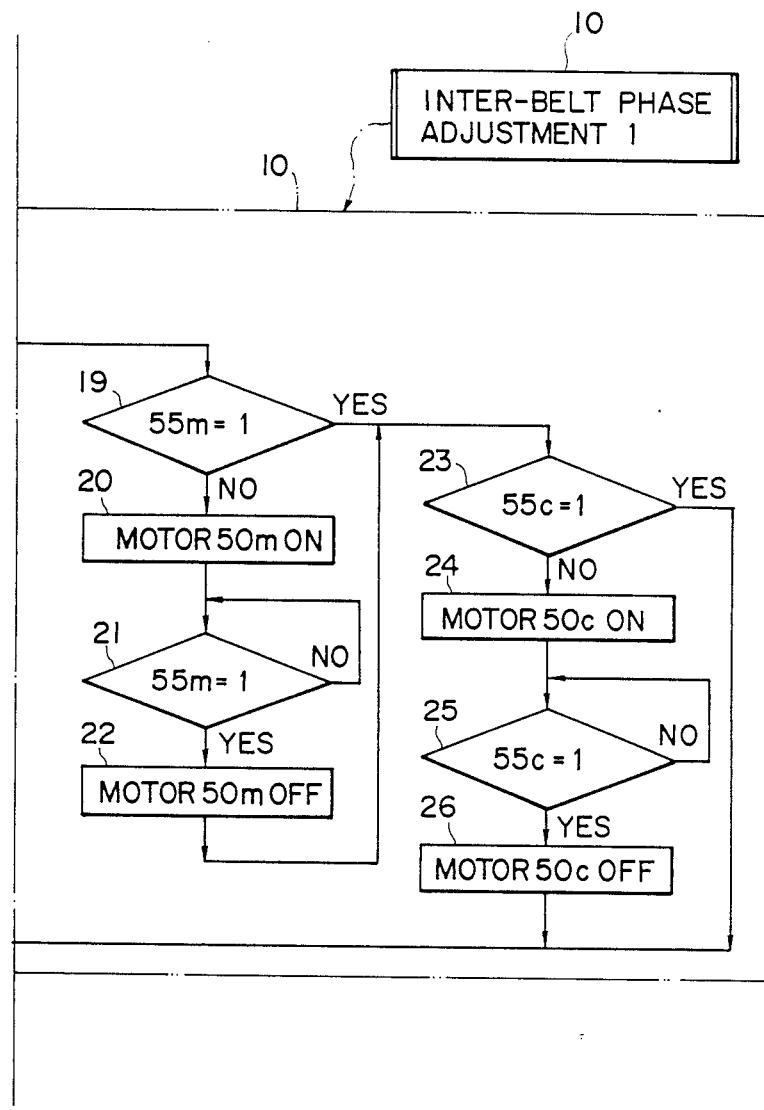
Fig.17b
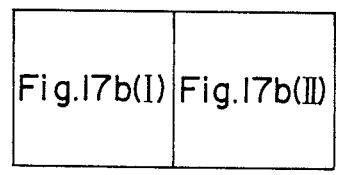

Fig. 17c(II)
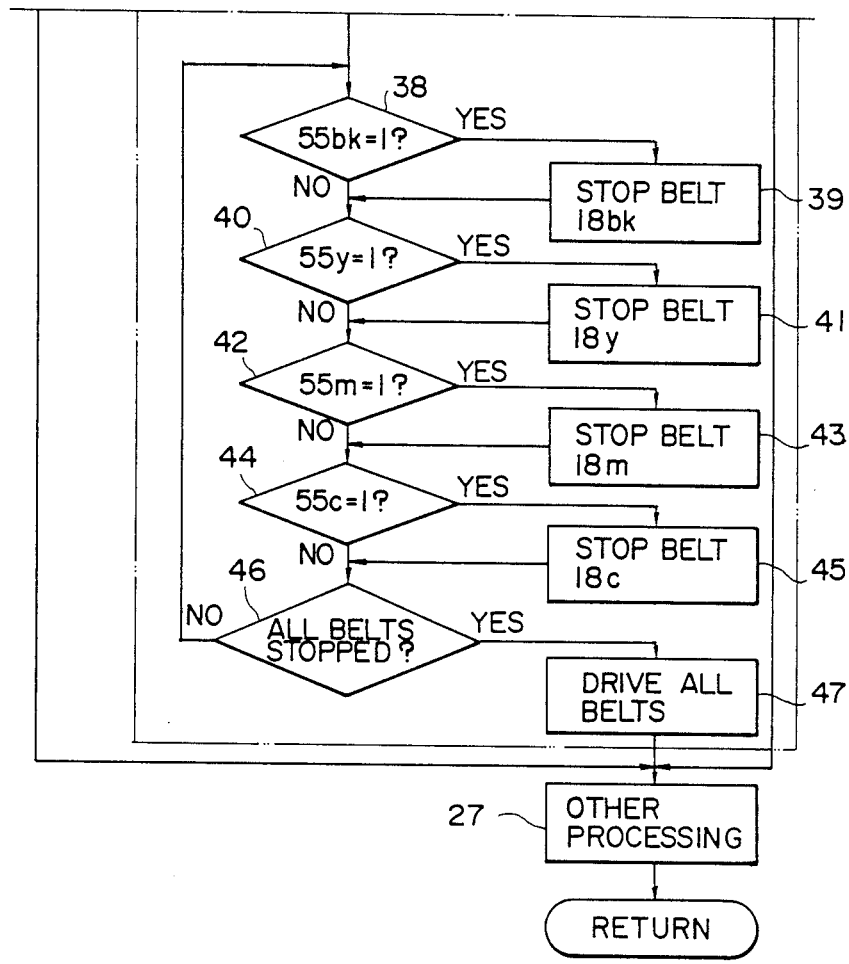

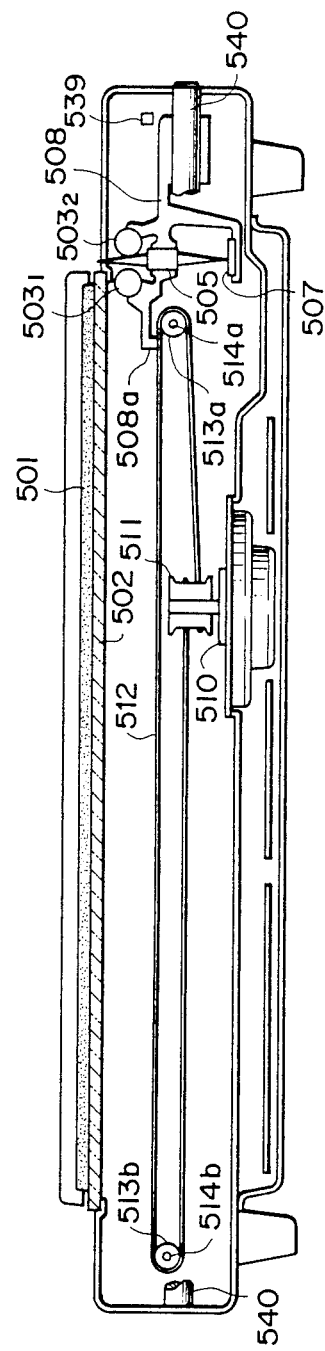

| Fig.19(I) | Fig.19(II) |

Fig. 22(I)
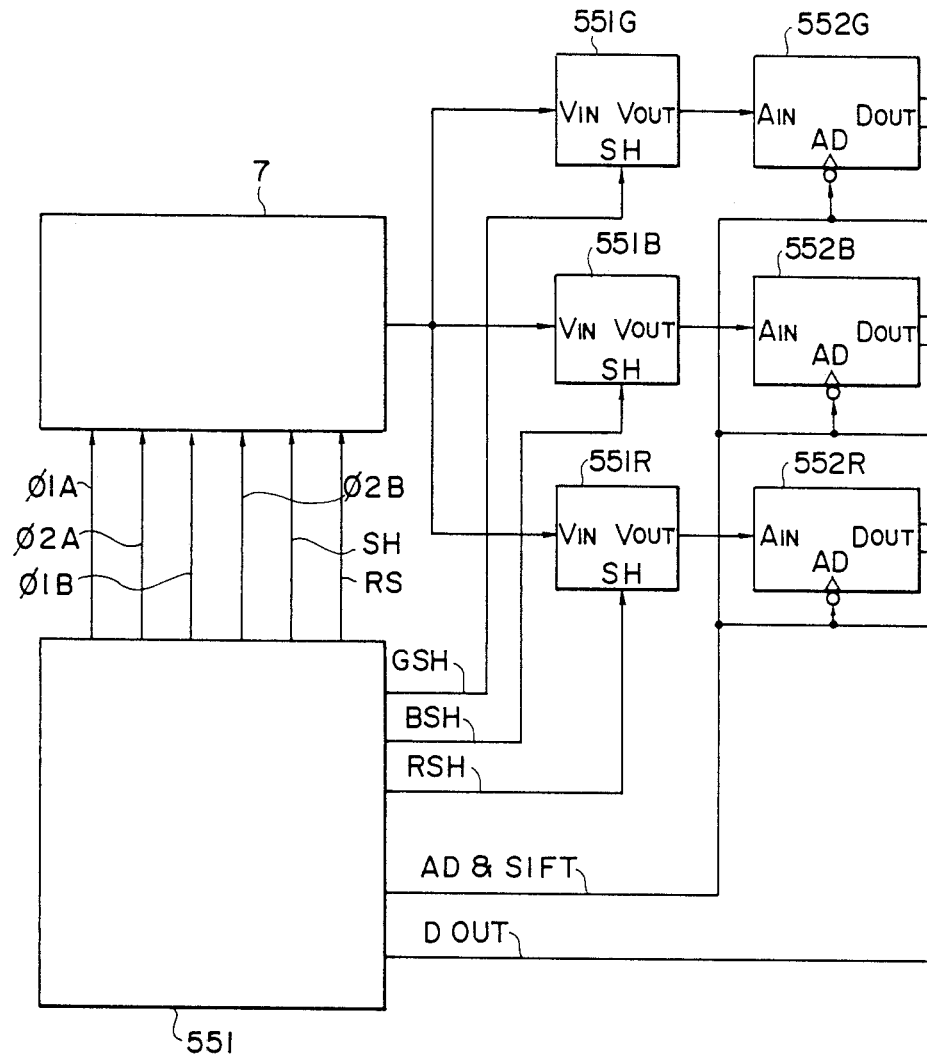
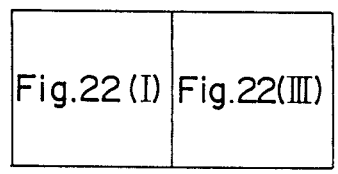
Fig.22
| Fig.22(I) | Fig.22(III) |

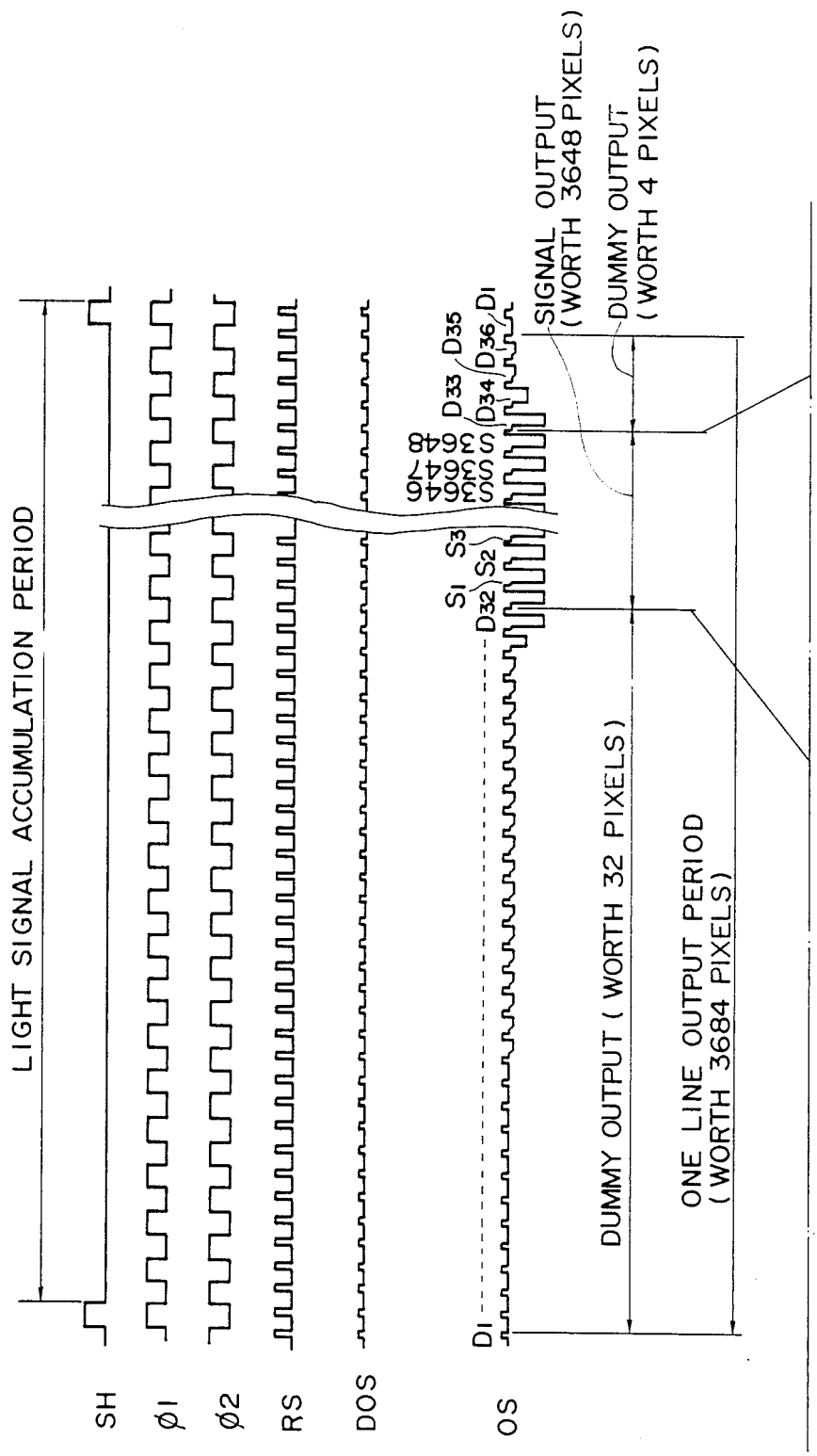

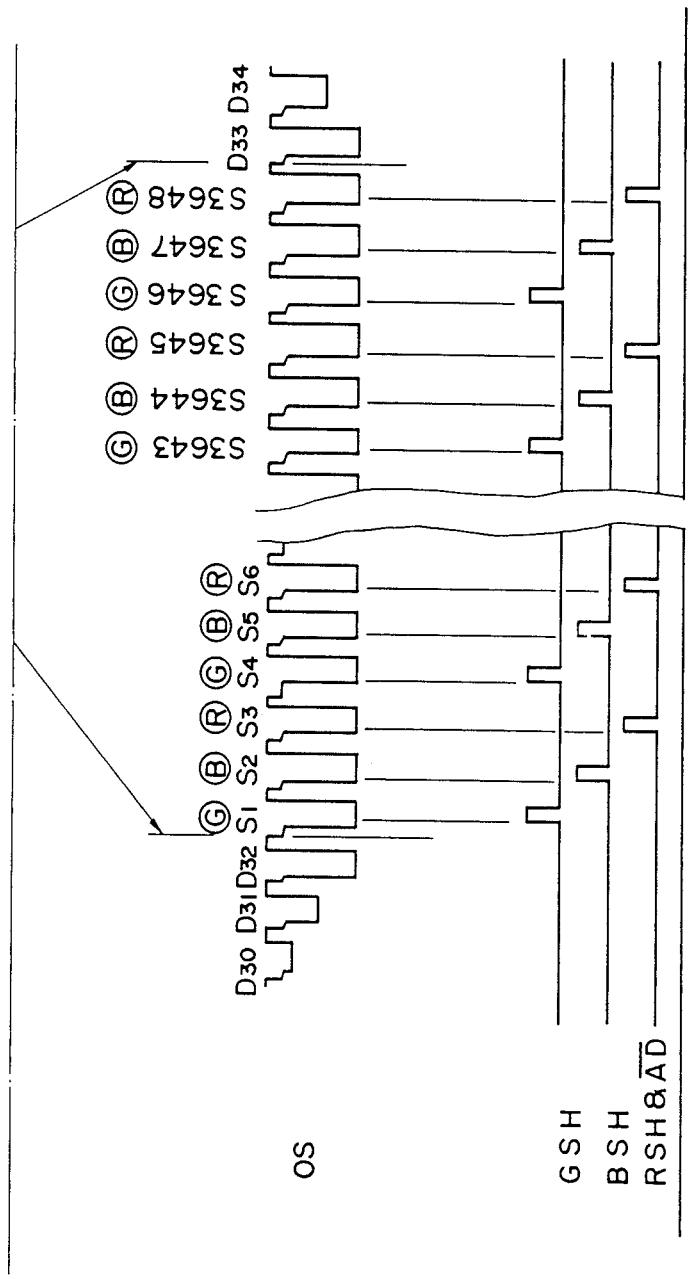
Fig. 23(II)
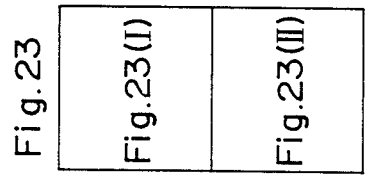

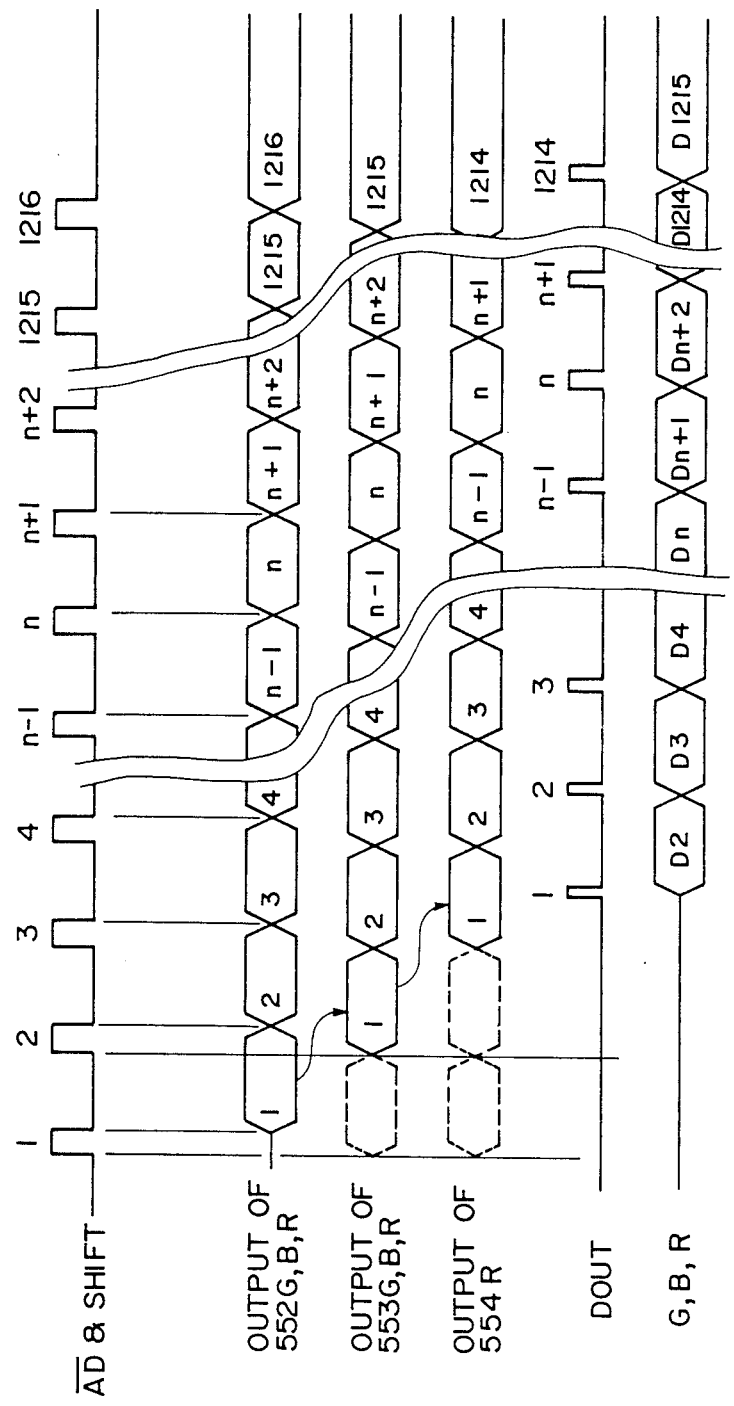

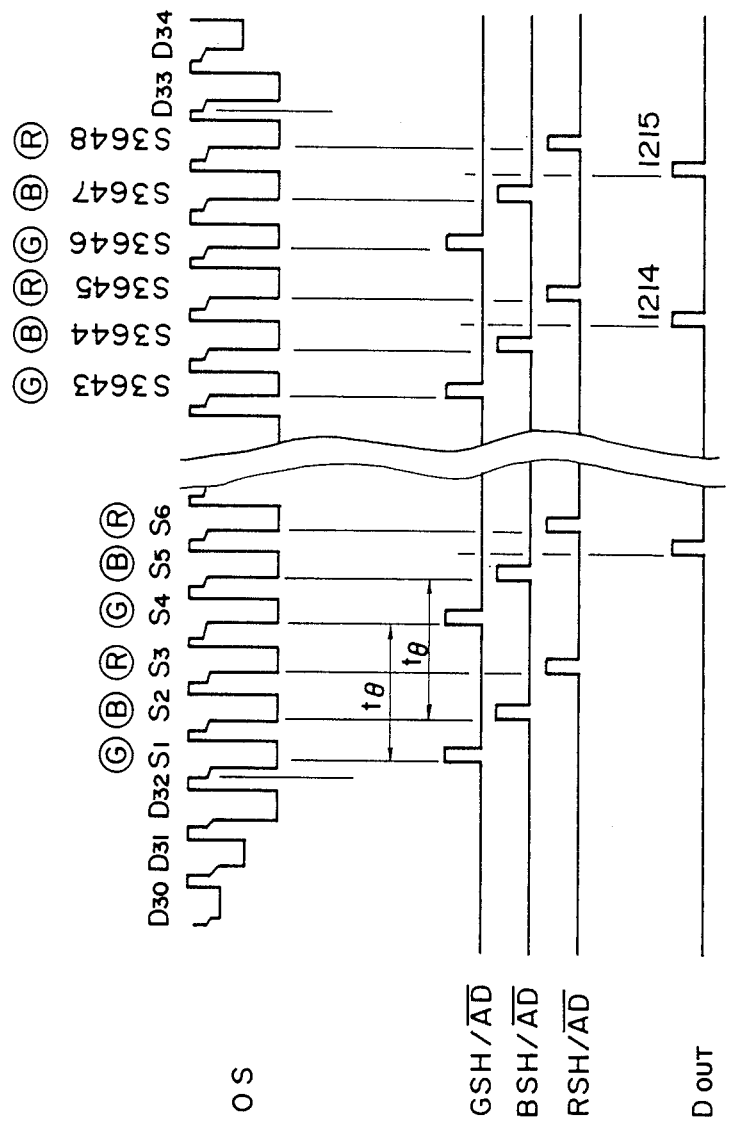

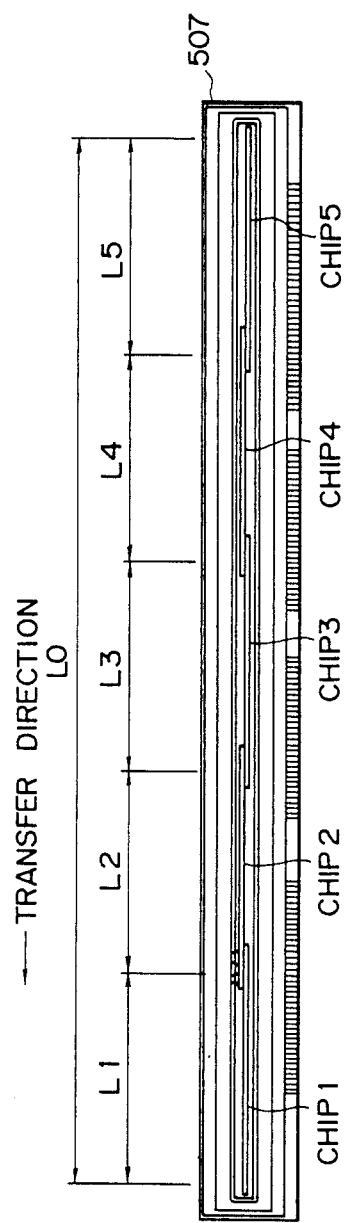

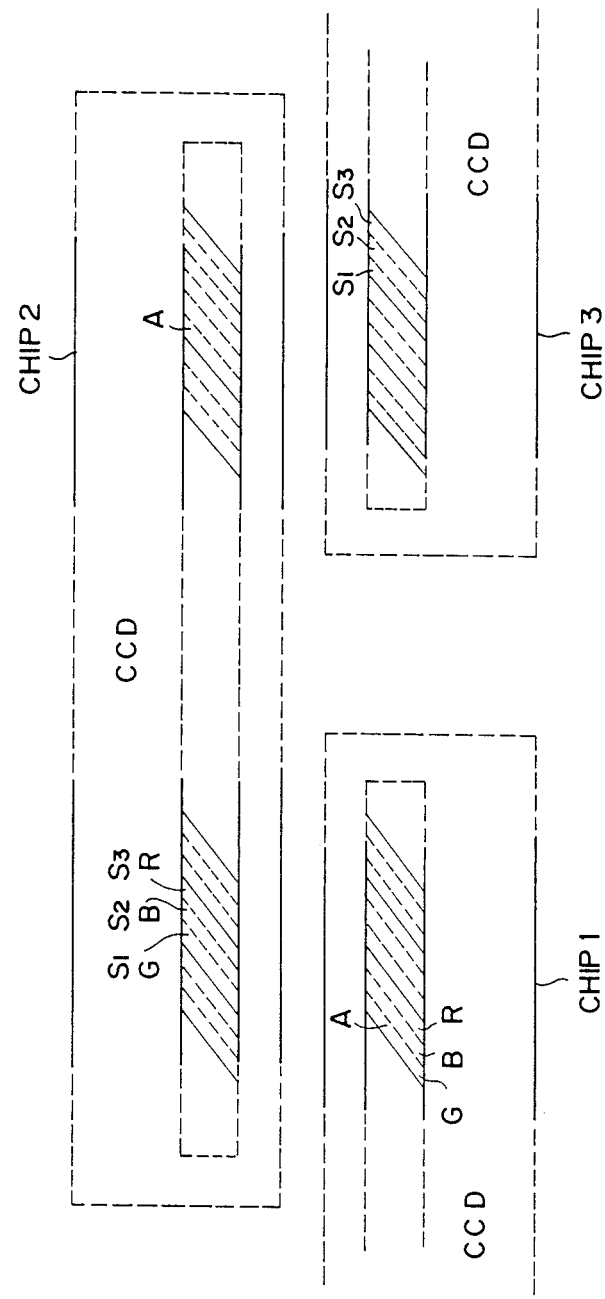

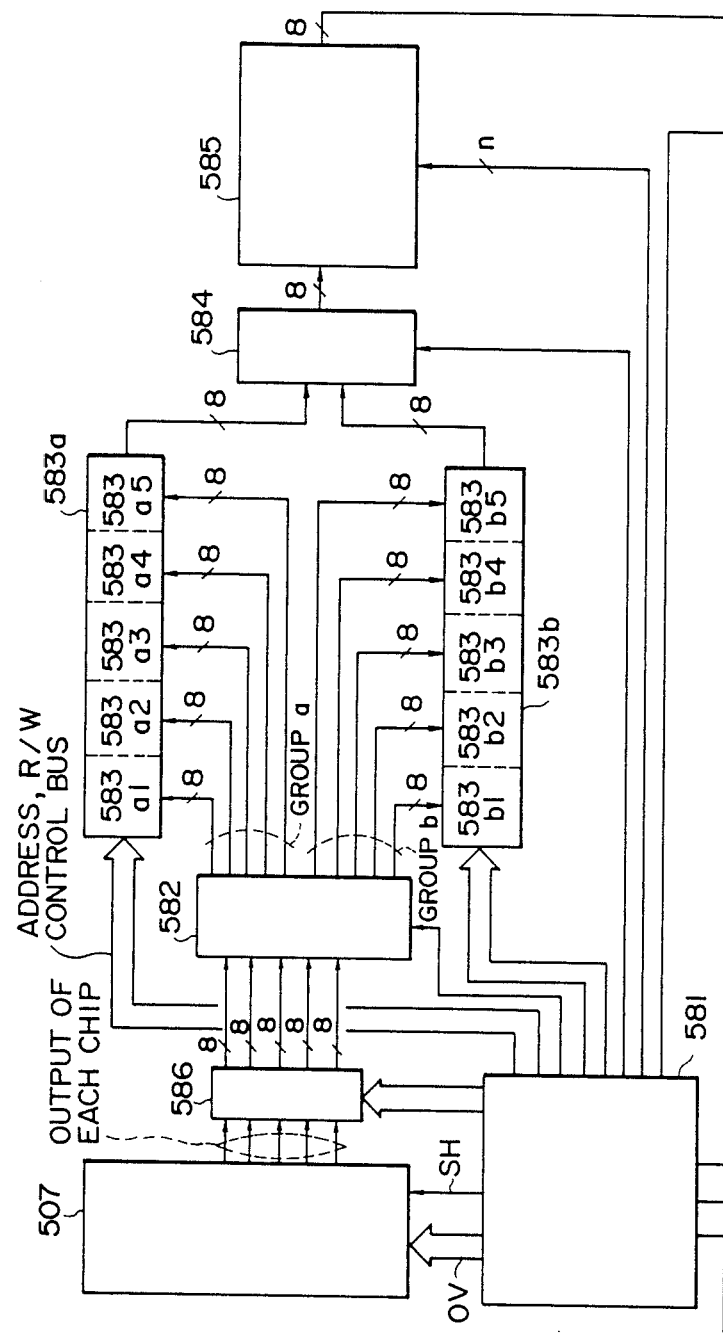
Fig. 31(I)
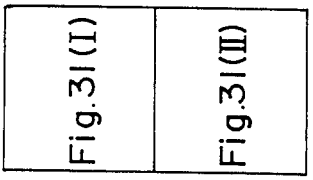

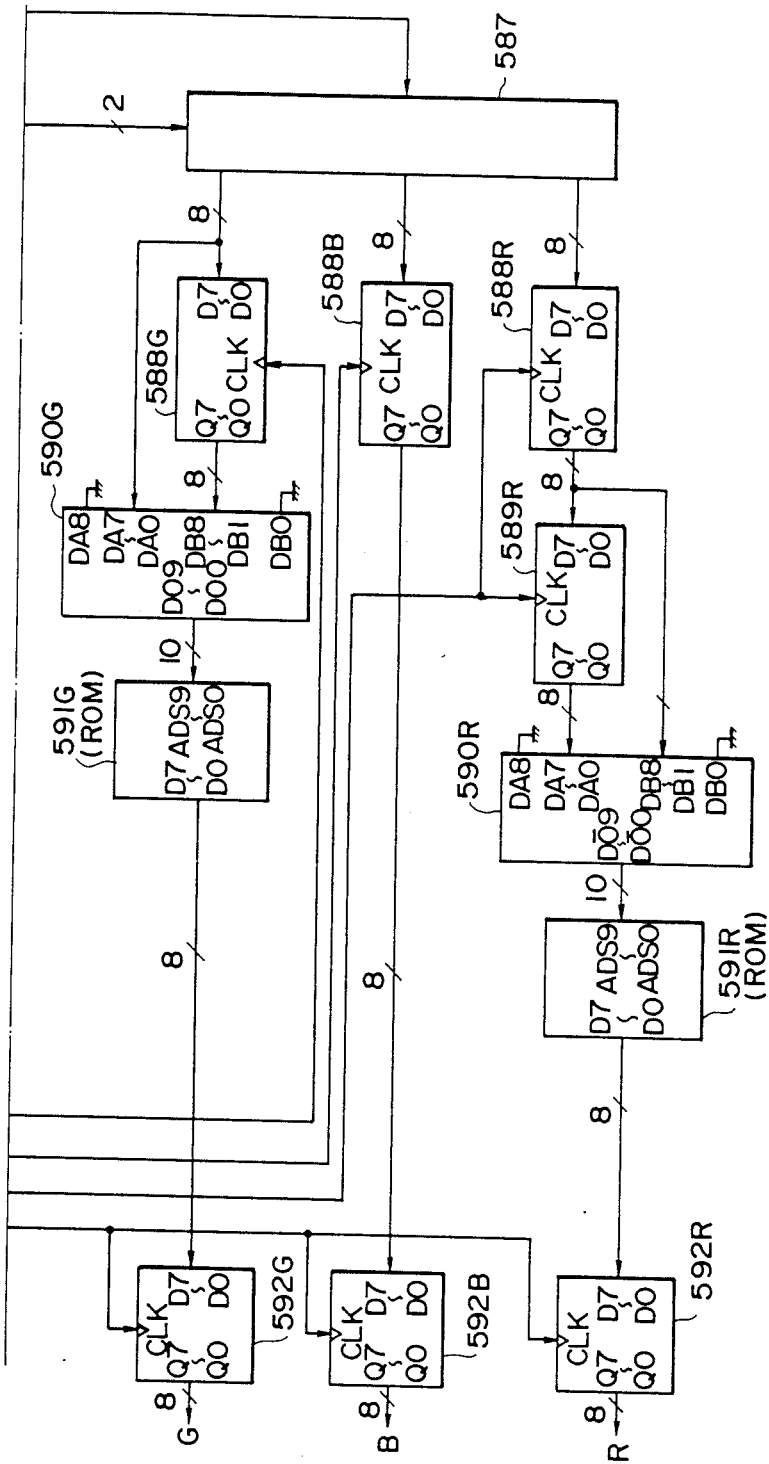
Fig. 31 (II)

COLOR IMAGE PROCESSING METHOD

BACKGROUND OF THE INVENTION

1. Field of the Invention

This invention generally relates to a method for processing a color image, and, in particular, to a color image processing method particularly suitable for application to an image sensor including an array of photoelectric elements each of which is provided with one of a predetermined number of color-separating filters.

2. Description of the Prior Art

Japanese Patent Laid-open Pub. No. 60-187180, which is hereby incorporated by reference, discloses a color image processing method, according to which, use is made of a dichroic prism and an image is focused on three CCDs to obtain a color signal. However, according to this method, it is difficult to completely eliminate a color abberation of an image forming optical system. Besides, a point on an original image is not focused exactly on the corresponding position of each of the three CCDs. As a result, the color balance of an image signal thus obtained is somewhat distorted. In addition, the positional adjustment of each of the three CCDs is extremely difficult, and there are also other disadvantages, such as a large number of parts and high cost.

On the other hand, according to the teachings of Japanese Patent Laid-open Pub. No. 61-61561, which is also hereby incorporated by reference, three filters for red, green and blue colors are provided in a predetermined arrangement for an array of photoelectric elements. With this structure, disadvantages of difficulty in positional adjustments and cost for parts may be obviated; however, since the red, green and blue filters are shifted in position from one another, the data at the same point of an original cannot be read by these photoelectric elements at the same time, so that there is a disadvantage of incapability to carry out "color correction processing" and "undercolor removal (UCR) processing", which are prerequisites for a digital color copier.

SUMMARY OF THE INVENTION

In accordance with the present invention, there is provided a color image processing method particularly suitable for use with a color image sensor including a plurality of photoelectric elements arranged in the form of an array and each provided with one of a predetermined number of different color-separating filters. In the preferred embodiment, use is made of an image sensor which includes a plurality of photoelectric elements arranged in the form of an array and an array of color-separating filters each of which is provided to corresponding one of the plurality of photoelectric elements. The array of color-separating filters includes at least two different filters, each for a respective different color, and these different filters are arranged in a predetermined pattern repetitively to define the filter array. In one example, the plurality of photoelectric elements arranged in the form of a single array and one of three different color-separating filters is provided for corresponding one of the plurality of photoelectric elements such that a predetermined arrangement of these three color-separating filters is repeated along the single array. Thus, an image sensor for use with the present invention includes a plurality of photoelectric elements arranged in the form of an array, each of which has a color-separating filter for a particular color. Thus, if the image sensor has three different kinds of color-separating filter for three different colors, one photoelectric element can optically read a particular color component of the image data at a particular point of an original image, and the other two color components of the same image data cannot be read.

In accordance with the principle of the present invention, there is provided a method to produce a color signal for a color component of an image data at a particular point of an original image, which is different from the color component of the color-separating filter of a photoelectric element reading the image data at the particular point. That is, there are provided at least two different kinds of filters for first and second colors, a first photoelectric element having a first filter for separating a first color can produce a first color signal for the first color component of an image data at a particular point (pixel) of an original image. In accordance with the principle of the present invention, at least a second color signal is produced for that pixel by using at least two second photoelectric elements which have, each, a second filter for a second color and which are located on opposite sides of said first photoelectric element with respect to a direction of line scanning across the original image.

In this manner, in accordance with the principle of the present invention, a first color signal for a first color of a first pixel on an original image is produced by optically reading the first pixel by using a first photoelectric element provided with a first color-separating filter, and a second color signal for the same first pixel is produced by using two or more second photoelectric elements, each provided with a second color-separating filter, located on opposite sides of the first photoelectric element. These second photoelectric elements do not directly read the first pixel, but they optically read pixels adjacent to or in the vicinity of the first pixel. And, the information obtained by these second photoelectric elements are processed or calculated in a predetermined manner to infer the second color signal for the first pixel. A similar procedure is applicable to a third or any other color components of the first pixel to produce more color signals for more color components.

It is therefore a primary object of the present invention to obviate the disadvantages of the prior art as described above and to provide an improved color image processing method.

Another object of the present invention is to provide an improved color image processing method particularly suitable for use with an image sensor including a plurality of photoelectric elements arranged in the form of an array and each provided with one of a predetermined number of kinds of color-separating filters.

A further object of the present invention is to provide an improved color image processing method which allows to obtain two or more color signals for different color components of the same pixel.

A still further object of the present invention is to provide a color image processing system capable of processing a color image at high accuracy and fidelity.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration showing a color image processing apparatus constructed in accordance with one embodiment of the present invention;

FIGS. 2(I) through 2(III), when combined as illustrated in FIG. 2, define a block diagram showing the overall structure of an electrical aspect of the color image processing apparatus of FIG. 1;

FIG. 7 is a timing chart illustrating a relative relation among the timings of scanning of an original image, energization of a recording operation and energization of an image transferring operation;

FIG. 10 is an illustration showing how to combine FIGS. 10(I) and 10(II);

FIGS. 10(I) and 10(II), when combined as illustrated in FIG. 10, define a block diagram showing the detailed structure of an averaging/data compression circuit 105 shown in FIG. 2;

FIG. 11 is a timing chart showing a sequence of data processing at the averaging/data compression circuit 105;

FIG. 12a is an illustration showing a distribution of threshold level data stored in a tone processing circuit 109 for forming an image density pattern;

FIG. 12b is an illustration showing an image distribution in an 8×8 dot matrix region on an original image;

FIG. 12c is an illustration showing a BK output from the complementary color generating/black separating circuit 104 as developed on a plane;

FIG. 12d is an illustration showing a BK density pattern output from the tone processing circuit 109 as developed on a plane;

FIG. 16 is a timing chart showing a relationship between a scanning operation and a recording operation of the image processing apparatus of FIG. 1;

FIGS. 17b(I) and 17b(II), when combined as shown in FIG. 17b, define a flow chart showing somewhat in detail an example of a phase difference adjusting process among photosensitive belts, which is carried out as part of the standby processing operation;

FIGS. 17c(I) and 17c(II), when combined as shown in FIGS. 17c, define a flow chart showing somewhat in detail another example of a phase difference adjusting process among photosensitive belts, which is carried out as part of the standby processing operation;

FIG. 18 is a schematic illustration showing an image processing apparatus constructed in accordance with another embodiment of the present invention;

FIGS. 19(I) and 19(II), when combined as shown in FIG. 19, define an image sensor 7 suitable for use in the image processing apparatus shown in FIG. 1 or 18;

FIGS. 21a through 21d are schematic illustrations useful for understanding the principle of operation of the present method;

FIGS. 22(I) and 22(II), when combined as shown in FIG. 22, define a block diagram showing one example of hardware which can implement the algorithm indicated in FIGS. 21a through 21d;

FIG. 23 is an illustration showing how to combine FIGS. 23(I) and 23(II);

FIGS. 23(I) and 23(II), when combined as shown in FIG. 23, define a timing chart illustrating timings of several signals to be applied to the color image sensor 7;

FIG. 24 is a timing chart which is useful for understanding the operation of the circuit shown in FIG. 22;

FIGS. 25(I) and 25(II), when combined as shown in FIG. 25, define a schematic illustration showing a further embodiment of the present invention;

FIG. 26 is a timing chart which is useful for understanding the operation of the structure shown in FIGS. 25(I) and 25(II);

FIGS. 27a through 27c and FIG. 28 are schematic illustrations showing the detailed structure of a color image sensor of the unit magnification type suitable for use in the present invention;

FIGS. 29(I) and 29(II), when combined as shown in FIG. 29, define a schematic illustration showing a still further embodiment of the present invention;

FIGS. 30(I) and 30(II), when combined as shown in FIG. 30, define a timing chart which is useful for understanding the operation of the structure shown in FIGS. 29(I) and 29(II);

FIG. 31 is an illustration showing how to combine FIGS. 31(I) and 31(II);

FIGS. 31(I) and 31(II), when combined as shown in FIG. 31, define a schematic illustration showing the detailed structure of a memory section;

DESCRIPTION OF THE PREFERRED EMBODIMENTS

Figure 2:
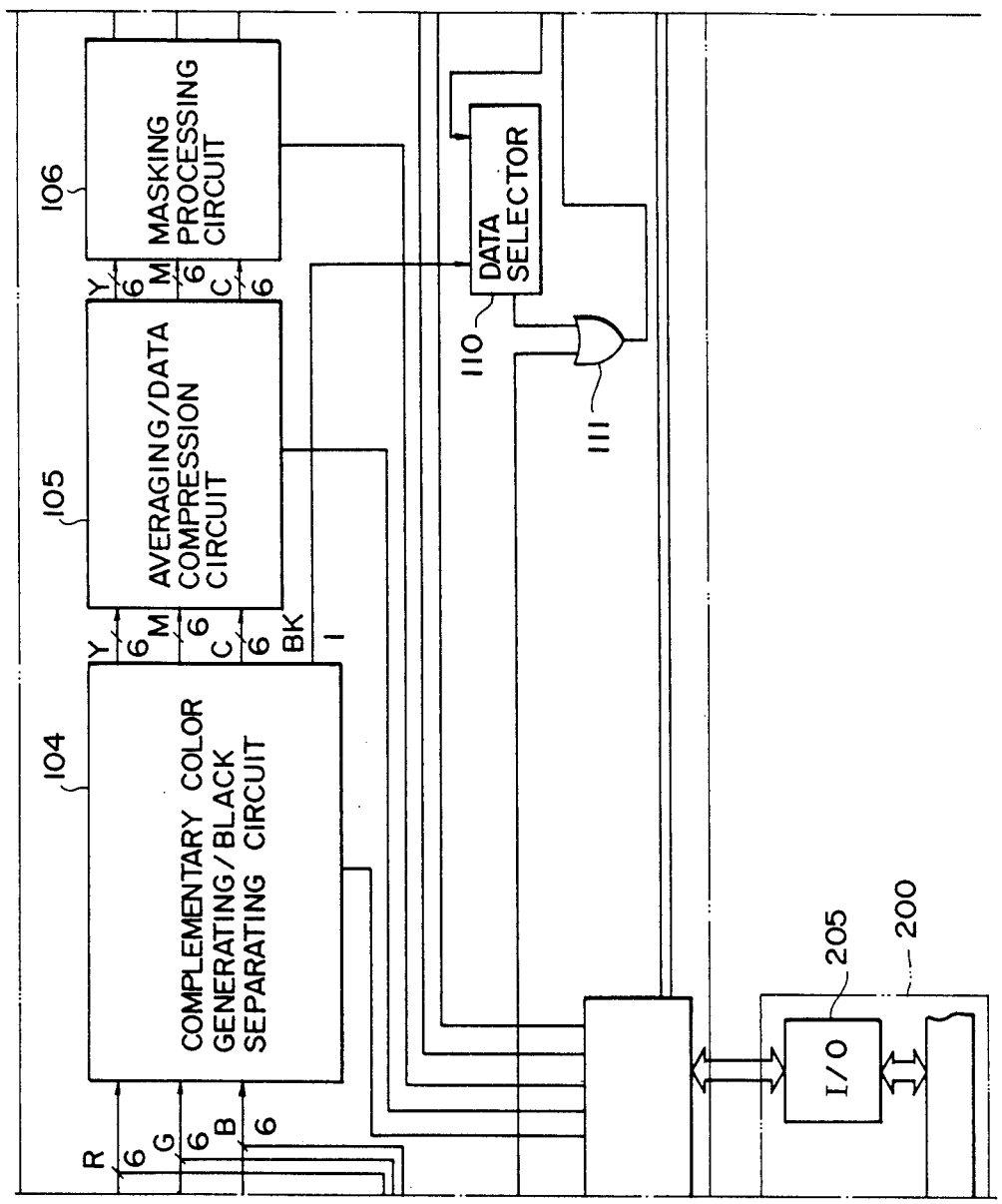
FIG. 2 is an illustration showing how to combine FIGS. 2(I) through 2(III)

Referring now to FIG. 1, there is schematically shown an image processing apparatus constructed in accordance with one embodiment of the present invention and FIGS. 2(I) through 2(III), when combined as indicated in FIG. 2, show a control system incorporated in the apparatus shown in FIG. 1. As shown in FIG. 1, an original 1 is placed on a platen or contact glass plate 2 and illuminated by fluorescent lamps $3_1$ and $3_2$. And, the reflecting light from the original 1 is reflected by movable first, second and third mirrors, $4_1$, $4_2$ and $4_3$, respectively, and focused onto a CCD device (image sensor) 7 through an image forming lens 5.

The fluorescent lamps $3_1$ and $3_2$ and the first mirror $4_1$ are mounted on a first carriage 8; on the other hand, the second and third mirrors $4_2$ and $4_3$, respectively, are mounted on a second carriage 9. The second carriage 9 moves at a speed half of the speed of the first carriage 8, so that the optical path length from the original 1 to the CCD 7 is maintained at constant. And, the first and second carriages 8 and 9, respectively, move from right to left in FIG. 1 during reading the original 1. A carriage drive wire 12 wound around a carriage drive pulley 11 fixedly attached to a shaft of a carriage drive motor 10 is coupled to the first carriage 8, and the wire 12 is passed around a running block (not shown) which is mounted on the second carriage 9. With this structure, when the motor 10 is driven to rotate in either normal or reversed direction, the first and second carriages 8 and 9, respectively, are moved in the forward direction (scanning for optically reading the original 1) or in the backward direction (return motion), whereby the second carriage 9 moves at a speed half of the speed of the first carriage 8.

Figure 3:
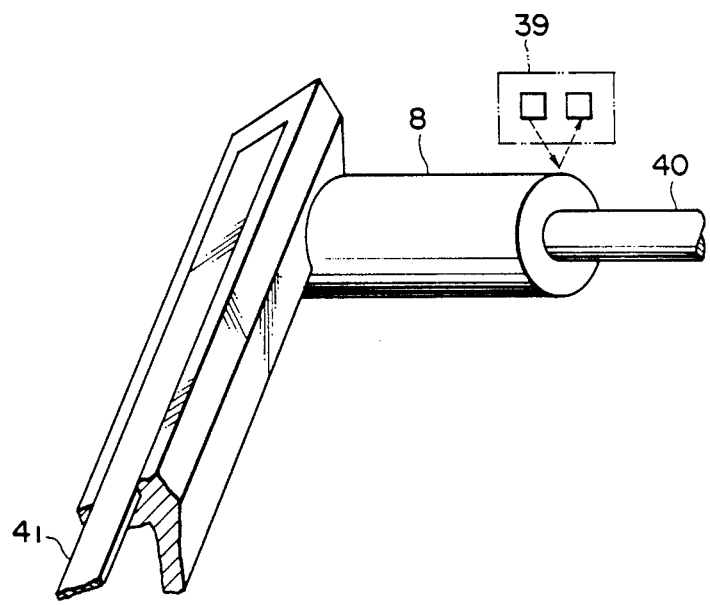
FIG. 3 is a schematic illustration showing, on an enlarged scale, part of a first carriage 8 provided in the apparatus of FIG. 1.

When the first carriage 8 is located at its home position indicated in FIG. 1, the first carriage 8 is detected by a home position sensor 39, which is preferably comprised of a reflecting type photosensor. Such a mode of detection is illustrated in FIG. 3. When the first carriage 8 has been moved out of the home position for scanning operation, the sensor 39 is set in a no light-receiving condition (no detection of carriage), and when the first carriage 8 has returned to the home position by its return motion, the sensor 39 is set in a light-receiving condition (detection of carriage). And, when the no light-receiving condition has been changed to the light-receiving condition, the first carriage 8 is brought to a halt. An element 40 shown in FIG. 3 is a carriage guide bar along which the first carriage is slidably moved.

Referring now to FIG. 2, an output signal for each color from the CCD 7 is subjected to an analog/digital conversion processing, and, then, after having been subjected to output correction, which will be described later, it is processed as required at an image processing unit 100 via a scanner interface 6, including 6r, 6g and 6b, thereby being converted into a recording energizing binary signal for each of recording color information, including black (BK), yellow (Y), magenta (M) and cyan (C). The respective binary signals are input to respective laser drivers 112bk, 112y, 112m and 112c, so that the respective laser drivers energize respective semiconductor lasers 43bk, 43y, 43m and 43c, thereby emitting laser light beams modulated by the recording color (binary) signals.

Figure 4:
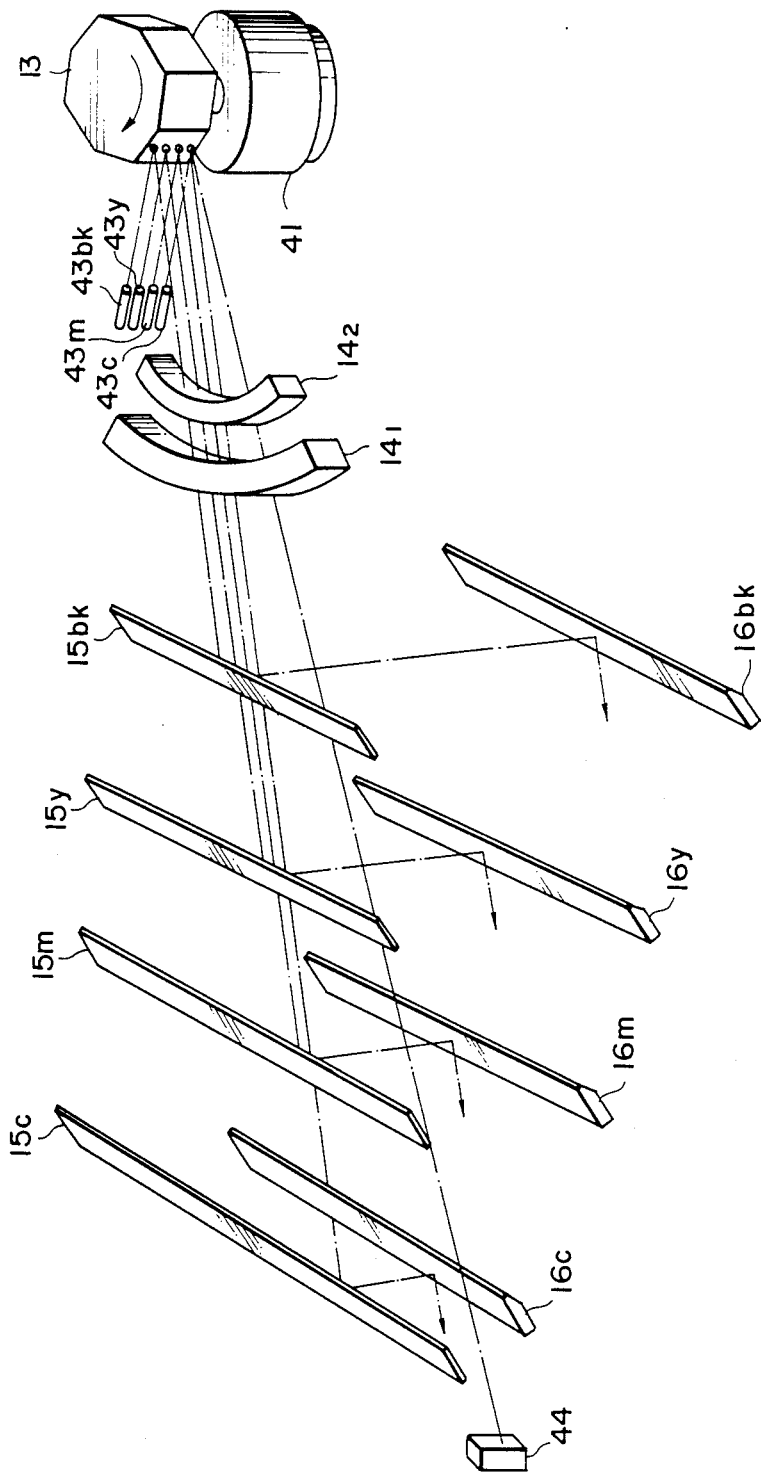
FIG. 4 is an exploded, perspective view showing a scanning system provided in the apparatus of FIG. 1.

Referring now to FIGS. 1 and 4, each of the laser light beams thus emitted is deflected by a rotating polygon mirror 13, and, then, passes through $f\theta$ lenses $14_2$ and $14_1$ and is reflected by the corresponding one of fourth mirrors 15bk, 15y, 15m and 15c and reflected by the corresponding one of fifth mirrors 16bk, 16y, 16m and 16c to be focused onto the corresponding one of photosensitive belts 18bk, 18y, 18m and 18c of respective color information recording devices. The rotating polygonal mirror 13 is fixedly mounted on a rotary shaft of a polygonal mirror drive motor 41, and the motor rotates at a constant speed, thereby rotating the polygonal mirror at a constant speed. Due to rotation of the polygonal mirror, the before-mentioned laser light beams are scanned in a direction normal to the direction of movement of the photosensitive belts, i.e., across the photosensitive belts and thus parallel to the axes of drive rollers 53bk, 53y, 53m and 53c.

The detailed structure of the laser scanning system is illustrated in FIG. 4. There are provided semiconductor lasers 43bk, 43y, 43m and 43c. The laser light beams deflected by the rotating polygonal mirror 13 pass through the $f\theta$ lenses $14_2$ and $14_1$ are reflected by the fourth mirrors 15bk, 15y, 15m and 15c, respectively, and then by the fifth mirrors 16bk, 16y, 16m and 16c, respectively, and focused on the photosensitive belts 18bk, 18y, 18m and 18c, respectively. A sensor 44 comprised of a photoelectric element is disposed such that it receives the laser light beams at one end of scanning across the respective photosensitive belts, and the beginning of scanning of a single line is detected as the time when the sensor 44 changes from a detected condition to a non-detected condition after detection of each of the laser light beams. That is, a laser light detection pulse produced at the sensor 44 is used as a line sync pulse of laser scanning.

Referring again to FIG. 1, the photosensitive belts 18bk, 18y, 18m and 18c are driven to rotate in the clockwise direction by means of respective motors 50bk, 50y, 50m and 50c through respective gears 51bk, 51y, 51m and 51c, which are fixedly mounted on respective motor shafts of the respective motors 50bk, 50y, 50m and 50c, and respective gears 52bk, 52y, 52m and 52c, which are fixedly mounted on respective drive rollers 53bk, 53y, 53m and 53c of the respective photosensitive belts 18bk, 18y, 18m and 18c. Rollers 54bk, 54y, 54m and 54c located at top of the respective photosensitive belts 18bk, 18y, 18m, and 18c have a function to provide tension to the respective photosensitive belts, and, for this purpose, they are biased upwardly by means of respective springs (not shown). The respective surfaces of the respective photosensitive belts are uniformly charged by respective corotron chargers 19bk, 19y, 19m and 19c, which are connected to a positive high voltage generating device (not shown). When a laser light beam modulated by a recording signal is incident upon the surface of the photosensitive belt, which is uniformly charged, the uniform charge is selectively dissipated to the ground potential of the apparatus from the belt. In this case, it is so controlled that the laser is not lit for a portion of the original image which is high in image density and the laser is lit for a portion of the original which is low in image density. With this, for a portion of the original which is high in image density, there is obtained a potential of +800 V at the surface of photosensitive belt $18bk$, $18y$, $18m$ or $18c$, and, on the other hand, there is obtained a potential in the order of +100 V for a portion of the original which is low in image density, and, thus, there is obtained an electrostatic latent image for a particular color on the surface of each of the photosensitive belts in accordance with a high and low image density pattern of the corresponding color of the original image. And, the latent image thus formed is then developed by a corresponding one of black developing unit $20bk$, yellow developing unit $20y$, magenta developing unit $20m$, and cyan developing unit $20c$. As a result, black, yellow, magenta and cyan toner images are formed on the respective photosensitive belts $18bk$, $18y$, $18m$ and $18c$. The toner within each of the developing units is negatively charged by stirring, and each of the developing units is biased approximately to +200 V by means of a developing bias generating device. Accordingly, toner is attracted to those portions of the photosensitive belt which are higher than the developing bias potential, thereby forming a toner image corresponding to the original image.

On the other hand, recording paper $267_1$ stored in a paper cassette $22_1$ or $267_2$ stored in a paper cassette $22_2$ is fed by a feed roller $23_1$ or $23_2$, and then transported onto the image transfer belt 25 by means of a registration roller 24 at a predetermined timing. Reflecting type photosensors $70_1$ and $70_2$ for detecting the quality of paper are disposed above respective stacks of paper $267_1$ and $267_2$. These reflecting type photosensors $70_1$ and $70_2$ receive light reflecting from the respective paper $267_1$ and $267_2$ and determine the quality of the paper depending on the amount of reflecting light. These photosensors are so set to provide different outputs between ordinary paper (abundant in diffused reflection) and coated paper (abundant in normal reflection). And, it is so structured that, utilizing outputs from these photosensors, normal paper is automatically fed in a black and white reproduction mode, and, on the other hand, coated paper is automatically fed in a color reproduction mode. Of course, this control is carried out by a later-described microprocessor system.

It is so structured that if the reflecting type photosensors $70_1$ and $70_2$ do not detect coated paper when a color copy mode is designated by a later-described color mode/black mode designation switch 302, an alarm mark 305 on a console panel 300 is lit.

On the other hand, while the recording paper carried on the image transfer belt 25 is being moved past the photosensitive belts $18bk$, $18y$, $18m$ and $18c$ one after another, the black, yellow, magenta and cyan toner images formed on the respective photosensitive belts are transferred to the recording paper on the image transfer belt 25 one after another with the help of an image transfer corotron disposed opposite to the bottom end of each of the photosensitive belts $18bk$, $18y$, $18m$ and $18c$. The recording paper to which the toner images have been transferred is then transferred to a thermal image fixing unit 36 where the transferred toner images are permanently fixed to the recording paper. Thereafter, the recording paper is discharged onto a tray 37. On the other hand, the residual potential on each of the photosensitive belts after image transfer is removed by a corresponding electroluminescent (EL) erasers $60bk$, $60y$, $60m$ and $60c$, and the residual toner on each of the photosensitive belts is also removed by a corresponding one of cleaner units $21bk$, $21y$, $21m$ and $21c$.

Figure 5:
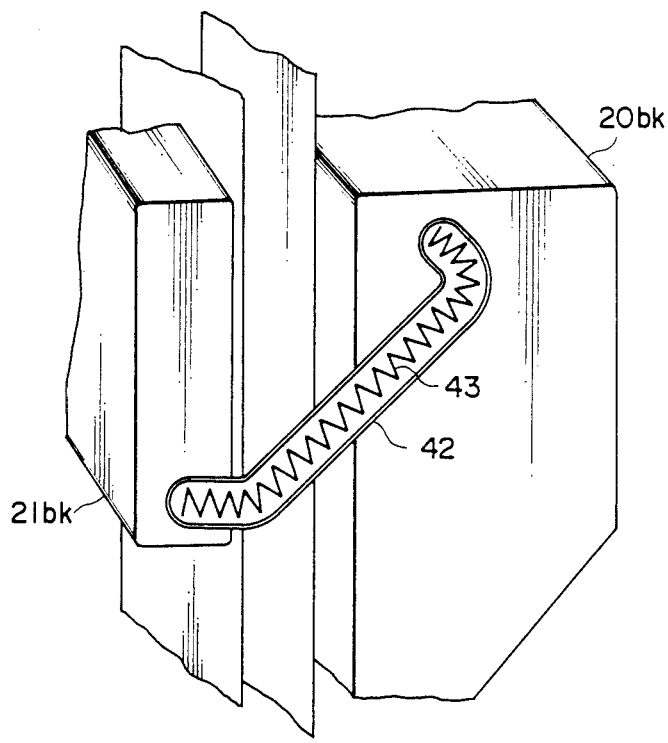
FIG. 5 is a schematic illustration showing, on an enlarged scale, part of the apparatus of FIG. 1 including a toner collection pipe, shown in cross section.

The cleaner unit $21bk$ storing therein black toner is in communication with the black developing unit $20bk$ through a toner collection pipe 42, so that the black toner collected in the cleaner unit $21bk$ is returned to the developing unit $20bk$. For the remaining cleaner units $21y$, $21m$ and $21c$, since the toner used in the upstream transfer stations with respect to the movement of the image transfer belt 25 may become mingled, the toner collected in these cleaner units $21y$, $21m$ and $21c$ are not presented for reuse. FIG. 5 illustrates the interior structure of the toner collection pipe 42. Inside of the toner collection pipe 42 is provided a toner collection auger 43 which is formed from a coil spring and is freely rotatable inside of the bent toner collection pipe 42. The auger 43 is driven to rotate in one direction by means of a driving means (not shown), so that, due to spiral pumping function of the auger 43, the toner stored in the unit $21bk$ is transported to the developing unit $20bk$.

Figure 6A:
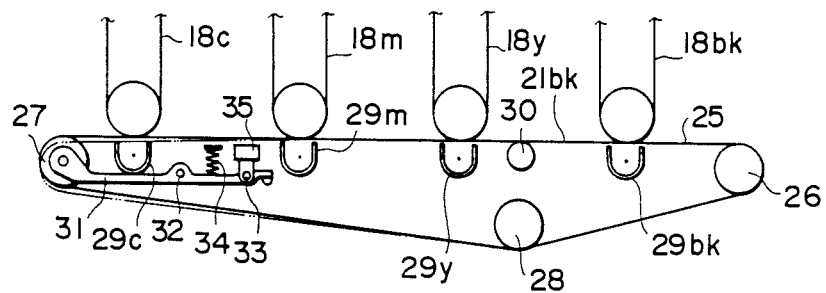
FIGS. 6a and 6b are schematic illustrations showing the detailed structure of an image transferring belt provided in the apparatus of FIG. 1.

FIG. 6a illustrates the detailed structure of the image transfer belt 25 provided in the apparatus of FIG. 1. As shown, the image transfer belt 25 for transporting recording paper as carried thereon in the direction from the photosensitive belt $18bk$ toward the photosensitive belt $18c$ horizontally is extended around a plurality of rollers, including an idle roller 26, a drive roller 27, an idle roller 28 and an idle roller 30, whereby the belt 25 is moved in the counter-clockwise direction as driven by the drive roller 27. The drive roller 27 is rotatably supported at the left end of a lever 31 which is pivotally supported at a pin 32. The right end of the lever 31 is pivotally connected to the bottom end of a plunger 35 of a black mode setting solenoid (not shown). A compression coil spring 34 is disposed between the plunger 35 and the pin 32, and this spring 34 exerts a clockwise rotating force to the lever 31.

If the black mode setting solenoid is in a deenergized state, i.e., color mode, as shown in FIG. 6a, the image transfer belt 25 for carrying thereon recording paper is located to be in contact with all of the photosensitive belts $18bk$, $18y$, $18m$ and $18c$. In this case, the paper feeding system of the apparatus is selected to feed coated paper. Under this condition, when a toner image is formed on each of the photosensitive belts, as the image transfer belt 25 with recording paper carried thereon is being moved, the toner images on the photosensitive belts are transferred to the recording paper carried on the image transfer belt 25 one after another, thereby forming a color image on the recording paper (color mode).

On the other hand, if the black mode setting solenoid is set in an energized state (black mode), the lever 31 is rotated counterclockwise against the recovery force of the compression coil spring 34, so that the drive roller is moved downward over approximately 5 mm. As a result, the image transfer belt 25 is located to be separated away from the photosensitive belts $18y$, $18m$ and $18c$ while keeping contact with the photosensitive belt 18*bk*. In this case, the paper feeding system of the apparatus has selected plain paper. Under this condition, since the recording paper carried on the image transfer belt 25 is brought into contact only with the photosensitive belt 18*bk*, only a black toner image is transferred to the recording paper on the belt 25 (black mode). Since the recording paper is not brought into contact with the photosensitive belts 18*y*, 18*m* and 18*c*, any residual toner remaining on the photosensitive belts 18*y*, 18*m* and 18*c* is not transferred to the recording paper on the belt 25, so that no smearing by yellow, magenta and cyan toner takes place. That is, in a black mode reproduction, a copy similar to that obtained by an ordinary mono-color copier can be obtained.

The console board 300 is provided with a copy start switch 301, a color mode/black mode designation switch 302 for switching a copy mode (immediately upon power up, the switch key is not lit to set a color mode; with a first closure of the switch, the switch key is lit to set a black mode, thereby causing the black mode setting solenoid to be energized; and with a second closure of the switch, the switch key is extinguished to set a color mode, thereby causing the black mode setting solenoid to be deenergized.), an automatic density setting switch 303 (immediately after power up, an automatic density setting mode is released; with a first depression of the switch, the automatic density setting mode is set; and with a second depression of the switch, the automatic density setting mode is released.), other input key switches, a character display, an indicator lamp, and the like.

Next, with reference to the timing chart shown in FIG. 7, the timing of operation of the present apparatus will be described. The timing chart shown in FIG. 7 is the case for forming two identical full color copies in a non-automatic density setting mode. Approximately at the same timing as the initiation of scanning by the first gamma carriage 8 the demodulation energization is initiated for the lasers 43*bk*, 43*y*, 43*m* and 43*c* in accordance with a recording signal. This demodulation energization is carried out at the same time, and an exposure takes place at an irradiation point which is physically separated away from the image transfer point where each recording device is located over a distance of movement of the image transfer belt 25. The image transfer corotrons (corona discharging devices) 29*bk*, 29*y*, 29*m* and 29*c* (FIG. 6) are energized with a predetermined delay (corresponding to a time period for a portion of a photosensitive belt irradiated by a laser beam reaches the corresponding image transfer corotron) after the initiation of demodulation energization of the respective lasers 43*bk*, 43*y*, 43*m* and 43*c*.

If the automatic density setting mode has been set due to depression of the automatic density setting switch 303, a prescan is carried out as indicated by the dotted line in FIG. 7. During this prescan, prior to a reproduction operation, only an image reading operation by the image sensor is carried out, so that the recording system is not set in operation. That is, only such operations as exposure scanning, image reading and image processing are carried out and no other operation is carried out.

Again, reference is made to FIGS. 2(I) through 2(III). The image processing unit 100 converts a three color image signal, which has been read by the CCD 7 and processed for correction, into each recording signal of black (BK), yellow (Y), magenta (M) and cyan (C). In a copy mode, a three color signal is supplied from the CCD 7 to the image processing unit 100 as described above; on the other hand, in a graphic mode, a three color signal is supplied to the image processing unit 100 through an external interface 117 from the exterior of the apparatus. The image processing unit 100 includes a shading correction circuit 101 which applies a later-described correction processing of the present invention for A/D converting an output signal from the CCD 7 into an eight-bit signal or, after the correction processing, applies corrections for irregularities in illumination and irregularities in sensitivity in the internal photoelectric elements of the CCD 7 to an A/D converted color tone data to form a read color tone data.

A multiplexer 102 is a multiplexer which selectively outputs either one of an output tone data from the correction circuit 101 and an output tone data from an interface circuit 117. A gamma correction circuit 103, which receives an output (color tone data) from the multiplexer 102, alters the tone characteristic (input tone data) in accordance with the characteristic of a photosensitive member, and, in addition, alters the tone characteristic automatically in an automatic density setting mode or arbitrarily by an operation button at the console 300, and, furthermore, alters an eight-bit input data into a six-bit output data. Since the output includes six bits, there is output a data which indicates one of 64 different tones.

In this automatic density setting mode, the value of a maximum density portion of an original, i.e., a minimum value as a value for red (R), green (G) and blue (B), during prescan is held by a peak holding circuit 120, and, based on that data, selection processing of gamma correction characteristic data is carried out, and, under the control of a sync control circuit 114, the gamma correction operating characteristic of the gamma correction circuit 103 is automatically selected, altered and set. In turn, a main scan for print operation is carried out, and a series of signal processing, including gamma correction for the thus set gamma correction characteristic, is carried out, thereby obtaining a proper print quality. An input and output relationship of this gamma correction conversion is shown in FIG. 8, as an example.

Figure 8:
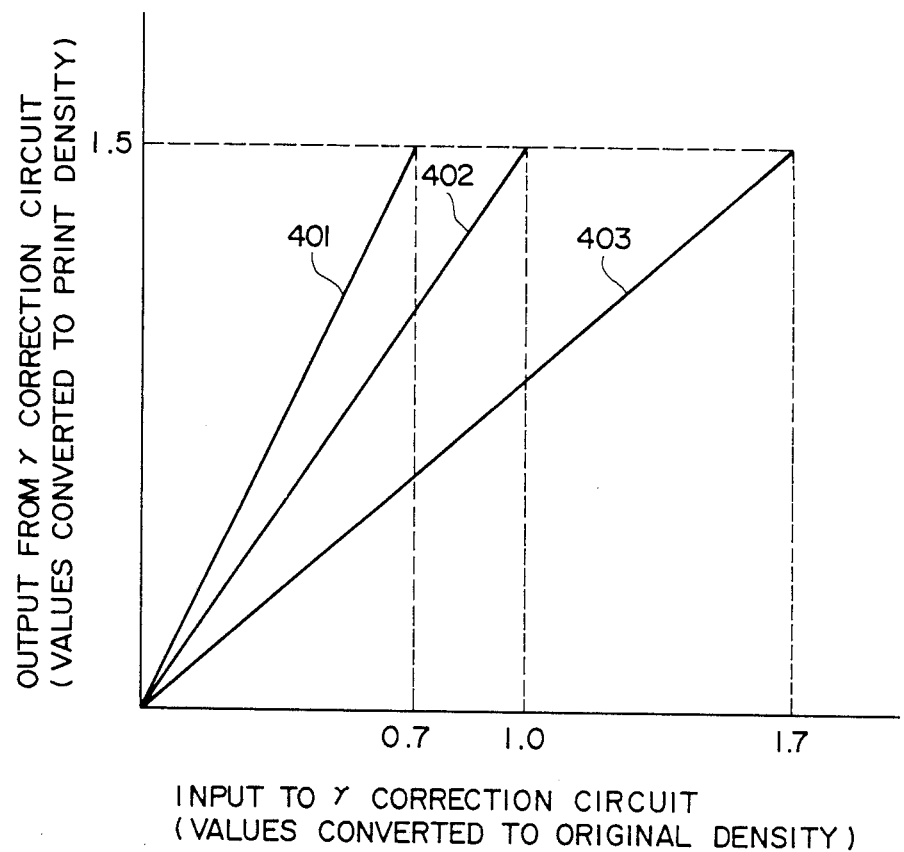
FIG. 8 is a graph illustrating an input-output characteristic of a gamma-correction circuit for use in an automatic image density setting mode.

FIG. 8 illustrates a relationship of automatic density setting in an automatic density setting mode and shows an input and output relationship for a plurality of gamma correction characteristic data. The maximum density value of the original is detected by a prescan operation prior to copy operation and held by the peak holding circuit 120, and based on this maximum density value data, an appropriate gamma correction characteristic is selected and set. In FIG. 8, a relationship between an input to the gamma correction circuit of the data for the value converted to original image density and an output from the gamma correction circuit of the data for the value converted to print image density is shown for three different kinds of gamma correction characteristic examples. The gamma correction characteristic lines include a characteristic line 401 for setting a gamma characteristic when an output from the peak holding circuit during prescan is equivalent to 0.7, a characteristic line 402 for setting a gamma characteristic when an output from the peak holding circuit during prescan is equivalent to 1.0 and a characteristic line 403 for setting a gamma characteristic when an output from the peak holding circuit during prescan is equivalent to 1.7, as representative examples. Although only three characteristic lines are shown as representative examples, use may be made of any other characteristic line depending on the kind of an original to be scanned and the characteristic of a photosensitive member in the apparatus. These characteristic lines are provided in the form of ROM data in a plurality of table converters provided in the gamma correction circuit 103.

The gamma correction circuit 103 includes a plurality of gamma correction characteristic data to be selected and set as table conversion data in the form of ROM data for each of color components. In this gamma correction circuit 103, during prescan operation, from the maximum density value data of an image signal from the peak holding circuit 120, the later-described microprocessor system 200 carries out selection processing and a control data is provided from the sync control circuit 114, thereby selecting one gamma correction conversion ROM. When the gamma correction conversion ROM has been selected, only the thus selected ROM is made valid, and upon receipt of tone output data from the multiplexer 102 as address data of a ROM, ROM data is read out to obtain a gamma corrected tone output data, thereby altering the tone characteristic of image information, so that an eight-bit input data is converted into a six-bit output data. A six-bit three color tone data, indicating the tone in red (R), green (G) and blue (B), output from the gamma correction circuit 103 is then supplied to a complementary color generating/black separating circuit 104.

Figure 9:
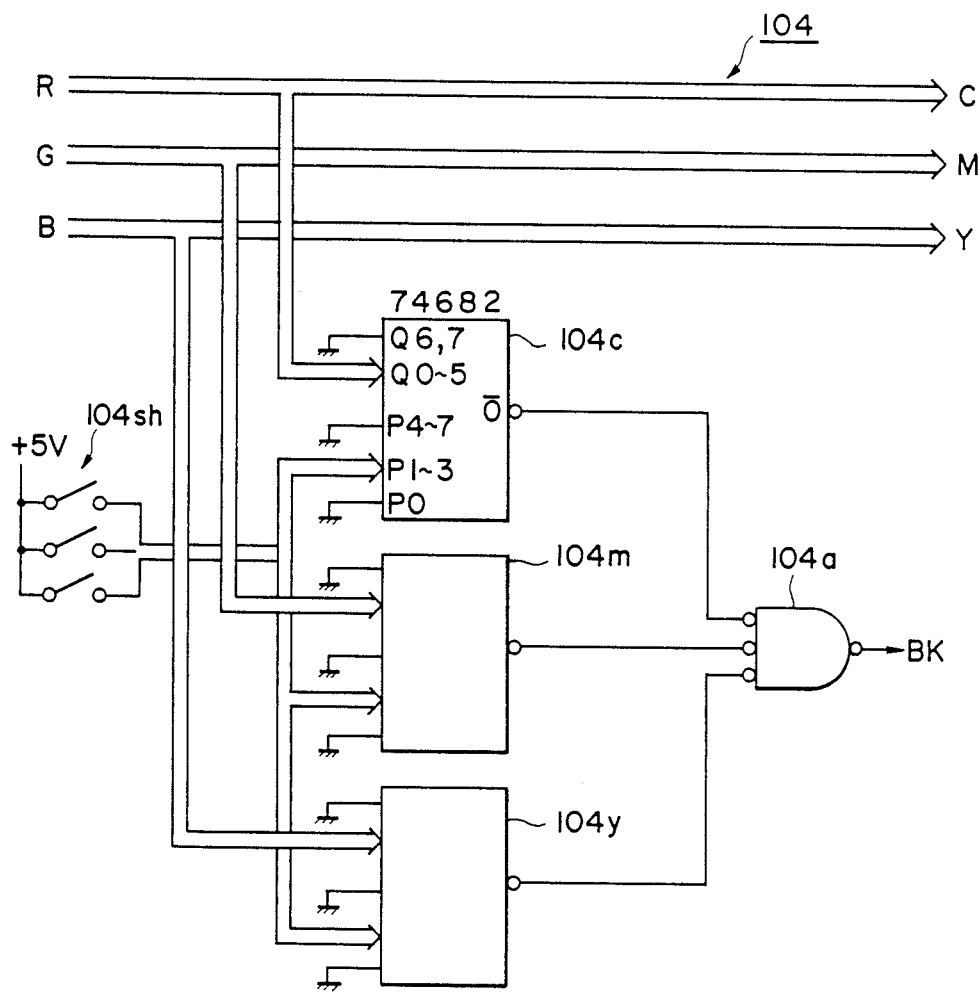
FIG. 9 is a block diagram showing the detailed structure of a complementary color generating/black separating circuit 104 shown in FIG. 2.

The structure of the complementary color generating/black separating circuit 104 is illustrated in FIG. 9. The generation of complementary color is a conversion from a color read signal to a recording color signal, and, as shown in FIG. 9, conversion takes place from a red (R) tone data to a cyan (C) tone data, from a green (G) tone data to a magenta (M) tone data, and from a blue (B) tone data to a yellow (Y) tone data. These C, M and Y tone data are supplied to an averaging/data compression circuit 105 as they are. If all of these tone data indicate high density, since it is only required to carry out a black recording operation, these C, M and Y tone data are compared with reference data set by a thresholding setting switch 104*sh* at digital comparators 104*c*, 104*m* and 104*y*, respectively. The digital comparators 104*c*, 104*m* and 104*y* compare an 8-bit data with an 8-bit data. Thus, a 6-bit tone data added with top two bits of low level (input data) is compared with an 8-bit data (reference data) including a lowest bit and top three bits of low level and the remaining 2nd to 4th bits, which define a reference data set by the switch 104*sh* for setting a threshold. And, if the input data is equal to or lower than the reference data, a low level output signal is supplied to a NAND gate 104*a*; on the other hand, if the input data is larger than the reference data, then a high level output signal is supplied to the NAND gate 104*a*. And, if all of the comparators supply a low output signal, the NAND gate 104*a* supplies a low (black) output signal; whereas, if any one of the comparators supply a high level output signal, it supplies a high (white) output signal. And the output signal from the NAND gate 104*a* is supplied to the data selector 110.

Described more in detail in this respect, a 6-bit data of a tone data input to the comparator has a range of 0 through 3FH in terms of hexadecimal notation. It is so structured that "0" represents black and more white is represented as the value increases, and, during black writing of output, L (low level) indicates black and H (high level) indicates white. Thus, L is input to the upper two bits (Q6, Q7) of the 8-bit input data and the tone data of C, M and Y is input to the lower six bits (Q0 through Q5). For the data to be compared, in order to be able to set the level to be compared in seven steps, use is made of a rotary type switch 104*sh*. In addition, since it is the setting of a black level, if black is set to include many colors close to white, a half-tone (grey) is set to be black, thereby allowing to carry out recording with enhanced resolution; however, from the viewpoint of color balance, the occurrence of black is too much, which is not advantageous. Under the circumstances, 5th and 6th bits are set to be L so as to allow to set in seven steps up to an intermediate level, and, since there is no need to set unnecessarily finely, the LSB bit is set to be L and the value set by the switch 104*sh* is input to the intermediate bits (P1 through P3). Now, if the setting of the switch 104*sh* is "101", then the reference value becomes "0000010", and if all of the data of each of C, M and Y are equal to or lower than this value, i.e., between "0" and "3" in terms of the decimal number, the output from the comparator is L and the black (BK) output is set at L (black). Here, the switch 104*sh* is commonly used for comparison of C, M and Y, such a switch may be provided for each color, and, in addition, by setting a setting range for each color by using an upper limit switch and a lower limit switch, a particular color can be output with excellent resolution in black pattern.

The averaging/data compression circuit 105 of the image processing unit 100 averages 6-bit tone data for one image over 4×4 image data and outputs as a 6-bit tone data. In the present embodiment, it is assumed that an input image is identical in size to an output image and an input data (value read from the CCD) is subjected to A/D conversion to produce an 8-bit data and then converted to a 6-bit data by gamma correction. However, an output data to th laser driver is an ON/OFF (1 bit) data. With a 6-bit input data, it is possible to represent 64 different tone levels in density. And, the dither method or density pattern method may be advantageously applied as a method of representing the density of an output. In general, in order to represent 64 different tones by the density pattern method, use is made of an 8×8 matrix. Thus, it is necessary to average the densities of 8×8 pixels of an input data and make it correspond to an output of 8×8 matrix (density pattern conversion at the tone processing circuit 109). In addition, by this averaging operation, the amount of data and processing speed is compressed to 1/64, so that the data storage capacity and the cost of hardware are significantly reduced. It is conceivable to enlarge the size of an input read pixel to 8×8 times for an output; however, in the present apparatus, since it is not desired to deteriorate the resolution in the black portion (ordinary letter) as set forth previously, this approach is not adopted.

Figure 10I:
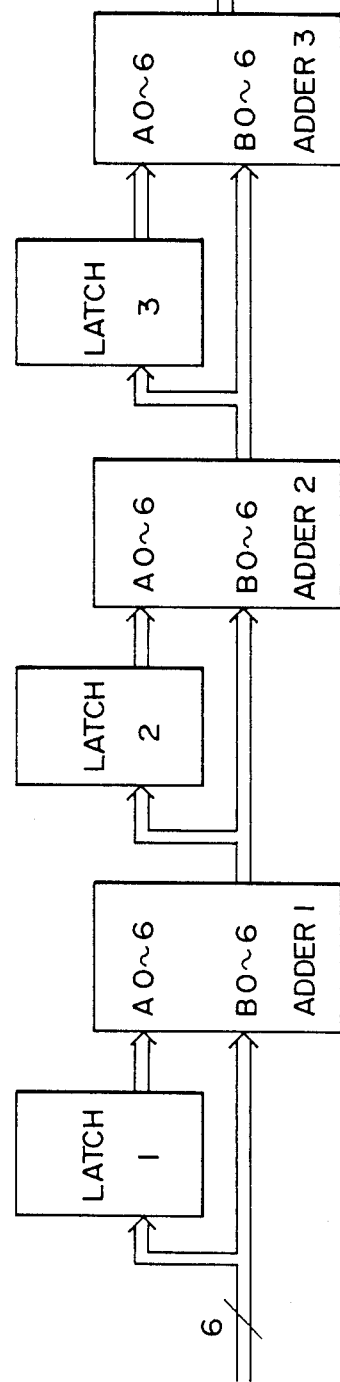

FIGS. 10(I) and 10(II), when combined as indicated in FIG. 10, define a block diagram showing the detailed structure of the averaging/data compression circuit 105, and FIG. 11 shows a timing chart which is useful for understanding the operation of the circuit 105. The total number of pixels to be averaged is 64 pixels, i.e., 8 pixels in the auxiliary scanning direction (exposure scanning direction of the first carriage 8)×8 pixels in the main scanning direction (direction normal to the exposure scanning direction, i.e., optical scanning direction of the CCD). In averaging 64 6-bit data, if averaging of 1/64 is carried out after adding all of the data, it requires a 12-bit adder. However, in the present embodiment, it is so structured to carry out the averaging operation by an 8-bit adder. In the first place, described the addition of 8 pixels in the auxiliary scanning direction, the first data is latched into a latch 1 and added with the second data by an adder 1, and the thus added data is latched into a latch 2. And, the third data is latched into a latch 1 and added with the fourth data at the adder 1, and, then, added with the data in the latch 2 at the adder 2, so that a sum of the data (tone data) of four pixels is output from the adder 2. Then, this data is latched into a latch 3. Similarly, when the fifth through eighth data are added and output from the adder 2, it is added with the data in the latch 3 at an adder 3, so that the data for every 8 pixels in the auxiliary scanning direction is output. The output from the adder 1 is treated as a 7-bit data due to addition of a 6-bit data, and the result of processing at the adder 2 or 3 is a 8-bit data due to addition of 7-bit data; however, as an output, only upper 7 bits are taken, thereby providing a value which is, in effect, ½ of the added data.

Next, addition in the main scanning direction will be described. The averaged value for 8 pixels output from the adder 3 is stored in a RAM 1 of the memory for one main scanning line. When the data for the second line is output from the adder 3, it is added with the contents of the RAM 1 by an adder 4 and the result is stored in a RAM 2. By this addition, a sum of the first line data + second line data is stored in the RAM 2. When the data for the third line is output from the adder 3, it is added with the contents of the RAM 1 by the adder 4 and the result is stored in the RAM 2. By this addition, a sum of 1+2 line data is stored in the RAM 2. When the data for the third line is output from the adder 3, it is added with the contents of the RAM 2 by the adder 4 and the result is stored in the RAM 1. Similarly, the RAMs 1 and 2 alternately output (read out) and store an added data, and when the data for the eight line is output from the adder 3, it is added with the contents of the RAM 1 by the adder 4 and the added data of eight lines is output. Here, similarly with the adders 2 and 3, the adder 4 also outputs only the upper seven bits of 7-bit data addition, so that an averaged (½) data is output. It is to be noted that, in the present embodiment, use is made of a pair of 4-bit binary full adders (74283) connected in parallel as an adder. In the present circuit, by altering the number of latches and adders in the auxiliary scanning direction, it may be adjusted to various matrix sizes.

Next, a description will be had with respect to the masking processing circuit 106 and UCR processing circuit 107. The arithmetic calculation of the masking processing may be generally expressed by $$\begin{pmatrix} Y_0 \\ M_0 \\ C_0 \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} Y_i \\ M_i \\ C_i \end{pmatrix}$$

where, $Y_i$, $M_i$, $C_i$: pre-masking data; and $Y_0$, $M_0$, $C_0$: post-masking data.

Similarly, the arithmetic calculation of the UCR processing may be generally expressed by $$\begin{pmatrix} Y_0' \\ M_0' \\ C_0' \\ Bk_0' \end{pmatrix} = \begin{pmatrix} a_{11}' & a_{12}' & a_{33}' \\ a_{21}' & a_{22}' & a_{23}' \\ a_{31}' & a_{32}' & a_{33}' \\ a_{41}' & a_{42}' & a_{43}' \end{pmatrix} \begin{pmatrix} Y_0 \\ M_0 \\ C_0 \end{pmatrix}$$

Therefore, in the present embodiment, using these equations, i.e., taking a product of the coefficients of both of the equations, $$\begin{pmatrix} Y_0' \\ M_0' \\ C_0' \\ Bk_0' \end{pmatrix} = \begin{pmatrix} a_{11}' & a_{12}' & a_{33}' \\ a_{21}' & a_{22}' & a_{23}' \\ a_{31}' & a_{32}' & a_{33}' \\ a_{41}' & a_{42}' & a_{43}' \end{pmatrix} \begin{pmatrix} a_{11} & a_{12} & a_{13} \\ a_{21} & a_{22} & a_{23} \\ a_{31} & a_{32} & a_{33} \end{pmatrix} \begin{pmatrix} Y_i \\ M_i \\ C_i \end{pmatrix}$$

$$= \begin{pmatrix} a_{11}'' & a_{12}'' & a_{13}'' \\ a_{21}'' & a_{22}'' & a_{23}'' \\ a_{31}'' & a_{32}'' & a_{33}'' \\ a_{41}'' & a_{42}'' & a_{43}'' \end{pmatrix} \begin{pmatrix} Y_i \\ M_i \\ C_i \end{pmatrix}$$

is calculated to obtain new coefficients. The coefficients ($a_{11}''$ etc.) in the above equation for implementing the masking processing and UCR processing at the same time is previously calculated and its calculated value is substituted in the above equation and made to correspond to an expected input $Y_i$, $M_i$ and $C_i$ (each 6-bit) of the masking processing circuit 106, thereby storing a calculated value ($Y_0'$, etc.: output from the UCR processing circuit 107) in a ROM. Thus, in the present embodiment, the masking processing circuit 106 and the UCR processing circuit 107 are constructed by a set of ROMs, so that the data at an address specified by an input Y, M and C into the masking processing circuit 106 is provided to the tone processing circuit 109 as an output of the UCR processing circuit 107. Incidentally, generally speaking, the masking processing circuit 106 is to correct the Y, M and C signal in accordance with the characteristic of spectral reflection wavelength of recording image forming toner, and the UCR processing circuit 107 is to carry out corrections in color balance in superimposition of various color toner images.

Now, a description will be had with respect to the tone processing circuit 109 which carries out the density pattern processing of the image processing unit 100. The tone processing circuit 109, in response to a tone data of each of Y, M and C, generates a pattern corresponding to its density, and it is comprised of a ROM. A 6-bit tone data can represent density information of 64 different tones. Ideally, if the dot size of one dot can be varied in 64 steps, the resolution does not have to be reduced. However, the dot size modulation can be carried out stably up to 4 steps in a laser beam electrophotographic system, so that, in general, use is often made of the density pattern method and a combination of the density pattern method and the beam modulation method. Here, use is made of a processing method for representation of 64 tones by an 8×8 matrix. The circuit 109 has 64 different kinds of 8×8 density patterns for one group and outputs an 8-bit data in the auxiliary scanning direction by a tone data and a main scanning address.

FIG. 12a illustrates a density pattern which includes 64 patterns (defining one group) formed based on binary converted data of thresholds distributed in a spiral form. In this pattern, for density "0", the number of dots in the 8×8 matrix to which toner is to be deposited is zero, and, toner is to be deposited to a number of dots represented by the density data. For density "32", toner is deposited to shaded squares indicated in FIG. 12a. Thus, the data of a certain column are sequentially input into the processing circuit 109, and an 8-bit data is output from the main scanning address 1 in the order of data and then output as being subjected to parallel-to-serial conversion, so that there is obtained data for one line in the auxiliary scanning direction. After outputting this data eight times (processing eight lines) in the main scanning direction, a next series of data is input. For example, the data of main scanning direction 3 of data series 20, 32 and 40 are 00111110, 01111110 and 11111111, respectively. Here, the 64 tone representation using an 8×8 matrix has been described; however, it is to be noted that use may also be made of a combination with dot size modulation, the submatrix method, etc. as a method for obtaining an enhanced resolution. Furthermore, for this case, a similar tone representation is possible by pattern alteration or an output method from the pattern. In addition, regarding color processing operation, the pattern generating angle may be varied for each color without using the same pattern for each of Y, M, C and BK density patterns, also from the viewpoint of preventing the occurrence of moiré. In other words, in this case, there are provided a plurality of pattern groups and the patterns of different groups are assigned to each color.

As a BK assigned recording signal, it is necessary to synthesize a dot pattern (binary signal) from the black separating circuit 104 and a density pattern (tone pattern signal) generated from BK tone information from the UCR processing circuit 107. Simply stated, regarding black of a letter portion, the toner deposition based on a binary signal from the black separating circuit 104 has a higher resolution than the toner deposition based on the density pattern information. On the contrary, for a tone image portion of a photograph, the toner deposition based on the density pattern information has a higher image reproducibility. In order to synthesize a dot pattern (binary signal) from the black separating circuit 104 and a density pattern (tone pattern signal) generated by the BK tone information from the UCR processing circuit 107, the following method is conceivable. That is, (a) to simply take a logic sum of both (toner deposition, i.e., recording, if at least either of the two is black); (b) if the black separating circuit 104 outputs black to be recorded in an 8×8 matrix, an output of the black separating circuit 104 is assigned to the matrix, and, if no output is provided, the data of density pattern is assigned; and (c) if the black separating circuit 104 outputs black to be recorded in an 8×8 matrix, the number of "black" output from the black separating circuit 104 to the matrix is compared with the number of "black" of a density pattern to be assigned to the matrix, and the amount exceeded by the latter over the former is assigned to white portions of the matrix randomly. If black (shaded area) is distributed in an 8×8 matrix region as shown in FIG. 12b, the output from the black separating circuit 104 takes a distribution shown in FIG. 12c. On the other hand, if a density pattern specified based on the BK output from the UCR processing circuit 107 takes a black distribution shown in FIG. 12d, there is obtained a recording signal shown in FIG. 13a according to the above-described method (a), a recording signal shown in FIG. 13b according to the above-described method (b), and a recording signal shown in FIG. 13c according to the above-described method (c).

Figure 13A:
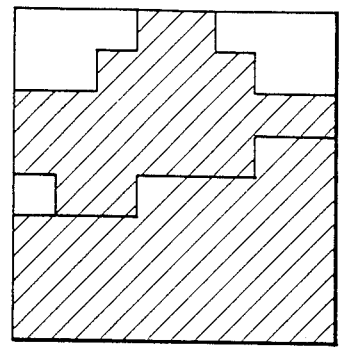
FIG. 13a is an illustration showing a logical sum (OR) between a BK output of the circuit 104 and a BK density pattern output of the circuit 109 as developed on a plane.
Figure 13B:
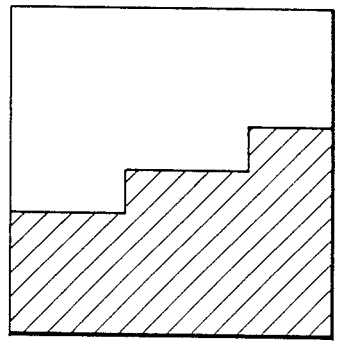
FIG. 13b is an illustration showing an output signal from a data selector 110, as developed on a plane, when "black" is present in an output from the circuit 104.
Figure 13C:
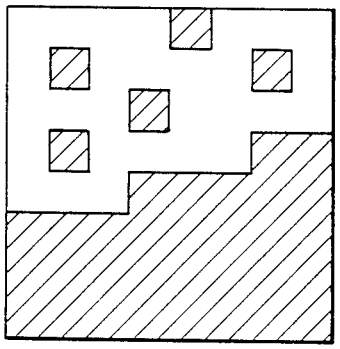
FIG. 13c is an illustration showing a record signal distribution in which "black" differences between an output from the circuit 104 and a density pattern signal are arranged randomly.

The above-described method (a) is simpler in hardware; however, as shown in FIG. 13a, in most case, the number of recorded blacks is increased, and there is obtained a relatively undesirable effect of black blurring at the edge of a black image. According to the above-described method (b), the data processing is carried out by determining whether or not there is an output "black" from the black separating circuit 104 within an 8×8 matrix region and, if there is, assigning the output of the circuit 104 to that region. That is, this method can be implemented by a relatively simple hardware and logics. Besides, this method allows to attain an enhanced resolution. However, if an image is a half-tone image, the black is lowered in density by the amount of 5 dots as compared with the case in which a density pattern is assigned.

The above-described method (c) obviates the problems associated with the methods (a) and (b). However, in reality, although differences may be obtained simply, hardware and logics for assigning differences to white regions randomly become complicated. As a result of the above considerations, in the present embodiment, from the viewpoint of obtaining an enhanced resolution for a black letter, the above method (b) has been adopted. This method is implemented by the data selector shown in FIG. 2.

Figure 14:
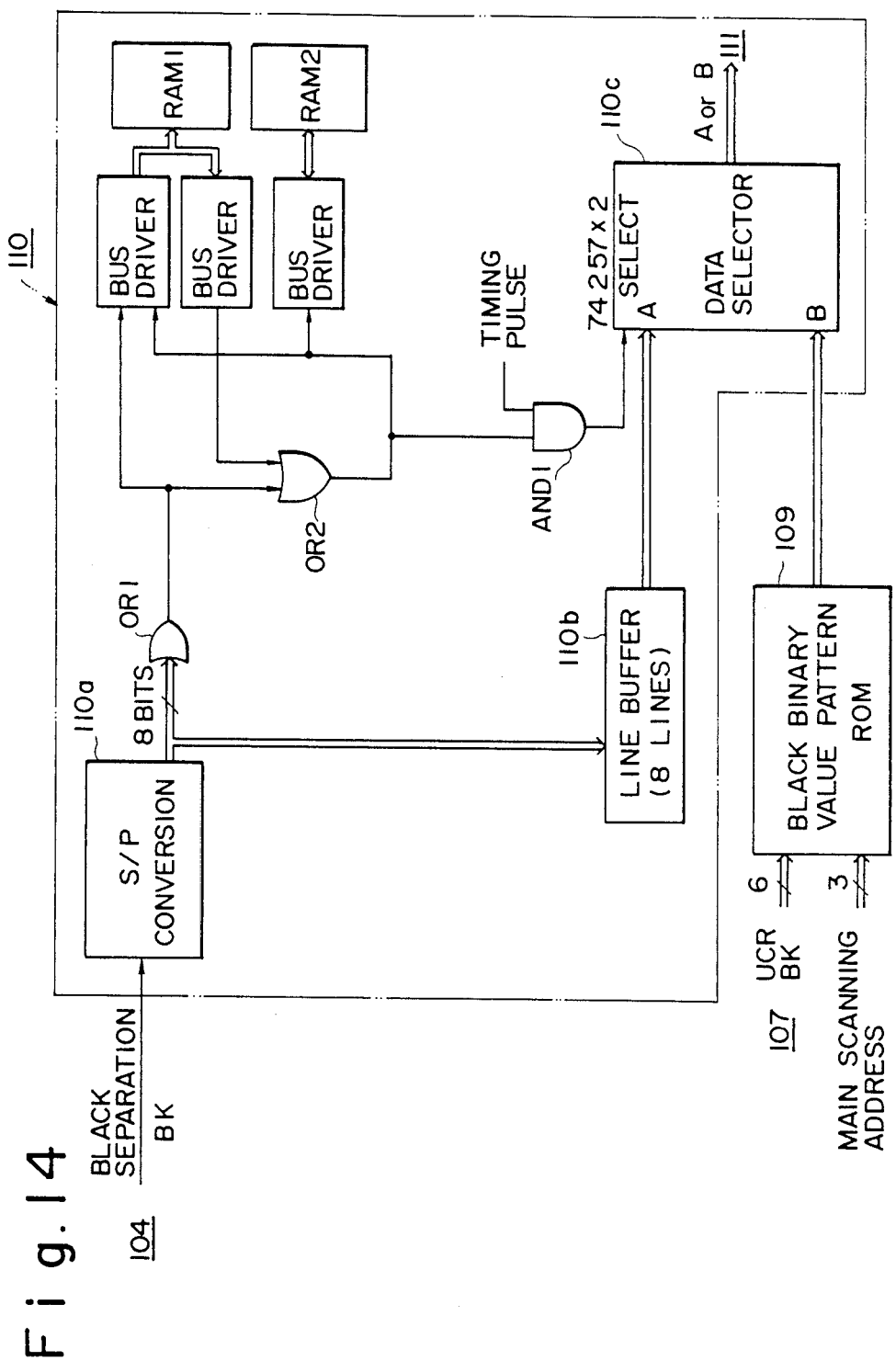
FIG. 14 is a block diagram showing the detailed structure of the data selector 110.

FIG. 14 illustrates the structure of the data selector 110. As shown, a data of "0" (L: white) or "1" (H: black) per pixel from the black separating circuit 104 is output in parallel for every 8 bits by a serial/parallel converter 110a, and if there is even one black ("1") in the 8 parallel bits, an OR gate OR1 outputs "1", whereas, if the 8 bits are all white ("0"), the OR gate OR1 outputs "0". This output is stored in a RAM 1 for one line, and if the data for the second line is input, it is ORed with the data for the first line stored in the RAM 1 with the result being stored in a RAM 2. In this manner, the data of 8 lines are ORed in sequence. During this time period, the data of "0" (L: white) or "1" (H: black) per pixel from the separating circuit 104, after parallel conversion described above, is written into a line buffer 110b having the capacity for 8 lines. Upon completion of this write-in operation, the timing pulse becomes "1" to set an AND gate 1 open, so that the data is supplied from the line buffer 110b to the data selector 110c one line by one line, and the density pattern data is supplied from the processing circuit 109 to the data selector 110c one line by one line. Besides, the data of the RAM 2 is repetitively read out to be supplied to the control data input of the data selector 110c.

If there is an output black from the black separating circuit 104 for an 8×8 matrix, the output from the RAM 2 is "1", so that the data selector 110c causes an output from the buffer 110b to be supplied to a the laser driver 112bk through an OR gate 111 (FIG. 2). If none of the outputs from the separating circuit is black, the data of density pattern is supplied.

The peak detecting circuit 115 of the image processing unit 100 has its significance in a mono-color black reproduction mode and an automatic density setting color/black and white mode, and it converts each of R, G and B signals into analog format, compares these three analog signals and outputs the maximum of the three to a binary conversion circuit 116, which converts an input signal into a binary signal which represents either black ("1": recording) or white ("0": non-recording). The thus converted binary signal is supplied to the laser driver 112*bk* through the OR gate 111. The peak holding circuit 120 is to be used for the automatic density setting mode in a color or black and white mode. And, it detects and holds the maximum density among image signals R, G and B of one frame, and an input is an output from the peak detecting circuit 115, and an output of this peak holding circuit 120 is supplied to the sync control circuit 114.

The sync control circuit 114 determines the timing of energization of each of the above-described elements of the present apparatus. The microprocessor system 100 is in charge of the overall control of the elements shown in FIG. 2 and thus takes care of the control of an image processing operation. Accordingly, the microprocessor system 200 controls various modes of operation set by the operator at the console, including various control operations associated with image reading and recording and a sequential control of the photosensitive member, exposure system, corona chargers, developing systems, image fixing system, etc.

The image processing apparatus of the present embodiment is capable of producing not only a full color copy, but also a monochromatic or mono-color copy and thus is provided with a key switch 302 at the console 300 for switching between a full color mode and a mono-color black mode. The mode setting in accordance with the operation of this switch has already been described. Now, the operation when the mono-color black mode has been set will be described below.

The image scanning section, including the first carriage, operates in a manner similar to that of a full color mode also in a mono-color black mode, and thus three color signals of R, G and B are output from the gamma correction circuit 103. The peak detecting circuit 115 and the binary conversion circuit 116, which have not been set in operation during full color mode, are now set in operation; on the contrary, those elements from the complementary color generating/black separating circuit 104 to the tone processing circuit 109 and the laser drivers 112*y*, 112*m* and 112*c* and the lasers 43*y*, 43*m* and 43*c*, which have been set in operation during full color mode, are not set in operation in the mono-color black mode. The controlling of causing these elements to be operative or inoperative is determined by the controlling operation by the sync control circuit 114 in accordance with commands from the microprocessor system 200. An output from the gamma correction circuit 103 is supplied to the peak detecting circuit 115, and then the peak detecting circuit 115 supplies the analog voltage of the largest in level among the inputs to the binary conversion circuit 116. A threshold voltage is set at a predetermined value in the binary conversion circuit 116, and an input is compared with the threshold level to convert the input into a 1-bit digital signal, which is then supplied to the OR gate 111. This output is supplied to the laser driver 112*bk* through the OR gate 111. Thus, the laser driver 111*bk* causes the associated laser 43*bk* to be energized in accordance with the signal thus supplied. As a result, a laser beam emitted from the laser 43*bk* becomes modulated in accordance with the signal thus supplied.

On the other hand, in the recording system of the apparatus, during the mono-color black mode, the charger corotrons 19*y*, 19*m* and 19*c*, developing units 20*y*, 20*m* and 20*c*, and image transfer corotrons 29*y*, 29*m* and 29*c* are held inoperative, and the remaining elements of the recording system are set in operation in a manner similar to that of the full color copy mode. The controlling of causing these elements to be operative and inoperative is carried out by associated drivers in accordance with commands from the microprocessor system 200.

Figure 15:
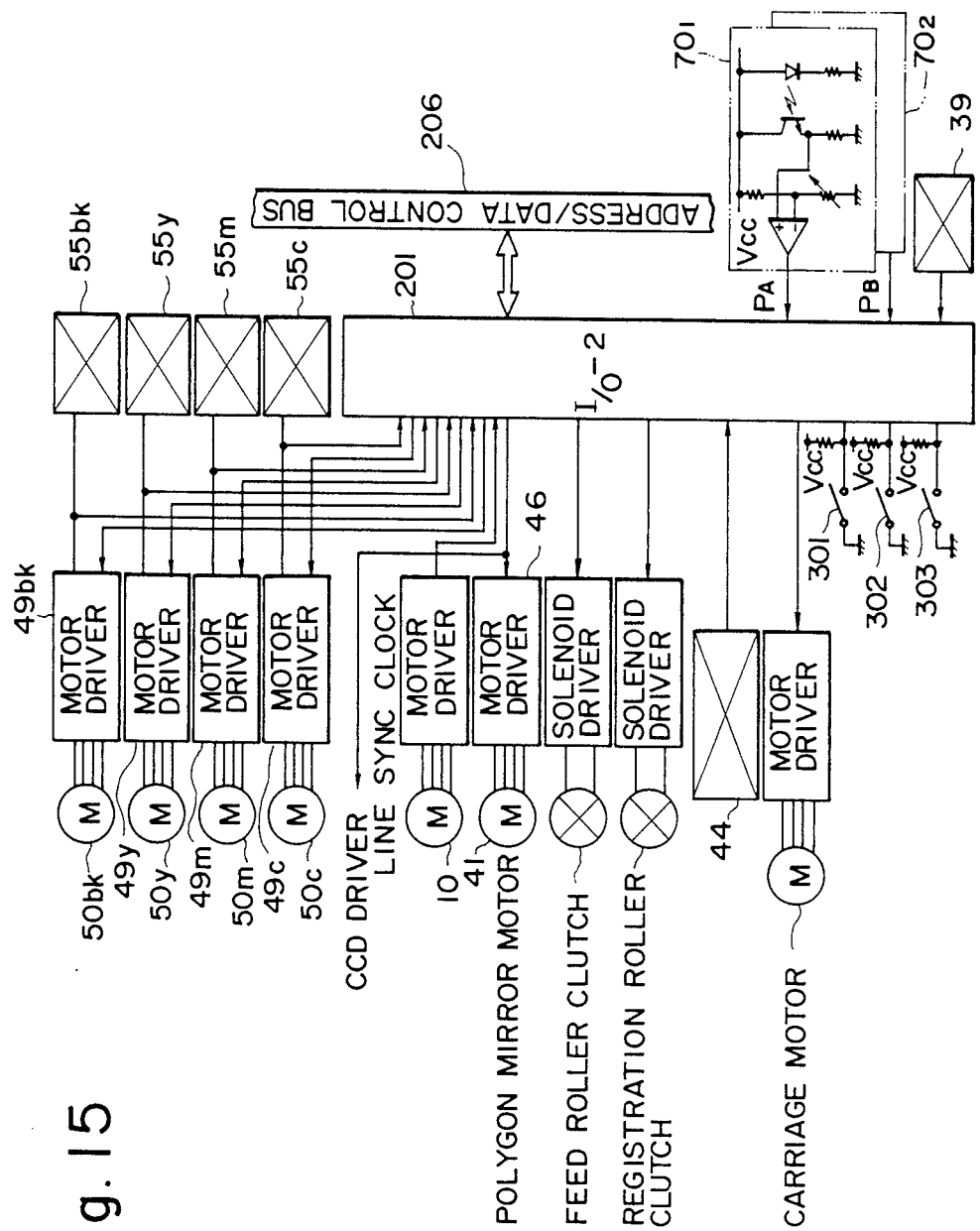
FIG. 15 is a schematic illustration showing part of components of the image processing apparatus, which are coupled to a microprocessor system 200.

FIG. 15 illustrates an interface between the polygon mirror drive motor 41 and the like and the microprocessor system 200 (FIG. 2). An input/output port 201 shown in FIG. 15 is coupled to a bus 206 of the system 200. As shown in FIG. 15, there is provided a photodetector 44 for detecting a line sync signal. A motor 41 for driving a rotating polygon mirror is driven by a motor driver 46. Also provided are motors 50*bk*, 50*y*, 50*m* and 50*c* for driving to rotate the photosensitive belts 18*bk*, 18*y*, 18*m* and 18*c*, respectively, and these motors are driven by motor drivers 49*bk*, 49*y*, 49*m* and 49*c*, respectively. Also provided are seam sensors 55*bk*, 55*y*, 55*m* and 55*c* (FIGS. 1 and 15) for detecting the seams of the photosensitive belts 18*bk*, 18*y*, 18*m* and 18*c*. The motors 50*bk*, 50*y*, 50*m* and 50*c* are driven to rotate after a copying operation to position the respective seams at a predetermined location in accordance with feed-back signals supplied from these seam sensors 55*bk*, 55*y*, 55*m* and 55*c*, respectively. That is, when the seam sensors 55*bk*, 55*y*, 55*m* and 55*c* detect the respective seams, the motors 50*bk*, 50*y*, 50*m* and 50*c* are brought to a halt, thereby being set in a non-rotating state. A black mark is provided at the inner side of the seam of each of the photosensitive belts 18*bk*, 18*y*, 18*m* and 18*c*, so that the seams of the belts can be detected by detecting the change in the amount of light received by the respective seam sensors 55*bk*, 55*y*, 55*m* and 55*c*.

It is to be noted that there are also provided drivers for driving various parts of the apparatus and processing circuits connected to various sensors, which are operatively coupled to the system 200 through connection with the input/output port 201 or any other input/output port; however, for the sake of simplicity, these other elements are not shown.

Both in the full color mode and in the mono-color black mode, the timing of operation of the paper feed rollers 23$_1$ and 23$_2$, developing unit 20*bk*, registration roller 24, image transfer corotron 29*bk*, and the like with respect to the timing of operation of the first carriage 8 remains the same.

As described above, the fact that the black recording photosensitive belt 18*bk* is located at the most upstream location with respect to the direction of paper transportation allows to obtain an advantage of simplicity in carrying out controlling energization of the recording system in the mono-color black mode. On the contrary, if the black recording unit is located at the most downstream location as in the prior art and thus different from the above-described present embodiment, then, as shown in FIG. 7, the timing of operation of paper feed roller 23, registration roller 24 and the like with respect to the timing of operation of the first carriage 8 would differ between the full color copy mode and the mono-color black copy mode. This indicates the fact that the controlling operation would be much more complicated.

Next, the timing of operation of various elements under the control of the microprocessor system 200 and the sync control circuit 114 will be described below. In the first place, upon power up, the apparatus initiates a warm-up operation, including: raising the temperature of the image fixing unit 36; bringing the polygonal mirror to a constant rotational speed; locating the carriage 8 at its home position; generating a line sync clock (1.26 KHz); generating a video sync clock (8.42 MHz); and initialization of various counters. The line sync clock is supplied to the polygonal mirror motor driver and also to the CCD driver, and the former uses this signal as a reference signal of a phase locked loop (PLL) servo system, whereby it is so controlled that a feed-back signal of a beam detecting signal from the beam sensor 44 has the same frequency as that of the line sync clock and has a predetermined phase relationship therewith. Since a detection signal (pulse) of the beam sensor 44 is output commonly for respective colors, this is used as a signal for synchronizing the initiation of main scanning of CCD reading. The frequencies of the line sync signal and the detection signal of each of the beam sensors are locked by the PPL and thus are identical; however, since there is a chance that there is produced a slight phase difference, as the reference of scanning, use is made of the detection signal of each of the beam sensors and not of the line sync signal.

The video sync clock has a frequency per one dot (one pixel) and is supplied to the CCD driver and laser driver. The various counters provided in the apparatus include (1) read line counter; (2) write line counter; (3) read dot counter; and (4) write dot counter. The counters (1) and (2) are program counters substituted by the operation of CPU 202 of the microprocessor system 200, and counters (3) and (4) are discrete counters but not shown in the drawings.

Next, the timing of a print cycle will be described with reference to FIG. 16. Upon completion of the warm-up operation, it proceeds to a standby processing operation, thereby establishing a print enable condition. Under the condition, when the copy start key switch 301 is turned on, by the operation of the CPU 202 of the system 200, the drive motor (FIG. 15) of the first carriage 8 starts to rotate, so that the carriages 8 and 9 start the scanning operation (exposure scanning) toward the left with the carriage 9 at a speed half of that of the carriage 8. While the carriage 8 is at its home position, an output from the home position sensor 39 is H, and this output changes to L shortly after the initiation of the exposure scanning (auxiliary scanning). At the time when this output changes from H to L, the read line counter is cleared and at the same time is set in a count enable state. It should also be noted that the time when this output changes from H to L is the time when the leading edge of the original is exposed.

The read line counter counts up responsive to each pulse of the line sync clock which is supplied after the output from the sensor 39 has changed to L. In addition, when the line sync clock is received, the read dot counter is cleared by the rising edge, thereby establishing a count enable state. Thus, regarding the reading of the first line, after the output from the home position sensor 39 has changed to L, in synchronism with the video sync clock immediately after the first line sync clock has been received, pixel 1, pixel 2, ..., pixel 4,667 are read in sequence. The counting of pixels is carried out by the read dot counter. The count of the read line counter in this case remains "1". Similarly for the second and following lines, the read line counter is incremented by the next line sync clock, thereby clearing the read dot counter, and, in synchronism with the following video sync clock, the reading of pixels is carried out while incrementing the read dot counter. In this manner, the lines are read one after another, and when the read line counter has counted up to 6,616 lines, the final reading is carried out for that line, and, thereafter, the carriage drive motor is driven to rotate in the reversed direction, thereby causing the carriages 8 and 9 to be returned to their home positions.

The pixel data thus read is sequentially supplied to the image processing unit 100, whereby the data is subjected to various image processing operations. The time period for carrying out such image processing operations requires at least two clock periods of the line sync clock signal.

Now, turning to writing or recording operation, the clear and count enable of the write line counter is carried out such that when the count of the write line counter is "2", the write line counter is cleared and set in a count enable state. The count-up is cleared by the rising edge of a detection signal from the beam sensor 44 and the count-up is carried out by the video sync signal. The writing of each color is carried out such that from the time when the count of the read counter has reached a predetermined value to set the write line counter for each color in a count enable state and the counting operation has started by the first detection signal from the beam sensor 44 until the write dot counter for the first line reaches a predetermined value, the laser drivers are driven to carry out a writing operation. While the dot counter is in a range between 1 and 400, dummy data are produced; on the other hand, write enable data are produced while the dot counter is in a range between 401 and 5,088, i.e., 4,677 pixels. The dummy data are produced for adjusting the physical distance between the beam sensor 44 and the photosensitive belts 18*bk*, 18*y*, 18*m* and 18*c*. The write data ("1" or "0") is picked up at the falling edge of the video sync signal. The writing range is determined by each write line counter from its count of "1" to "6,615".

As shown in FIG. 16, since recording data is obtained from the time of scanning the third line by CCD after initiation of exposure scanning, each recording device starts to become energized for recording in synchronism with acquisition of data. In the automatic density setting mode, prior to the before-mentioned carriage scanning, the prescan or carriage scanning only for the purpose of reading the maximum density of the original is carried out. During this prescan operation, only the image reading system is rendered operative with such systems as recording system, photosensitive driving system, exposure system, charger system, developing system and image fixing system are not rendered operative.

Figure 17A:
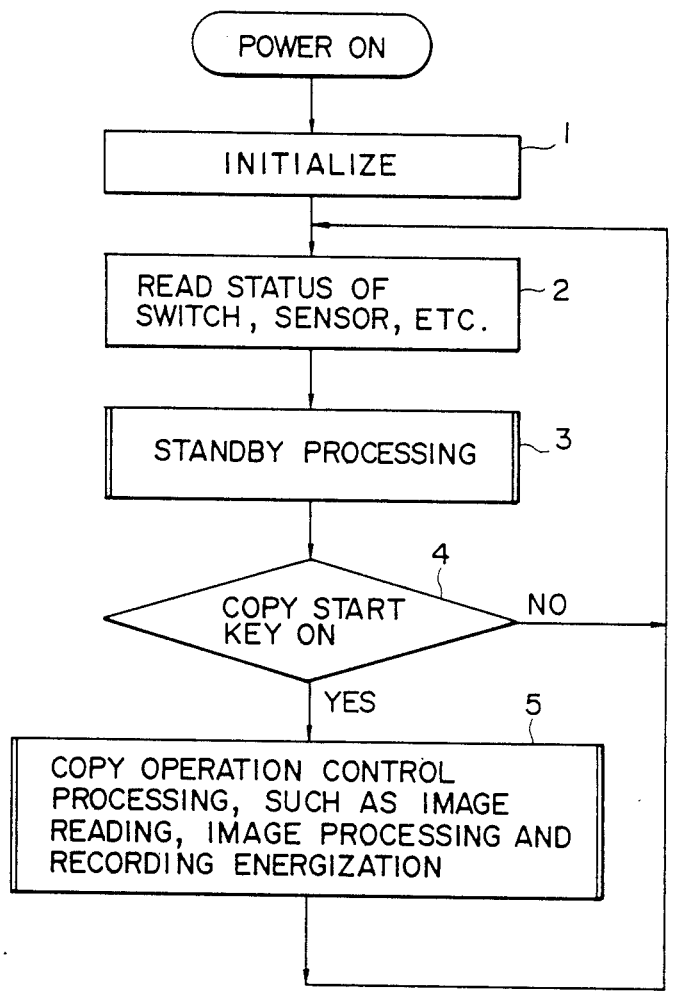
FIG. 17a is a flow chart showing a sequence of steps of an overall operation of the image processing apparatus of FIG. 1.

Now, the operation of the control system carried out under the control of the microprocessor system 200 will be described below. First, with reference to FIGS. 17*a* and 17*b*, the operation of the overall control system of the present image processing apparatus, focusing on the phase adjustment control among the photosensitive belts carried out during the standby processing, will be described. These processing operations are carried out by the CPU 202 of the microprocessor system 200 using a program stored in the ROM 204.

The overall operation of the apparatus as a whole is as follows. That is, upon power up, each unit is set in its initialized state, and the contents of the memories are cleared while setting initial values to predetermined memories (step 1). Then, states of various switches and sensors are read (step 2), followed by a step of standby processing (step 3). During the standby processing (step 3), the states of various keys are read, and, depending on status signals, various control operations, such as setting the number of copies, clearing the number of copies, selection of a paper feeding system, setting of a copy mode, setting of a rate of magnification and phase control for restoring the position of a seam are carried out. The phase adjustment control among photosensitive belts to be carried out during this standby processing is carried out such that, while the photosensitive belts do not participate in recording operation, e.g., during the standby processing period, it is examined whether or not the seam of each of the photosensitive belts corresponding to recording color is located at a predetermined position, and, if the seam of each of the photosensitive belts corresponding to recording color is not located at a predetermined position, then the control operation to restore the phase of the position of the seam is carried out automatically.

Upon completion of the standby processing (step 3), the status of the copy start switch 301 is examined (step 4), and these processes (steps 2 through 4) are repeated until the copy start switch 301 is turned on. As soon as the copy start switch 301 has been turned on (step 4), it goes to step 5, where a copy operation control processing (step 5) is carried out. Upon completion of setting the number of copies and execution of a copy sequential control processing, it goes back to step 2 to a routine for checking various switches and sensors, followed by the step of standby processing (step 3), so that these processing operations (steps 2 through 4) are again repeated until the copy start switch 301 is turned on (step 4).

Now, the phase adjusting control operation among the photosensitive belts, which is carried out while the apparatus is in the standby processing period and not in a copy operation, will be described below. The sequence of steps of this phase adjusting control operation among the photosensitive belts, which is carried out as part of the standby processing operation, will be described with reference to FIGS. 17b(I) and 17b(II). It is to be noted that this operation is carried out by the CPU 202 of the microprocessor system 200 using a program stored in the ROM 204.

During the standby processing (step 3), the status of each of various keys is read, and, depending on the status thus read, various operations, such as setting of the number of copies, clearing of the number of copies, selection of a paper feeding system, setting of a copy mode and setting of a magnification ratio are carried out in sequence. And, when it proceeds to a step 10 of phase adjusting control processing among photosensitive belts, an output from the seam sensor 55bk is checked to determine whether or not the seam mark is located at a predetermined position (step 11). That is, if the seam mark of the photosensitive belt 18bk is located at the position where the seam sensor 55bk is disposed and thus the seam mark is located at a predetermined position, the seam sensor 55bk supplies an output "1", and, thus, this is checked by the output from the seam sensor 55bk (step 11). For example, if the seam mark of the photosensitive belt 18bk is not located at a position where the seam sensor 55bk is disposed and thus the seam mark is not located at a predetermined position, the seam sensor 55bk cannot detect the seam mark of the photosensitive belt 18bk, so that the seam sensor 55bk supplies its output "0" in place of "1".

In this case, the result of determination at step 11 renders "NO" ($55bk \neq 1$), so that it proceeds to step 12 to turn on the photosensitive belt drive motor 50bk, thereby carrying out the phase difference adjusting control operation (phase restoring control operation) for positioning the seam at a predetermined position. Then, it enters a process, in which the photosensitive belt drive motor 50bk is turned on at step 12 and then the seam mark is checked at step 13, and it is set in a standby state with a dynamic weight by repeating step 13 until the seam mark is found. During this time period, the photosensitive belt 18bk keeps moving by the photosensitive belt drive motor 50bk, and when the seam mark has reached a predetermined position where the seam sensor 55bk is disposed, the seam sensor 55bk supplies "1" as its output, so that it goes out of the loop of step 13. And, then, the photosensitive belt drive motor 50bk is turned off (step 14), thereby stopping to drive the photosensitive belt 18, and, thus, the phase restoring control operation regarding the position of the seam mark of the photosensitive belt 18bk is terminated. At step 11, if the seam mark of the photosensitive belt 18bk is located at the location where the seam sensor 55bk is disposed and thus the seam mark is located at a predetermined location, the checking routine is completed, so that it goes from checking step 11 to the next checking step 15 for the photosensitive belt 18y.

Then, it proceeds to a checking process for checking the phase of the seam position of the photosensitive belt 18y (step 15). At step 15, the seam position of the photosensitive belt 18y is examined in a manner similar to that of step 11. As a result, in the case where the seam mark of the photosensitive belt 18y is not detected and thus the position of the seam position is out of phase, the phase restoring control operation for locating the seam at a predetermined position is carried out. That is, also in the case of the photosensitive belt 18y, if the seam mark of the photosensitive belt 18y is not located at the position where the associated seam sensor 55y is disposed and thus the seam mark is not located at a predetermined position, the seam sensor 55y cannot detect the seam photosensitive belt 18y, thereby outputting "0" as its output in place of "1". In this case, since the condition of "YES" ($55y=1$) is not attained at step 15, it proceeds to step 16, where the photosensitive belt drive motor 50y is turned on to carry out the phase restoring control operation of the seam position. After having the photosensitive belt drive motor 50y turned on, it again enters the process for checking the seam mark at step 17, thereby applying a dynamic weight to wait until the seam mark is found. During this time period, the photosensitive belt 18y continues its movement by the photosensitive belt drive motor 50y, and when the seam mark has reached a predetermined position where the seam sensor 55y is disposed, the seam sensor 55y supplies "1" as its output, so that it goes out of a loop including step 17. And, then, the photosensitive belt drive motor 50y is turned off (step 18) to thereby stop to drive the photosensitive belt 18y, thereby terminating the phase restoring control operation as to positioning of the seam mark of the photosensitive belt 18y. Similarly with the before-mentioned step 11, at step 15, if the seam mark of the photosensitive belt 18y is located at a position where the seam sensor 55y is disposed and thus the seam mark is located at a predetermined position, it proceeds from the checking process (step 15) to the checking process (step 19) of the next photosensitive belt 18y.

Then, it proceeds to the checking process (step 19) for checking the phase of the seam position of the photosensitive belt 18m and its phase restoring control operation, and, then, it proceeds to the checking process (step 23) for checking the phase of the seam position of the photosensitive belt 18c and its phase restoring control operation. The checking process (step 19) for checking the seam position phase of the photosensitive belt 18m and the following seam position phase restoring control processes (steps 20 through 22) are similar to those, including the seam position phase checking process (step 11) and the following seam position phase restoring control processes (steps 12 through 14) for the photosensitive belt 18y and the seam position phase checking process (step 15) and the following seam position restoring control processes (steps 16 through 18) for the photosensitive belt 18y, so that its detailed description will not be repeated. At step 19, if the seam mark of the photosensitive belt 18m is located at a position where the seam sensor 55m is disposed and thus the seam mark is located at a predetermined position, it proceeds from the checking process (step 19) to the checking process (step 23) for the next photosensitive belt 18c. The checking process (step 23) for checking the seam position phase of the photosensitive belt 18c and the following seam position phase restoring control processes (steps 24 through 26) are also similar to those described with respect to photosensitive belts 18bk, 18y and 18, so that its detailed description will not be repeated here.

In this manner, the seam mark provided in the vicinity of the seam of each of the photosensitive belts 18bk, 18y, 18m and 18c corresponding to recording color is checked by the corresponding one of the seam sensors 55bk, 55y, 55m and 55c, and based on the result of the checking, a series of phase restoring control operations for restoring the seam to a predetermined position is carried out. This is carried out during the standby time period other than the image processing or copying operation. Upon completion of this inter-belt phase adjusting process (step 10) including a series of seam position checking and seam position phase restoring control operations, other processes (step 27), which have not been carried out during the standby processing, are carried out and then the standby processing is terminated. Thereafter, it returns to the main routine, so that, until the copy start key is turned on (step 4), such operations as reading the status of switches and sensors (step 2), standby process (step 3) and checking of the copy start key (step 4) are repetitively carried out, and, when the copy start key has been turned on (step 4), it proceeds to step 5, whereby an ordinary copy operation control process (step 5) is carried out.

The above-described inter-belt phase adjusting processing is carried out while the photosensitive belts are at rest; however, this inter-belt phase adjusting processing can also be carried out while the photosensitive belts are in motion. It is only necessary to carry out this inter-belt phase adjusting process while the photosensitive belts do not participate in an image forming operation. Thus, if the photosensitive belts are being driven during the standby processing time period of the image processing apparatus, and if the seam sensors do not detect the seam marks of the respective photosensitive belts at the same time at a predetermined timing, when each of the seam sensors detects the corresponding seam mark, the corresponding photosensitive belt is brought to a halt to carry out the phase adjustments among the photosensitive belts.

Figure 17B:
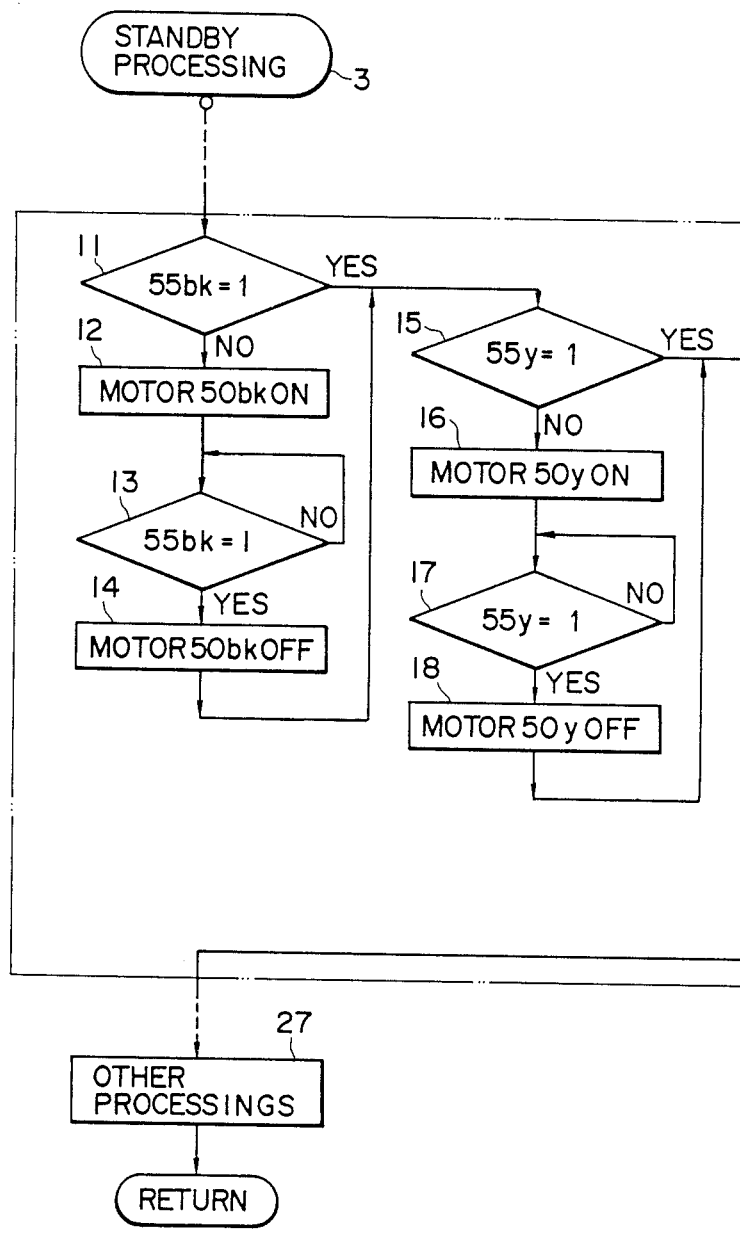
FIG. 17b is an illustration showing how to combine FIGS. 17b(I) and 17b(II)
Figure 17C:
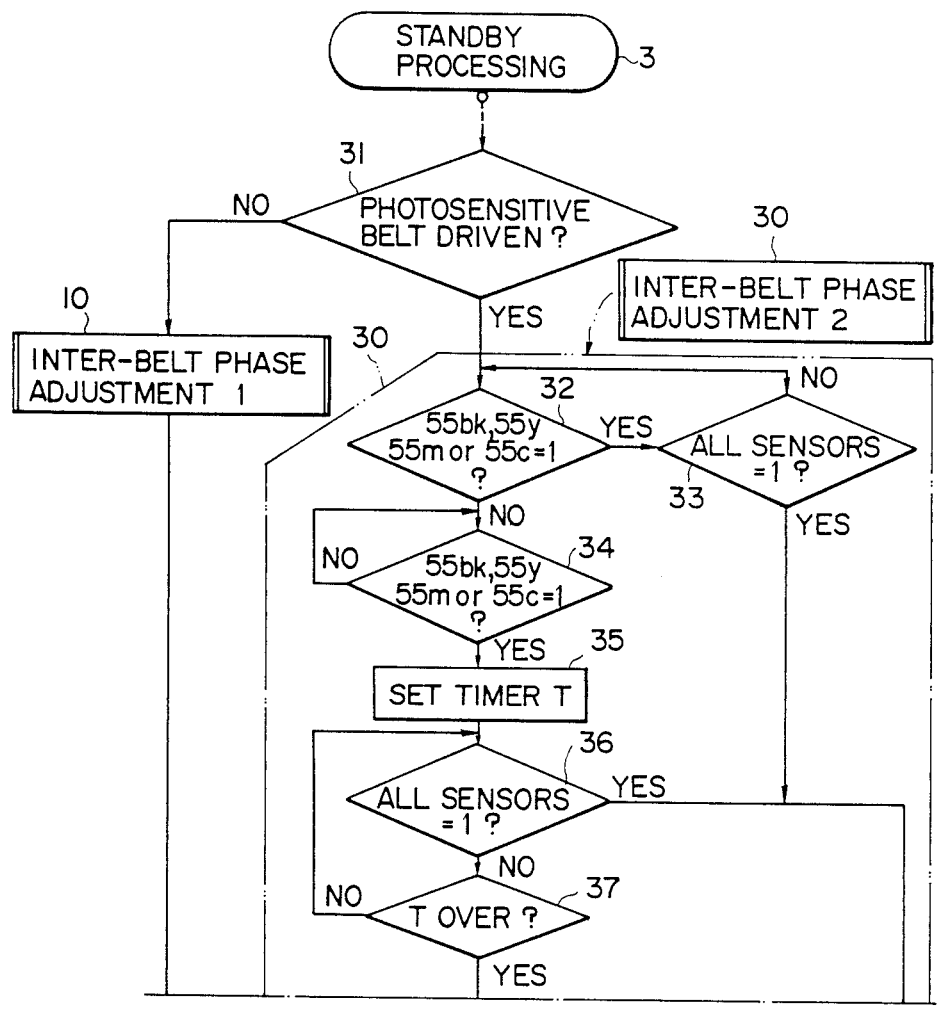
FIG. 17c is an illustration showing how to combine FIGS. 17c(I) and 17c(II)

Referring now to FIGS. 17c(I) and 17c(II), another embodiment for carrying out the inter-belt phase adjusting operation, including the case in which the photosensitive belts are being driven, will be described. As described with reference to FIG. 17b, during the standby processing (step 3), the status of each of the various keys is read, and, based on the status thus read, it goes through the processes, such as setting of the number of copies, clearing of the number of copies, selection of a paper feeding system, setting of a copy mode and setting of a magnification ratio, and when it reaches the inter-belt phase adjusting processing, in the embodiment shown in FIG. 17c, in the first place, at step 31, it is first determined whether or not the photosensitive belts are being driven. If it has been found that the photosensitive belts are not driven (step 31), then the inter-belt phase adjusting processing 1 (step 10) for the case in which the photosensitive belts are not driven as described with respect to FIG. 17b is carried out. Then, upon completion of the inter-belt phase adjustment processing, other processings (step 27) during the standby state are carried out, followed by the step of returning to the main routine. On the other hand, at step 31, if it has been found that the photosensitive belts are being driven, an inter-belt phase adjustment processing (step 30) for the case in which the photosensitive belts are being driven is carried out. This inter-belt phase adjustment processing 2 is the processing to be carried out while the photosensitive belts are in motion, so that using the time when the seam sensors 55bk, 55y, 55m and 55c detect the respective seam marks as a reference point in time, the seam position phase is checked based on this reference point. If the seam sensors 55bk, 55y, 55m and 55c do not detect the respective seam marks at the same time at a predetermined timing, with the timing for the respective seam sensors 55bk, 55y, 55m and 55c to detect the respective seam marks, the respective photosensitive belts are brought to a halt to carry out the inter-belt phase adjustment operation. That is, in the case where the photosensitive belts are in motion (step 31), it proceeds to the inter-belt phase adjustment process 2 (step 30) for carrying out the position phase adjustment among the photosensitive belts in motion.

At step 32, when any of the seam sensors 55bk, 55y, 55m and 55c has detected the corresponding seam mark, it is determined whether or not all of the seam sensors 55bk, 55y, 55m and 55c have detected the respective seam marks (and thus supplied "1" as their output) at the same time (step 33), and if "1" has been output from all of the seam sensors 55bk, 55y, 55m and 55c at the same time, since this is the case in which all of the photosensitive belts are in phase, it goes out of this process to carry out the other processes (step 27) and then to return to the main routine. At step 32, it awaits until any of the seam sensors 55bk, 55y, 55m and 55c has detected the corresponding seam mark (step 34), and if the corresponding seam mark has been detected, it goes out of this step 34 and set a timer T (step 35). This timer T is a timer which sets a time period which is slightly longer than the time period required for the photosensitive belts 18bk, 18y, 18m and 18c to complete its round run. And it continues to detect whether or not "1" has been output from all of the seam sensors 55bk, 55y, 55m and 55c at the same time until this timer T counts time over. During this time period, if "1" has been output from all of the seam sensors 55bk, 55y, 55m and 55c at the same time, since all of the photosensitive belts are in phase in this case, it goes out of this process to carry out other processes (step 27), followed by the step of returning to the main routine. If "1" has not been output from all of the seam sensors 55bk, 55y, 55m and 55c at the same time even once until the timer T has become time over, since this indicates the presence of a phase difference among the photosensitive belts in this case, the inter-belt phase adjustment processing is carried out. In the first place, it is checked whether or not the same sensor 55bk has output "1" (step 38), and if "1" has not been output, it proceeds to the next step; on the other hand, if "1" has been output, the corresponding photosensitive belt 18bk is brought to a halt (step 39) and then it proceeds to the next step. Then, it is checked whether or not the seam sensor 55y has output "1" (step 40), and if "1" has not been output, it proceeds to the next step; on the other hand, if "1" has been output, the corresponding photosensitive belt 18y is brought to a halt and then it proceeds to the next step. And, then, it is checked whether or not the seam sensor 55m has output "1" (step 42), and if "1" has not been output, it proceeds to the next step; whereas, if "1" has been output, the corresponding photosensitive belt 18m is brought to a halt (step 43) and then it proceeds to the next step. Then, it is checked whether or not the seam sensor 55c has output "1" (step 44), and if "1" has not been output, it proceeds to the next step; on the other hand, if "1" has been output, the corresponding photosensitive belt is brought to a halt (step 45), thereby terminating the processing for each of the photosensitive belts. Under the condition, if all of the photosensitive belts 18bk, 18y, 18m and 18c are at rest (step 46), the inter-belt phase adjustment operation is complete; however, if "1" has not been output at steps 38, 40, 42 and 44, it has proceeded to the next step, whereby the photosensitive belts are not at rest (step 46), so that these steps 38 through 45 are repeated.

At step 46, if all of the photosensitive belts 18bk, 18y, 18m and 18c are at halt, since the phase adjustments among the photosensitive members are completed, all of the photosensitive belts 18bk, 18y, 18m and 18c are driven (step 47) to restore the conditions of the photosensitive belts to the original conditions, thereby terminating the inter-belt phase adjustment 2 processing. And, upon completion of the inter-belt phase adjustment processing (step 10), other processings (step 27) in the standby process, which have not yet been carried out, are carried out and then the standby process is terminated.

And, again, it goes back to the main routine, thereby repeating the steps of reading the status of switches and sensors (step 2), standby processing (step 3) and determination of whether or not the copy start key has been depressed (step 4) until the copy start key is turned on (step 4). When the copy start key has been turned on (step 4), it proceeds to step 5 to thereby carry out the ordinary copy control processing (step 5).

Figure 6B:
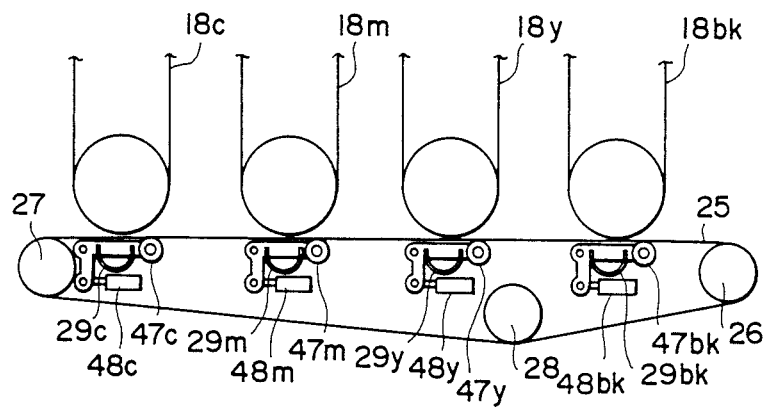

In the above-described embodiment, a seam mark is provided for each of the photosensitive belts 18bk, 18y, 18m and 18c. On the other hand, if the seam sensors 55bk, 55y, 55m and 55c provided at respective positions are sufficiently high in sensitivity to detect a seam itself of each of the photosensitive belts, then there is no need to provide a seam mark because each of the seam sensors can detect a seam of the corresponding belt. In addition, in the above-described embodiment, it is so structured that a copy of black mono-color can be made other than a full color copy; however, it may also be so structured that not only full color and black mono-color copies, but also mono-color copies of any other color than black and color copies of less than full color can be made. The paper feeding system can supply recording paper having an appropriate quality depending on a copy mode set or selected. FIG. 6b illustrates one embodiment of such a paper feeding system. In the structure shown in FIG. 6b, in order to cause the image transfer belt 25 to be brought into contact with the photosensitive belts 18bk, 18y, 18m and 18c selectively, there are provided four idle rollers 47bk, 47y, 47m and 47c and solenoids 48bk, 48y, 48m and 48c for driving the respective idle rollers to their contact positions. In the case of a full copy copy mode, all of the solenoids 48bk, 48y, 48m and 48c are energized, so that the image transfer belt 25 is brought into contact with all of the photosensitive belts. In the case where only the solenoid 48bk is energized, there is established a yellow mono-color copy mode. On the other hand, if only solenoid 48m is energized, a magenta mono-color copy modes is established. While, if only the solenoid 48c is energized, a cyan mono-color copy mode is established. On the other hand, a copy mode of any combinations of two or more colors can also be established. For example, in the case where s 48y, 48m and 48c are all energized at the same time, there is established a full color copy mode. If any two of these solenoids are energized at the same time, there is established a two-color copy mode, in which two images of two different colors are superimposed.

FIG. 18 illustrates an image reading unit which is constructed in accordance with a further embodiment of the present invention and which employs a unit magnification type image sensor as opposed to the size reduction type image sensor (CCD) 7 employed in the image processing system shown in FIG. 1. As shown in FIG. 18, the image reading unit includes a platen or contact glass plate 502 for placing thereon an original 501 to be read. A pair of fluorescent lamps $503_1$ and $503_2$ is provided to illuminate the surface of the original 501 on the platen 502. A convergent light transmitting element array 505 is provided for leading the light reflecting from the original 501 onto a color solid-state image sensor 507. The fluorescent lamps 503, array 505 and the image sensor 507 are all mounted on a carriage 508. Also provided is a carriage drive motor 510 having a drive shaft on which a carriage drive pulley 511 is fixedly attached. A wire 512 is wound around the carriage drive pulley 511 and extended around pulleys 513a and 513b which are rotatably supported on pulley shafts 514a and 514b, respectively, which, in turn, are fixedly mounted on a frame of the present reading unit. Also provided are a carriage home position sensor 539 and a carriage guide cover 540.

The present embodiment shown in FIG. 18 differs from the embodiment shown in FIG. 1 in that, in the present embodiment of FIG. 18, there is provided only one carriage 508 on which the fluorescent lamps $503_1$ and $503_2$, convergent light transmitting element array 505 (which may be replaced by a lens array) and the unit magnification type image sensor 507. The carriage 508 includes a portion 508a to which the both ends of the wire 512 are fixedly attached. Thus, the carriage 508 is moved in the auxiliary scanning direction, i.e., to the left in the forward direction and to the right in the backward or return direction in FIG. 18, as driven by the wire 512.

Figures 19, 19I:
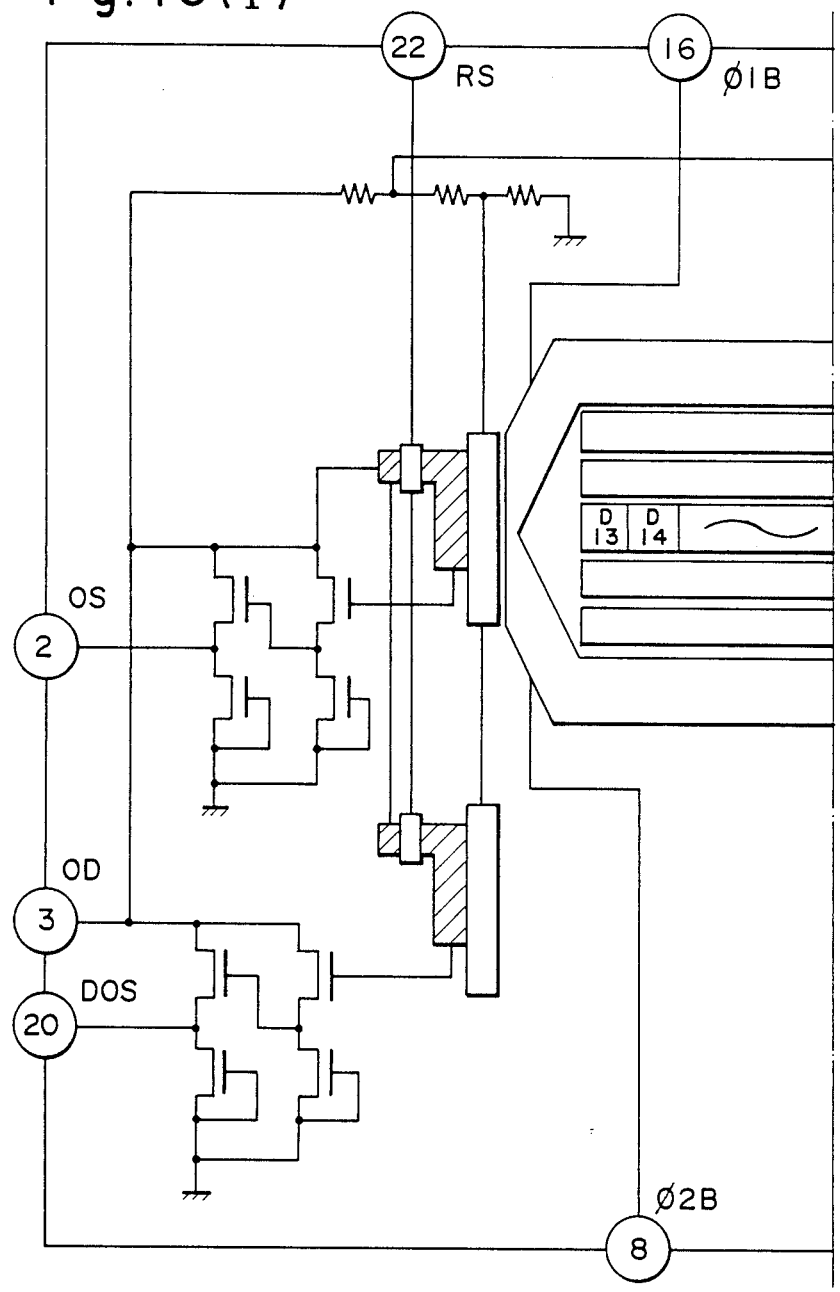
Figure 19:
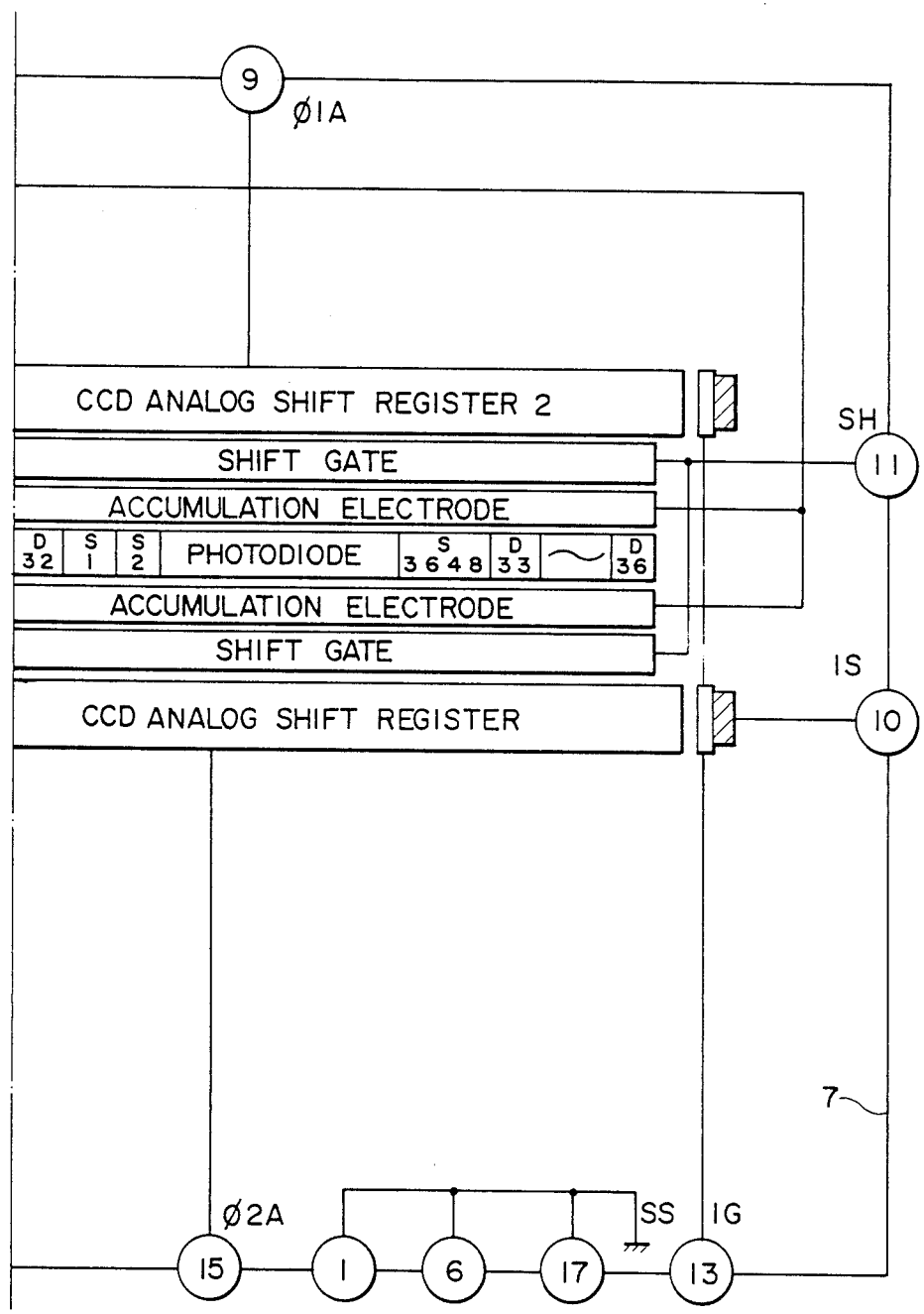
FIG. 19 is an illustration showing how to combine FIGS. 19(I) and 19(II)

The color image sensor 7 provided in the image processing apparatus shown in FIG. 1 has a detailed structure shown in FIGS. 19(I) and 19(II). The image sensor 7 includes a number of photodiodes arranged in the form of a single array at a predetermined pitch, including dummy photodiodes $D_{13}$ through $D_{31}$ and active photodiodes $S_1$ through $S_{3648}$, each of which is generally square in shape and has a size of 8 microns by 8 microns. The pitch of the array is, for example, at 8 microns. If the image forming magnification ratio of the lens 5 is 0.118, this pitch is equivalent to 0.0625 mm on the surface of the original 1. Each of the photodiodes is provided with a filter of a particular color. In the illustrated embodiment, filters of G (transmitting green color), B (transmitting blue color) and R (transmitting red color) are arranged along the longitudinal direction of the photodiode array repetitively. For example, these three color filters are arranged in the order of $S_1(G)$, $S_2(B)$, $S_3(R)$, $S_4(G)$, ..., $S_{3646}(G)$, $S_{3647}(B)$, and $S_{3648}(R)$. The following table 1 shows the designation of each of the pins shown in FIGS. 19(I) and 19(II).

TABLE 1

| | |
|---|---|
| ⌀1A | CLOCK (1st phase) |
| ⌀2A | CLOCK (2nd phase) |
| ⌀1B | FINAL STAGE CLOCK (1st phase) |
| ⌀2B | FINAL STAGE CLOCK (2nd phase) |
| SH | SHIFT GATE |
| RS | RESET GATE |
| OS | OUTPUT TRANSISTOR SOURCE |
| DOS | COMPENSATING OUTPUT TRANSISTOR SOURCE |
| OD | OUTPUT TRANSISTOR DRAIN |
| SS | SUBSTRATE (GROUND) |
| IS | INPUT SOURCE (TEST PIN) |
| IG | INPUT GATE (TEST PIN) |
| NC | NO CONNECTION |

Now, referring to FIG. 20, a relationship between the original 1 and the CCD 7 will be explained. A black and white two-part pattern A on the original 1 becomes a pattern B when focused on the CCD 7 because the value of MTF (Modulation Transfer Function) of an image forming system, including the lens 5 and mirrors $4_1$, $4_2$ and $4_3$, approaches from "1" to "0" as the spatial frequency increases. Denoting the black level by "0" and the white level by "1", the output from each of the light-receiving elements (photoelectric elements or photodiodes in the illustrated embodiment) will be as shown in the following table 2.

TABLE 2

| Group n-2 | | | Group n-1 | | | Group n | | | Group n+1 | | |
|---|---|---|---|---|---|---|---|---|---|---|---|
| $G_{n-2}$ | $B_{n-2}$ | $R_{n-2}$ | $G_{n-1}$ | $B_{n-1}$ | $R_{n-1}$ | $G_n$ | $B_n$ | $R_n$ | $G_{n+1}$ | $B_{n+1}$ | $R_{n+1}$ |
| 0 | 0 | 0 | 0.4 | 1.3 | 2.5 | 4.1 | 6 | 7.8 | 8.8 | 9.6 | 10 |

On the other hand, in a digital image processing system, such as a digital copier, in principle, three primary color information, i.e., R, G and B color signals, for the same point or pixel on the original 1 is required. In the black and white pattern shown in FIG. 20, the three adjacent photodiodes for the three adjacent G, B and R filters form a group and the G, B and R output from these photodiodes of the same group should be same in quantity in G, B and R. Otherwise, there will be a distortion in color balance in a group. In reality, G, B and R outputs from the photodiodes of the same group differ from one another as indicated in the above Table 2, and there is a color balance distortion up to 37%. Thus, if these G, B and R outputs are directly supplied to the inputs 6r, 6g and 6b of the scanner interface 6 as they are, there will be a problem, in particular, at black separating processing 104, masking processing 106 and UCR processing 107. As a result, for a black and white original, there will be produced a copy with coloring along the periphery of a black image. Such a peripheral coloring stems from the color balance distortion among the adjacent photodiodes.

It is to be noted that the distorted image B of the original image A is formed on the image sensor 7 because the original image A is focused on the image sensor 7 through an optical system including the lens 5. As an alternative approach, the original image A may be directly formed on the image sensor 7 if use is made of a direct reading type image sensor, such as an amorphous one-to-one image sensor. In this alternative approach, since the original image is directly read by the image sensor without using an optical system inbetween, the original image A may be formed on the image sensor. Even in this case, since one filter of a particular color is provided for a corresponding photodiode, there will still be a color balance distortion problem for the group n. That is, assuming that the original image A is formed on an image sensor of the direct reading type, all of the G, B and R outputs from all of the groups excepting group n will have the same value, and, thus, there will be no problem of color balance distortion. However, for group n, the photodiode with the G filter will receive light of the black level and the photodiodes with B and R filters will receive light of the white level, so that G, B and R outputs from group n will be distorted in color balance. Such a color balance distortion problem arises from the fact that each of the photodiodes of the image sensor determines a pixel to be read on an original; however, since a filter of a particular color is provided for each photodiode, two or more color components of the same pixel cannot be read. That is, a photodiode with a G filter can obtain the information of a G color component of the pixel read by this photodiode. Similarly, a photodiode of B or R filter can obtain the information of a B or R color component of the pixel read by the photodiode with B or R filter. Since the three photodiodes with G, B and R filters, respectively, are arranged side-by-side and each of the photodiodes determines a pixel on an original, these three photodiodes can obtain three different color information from three different pixels on the original arranged side-by-side.

In accordance with the present invention, information of two or more color components of the same pixel is obtained. In principle, in an image sensor having a plurality of photoelectric elements arranged in the form of an array and each provided with a filter of a particular color, information of only one color component of a pixel on an original image can be obtained. However, in accordance with the principle of the present invention, using information obtained by one or more other photoelectric elements having filters of different colors, information of two or more other color components of the same pixel is obtained. In one embodiment of the present invention, an image sensor includes three different color filters and a first color component of a pixel of interest is obtained by a first photoelectric element having a first color filter. And, a second color component of the pixel of interest is deduced or calculated in a predetermined manner from two second photoelectric elements each provided with a second color filter and located on opposite sides of the first photoelectric element. Similarly, a third color component of the pixel of interest is deduced or calculated in the predetermined manner from two third photoelectric elements each provided with a third color filter and located on opposite sides of the first photoelectric element.

Depending on the nature of the optical system through which the light from the original image passes through to reach the image sensor, the manner of deduction or calculation may be determined optimally. For example, predetermined coefficients are stored in the form of a ROM table and these coefficient are applied to the information obtained from the pairs of second and third photoelectric elements to obtain second and third color component information of the pixel of interest. This aspect of the present invention will be described further in detail below.

As described previously, the black and white original image A becomes the distorted image B when the original image A is focused onto the image sensor 7 through the optical system including the lens 5 of the apparatus shown in FIG. 1. As indicated in Table 2, G, B and R outputs from groups n−1, n and n+1 are distorted in color balance. In one embodiment of the present invention, the distorted image B may be approximated by a linear line. Described more in detail, with reference to FIGS. 21a through 21d, let us first assume that the center of a pixel of interest on the original 1 to be read is indicated by 1b and the position and output from a photoelectric element of the color image sensor 7 are indicated by, in the first direction:
G: $X_{G1}$ and $G_1$
B: $X_{B1}$ and $B_1$
R: $X_{R1}$ and $R_1$ in the second direction:
G: $X_{G2}$ and $G_2$
B: $X_{B2}$ and $B_2$
R: $X_{R2}$ and $R_2$ Here, the output from a photoelectric element if the center of the photoelectric element is located immediately above the center 1b of the pixel of interest is denoted by $G_0$, $B_0$ and $R_0$.

Denoting desired values for respective colors by G, B and R, these may be expressed in the following manner.

$$G = (X_{G2}/(X_{G1}+X_{G2}))\cdot G_1 + (X_{G1}/(X_{G1}+X_{G2}))\cdot G_2$$

$$B = (X_{B2}/(X_{B1}+X_{B2}))\cdot B_1 + (X_{B1}/(X_{B1}+X_{B2}))\cdot B_2$$

$$R = (X_{R2}/(X_{R1}+X_{R2}))\cdot R_1 + (X_{R1}/(X_{R1}+X_{R2}))\cdot R_2$$

Figure 20:
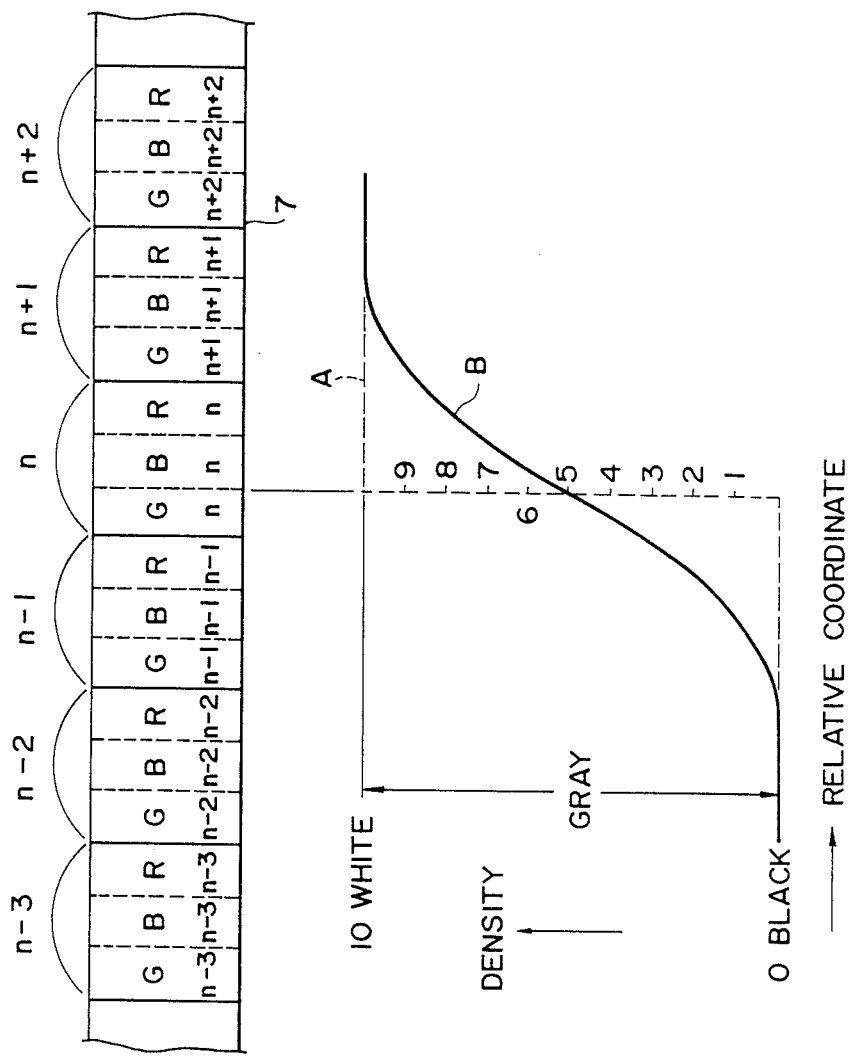
FIG. 20 is an illustration showing in its upper half an example of arrangement of green (G), blue (B) and red (R) color-separating filters in the image sensor 7 and also graphically showing in its lower half how a light distribution is varied when an original image A is focused on the image sensor as indicated by B.

For example, in FIG. 20, if calculations are made with the center of a pixel of interest corresponds to the center of a group of interest, we can obtain the following table 3.

TABLE 3

| Group n-2 | | | Group n-1 | | | Group n | | | Group n+1 | | |
|---|---|---|---|---|---|---|---|---|---|---|---|
| G | B | R | G | B | R | G | B | R | G | B | R |
| 0.13 | 0 | 0 | 1.66 | 1.3 | 1.66 | 5.8 | 6 | 5.9 | 9.3 | 9.5 | 9.3 |

Figure 21A:
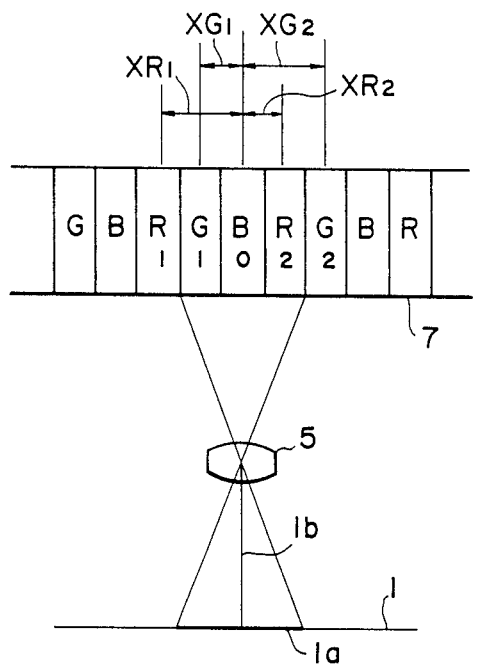
Figure 21B:
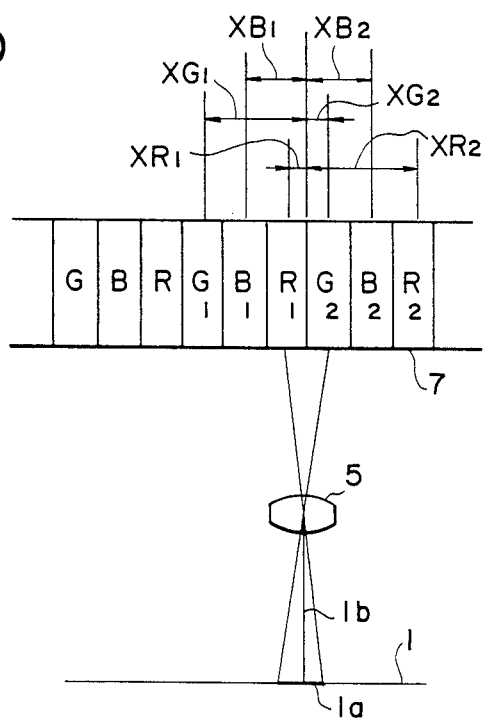
Figure 2L:
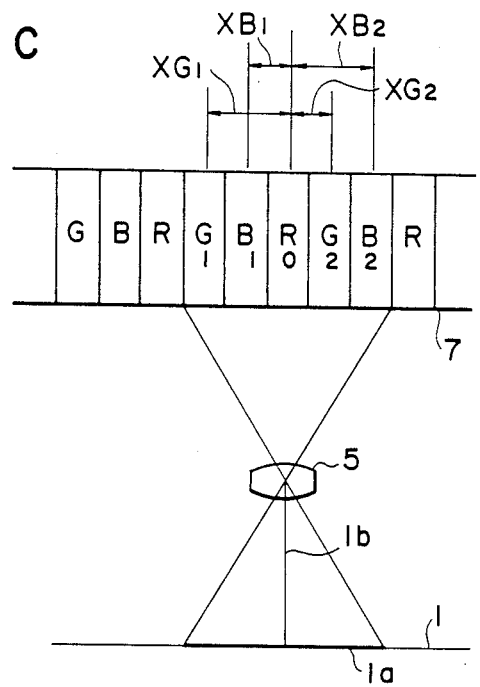
Figure 2L:
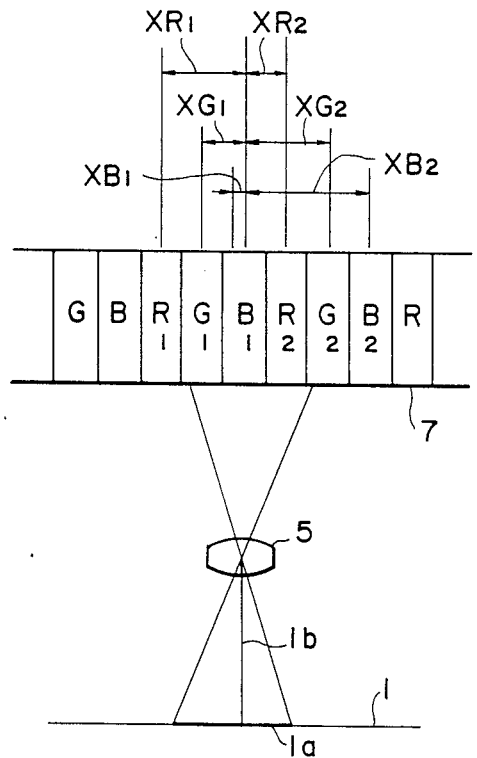

From the results shown in table 3, it is seen that the color balance distortion is 3.3% at maximum, which is significantly improved over 37% without correction. It is to be noted that the results of table 3 are obtained from the case shown in FIG. 21a, in which the center of a pixel of interest on the original 1 coincides with the center of a group of three photodidodes, in particular the center of a center photodiode having a B filter. It should be noted that the present invention may also be applied to any other cases shown in FIGS. 21b through 21d. That is, FIGS. 21b and 21d are the cases in which the center of a pixel of interest on the original 1 does not coincide with any of the photoelectric elements of the image sensor 7. On the other hand, FIG. 21c is the case in which the center of a pixel of interest on the original image 1 coincides with the center of a photoelectric element having a R filter of group 1.

Figure 22:
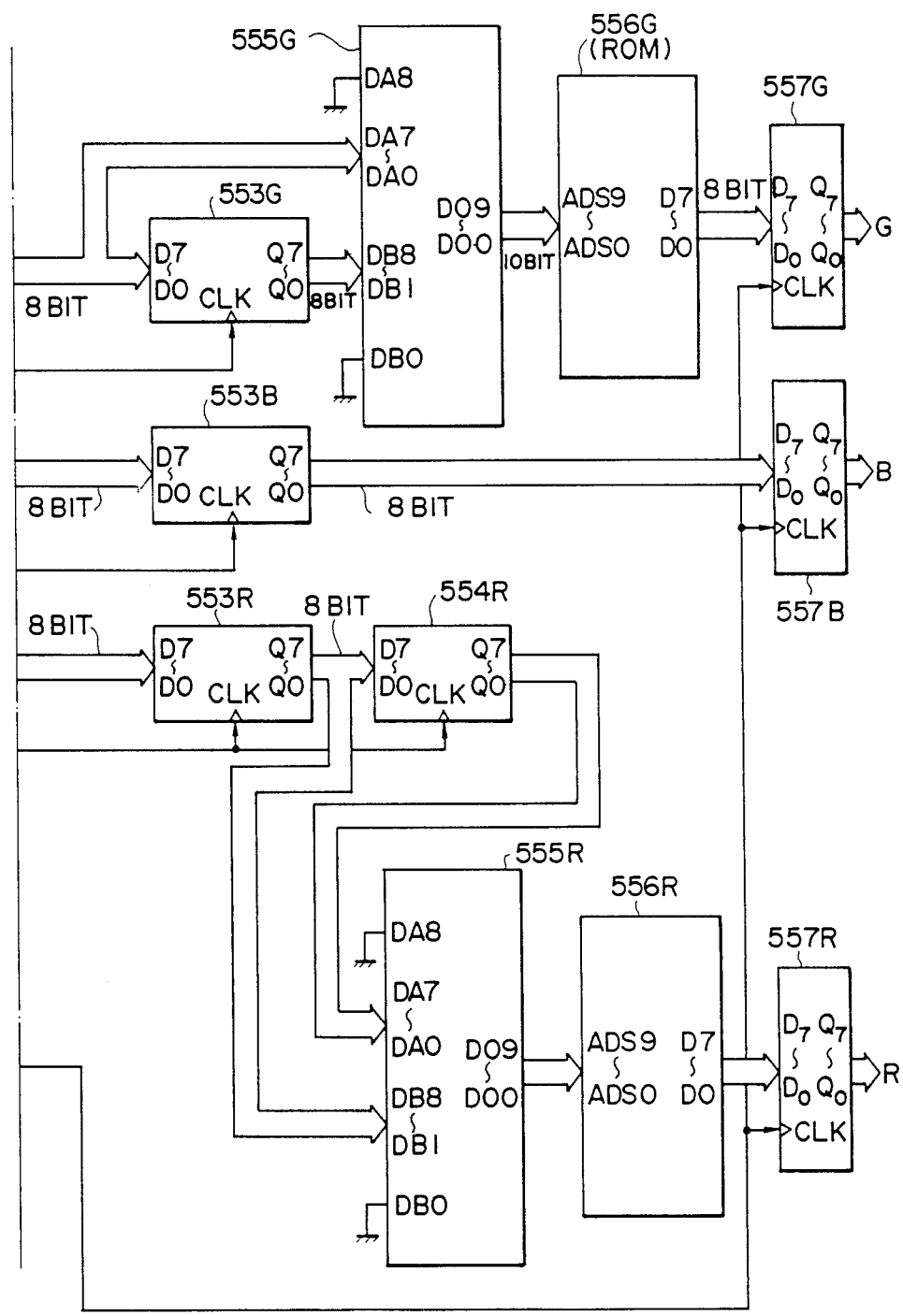
FIG. 22 is an illustration showing how to combine FIGS. 22(I) and 22(II)

Referring now to FIGS. 22(I) and 22(II), an embodiment of hardware for implementing the above-described algorithm or method of the present invention will be described. Here, it is assumed that the data for a pixel corresponding to a photoelectric element having a B filter is going to be corrected. Thus, this embodiment corresponds to the case shown in FIG. 21a. As shown in the timing chart of FIG. 23, when signals SH, φ1 (φ1A, φ1B), φ2 (φ2A, φ2B) and RS are supplied to the color image sensor 7, there is obtained an output from each cell or photoelectric element as indicated by signal OS. Here, valid signals are output in the order of $S_1(G)$, $S_2(B)$, $S_3(R)$, . . . , $S_{3648}(R)$. Thus, sample and hold signals GSH, BSH and RSH are supplied from a timing pulse generating circuit 551 to analog sample and hold circuits 551G, 551B and 551R, respectively, at the timing shown in FIG. 23, so that analog signals of respective colors are supplied to the respective input terminals of respective A/D converters $552_G$, $552_B$ and $552_R$. Then, an $\overline{AD}$ & SHIFT signal is provided as indicated in FIGS. 23 and 24. At the rising edge of the $\overline{AD}$ & SHIFT signal, inputs to four data latches $553_G$, $553_B$, $553_R$ and $554_R$ are latched and output. At the rising edge of the pulse, an input value to the A/D converter is converted into a digital value. Thus, three color signals of R, G and B vary as indicated in FIG. 24. Here, the value of N indicated as a valid output data of G, B and R in FIG. 24 corresponds to output data of a sensor number Sn such that G: $N = (n+2)/3$ B: $N = (n+1)/3$ R: $N = n/3$.

Elements $555_G$ and $555_R$ are each 9-bit×2 input and 10-bit output adder. For G, there is obtained a sum between twice of nth output Gn (doubled because input with one bit shift at one of input terminals DB0–DB8 of $555_G$) and the (n+1)th output, which is then input into the address terminal of ROM $556_G$. At ROM $556_G$, ⅓ of the data of the address value is written in all of the addresses, and output G becomes as follows:

$$G = (2G_n + G_{n+1})/3 = (\tfrac{2}{3})G_n + (\tfrac{1}{3})G_{n+1}.$$

Similarly, for R, we have $$R = (2R_n + R_{n-1})/3 = (\tfrac{2}{3})R_n + (\tfrac{1}{3})R_{n-1}.$$

It is to be noted that, for the data of ROM, ⅓ of an address value is rounded.

For B, neither addition nor division is carried out and we have

B=B$_n$.

Figure 25I:
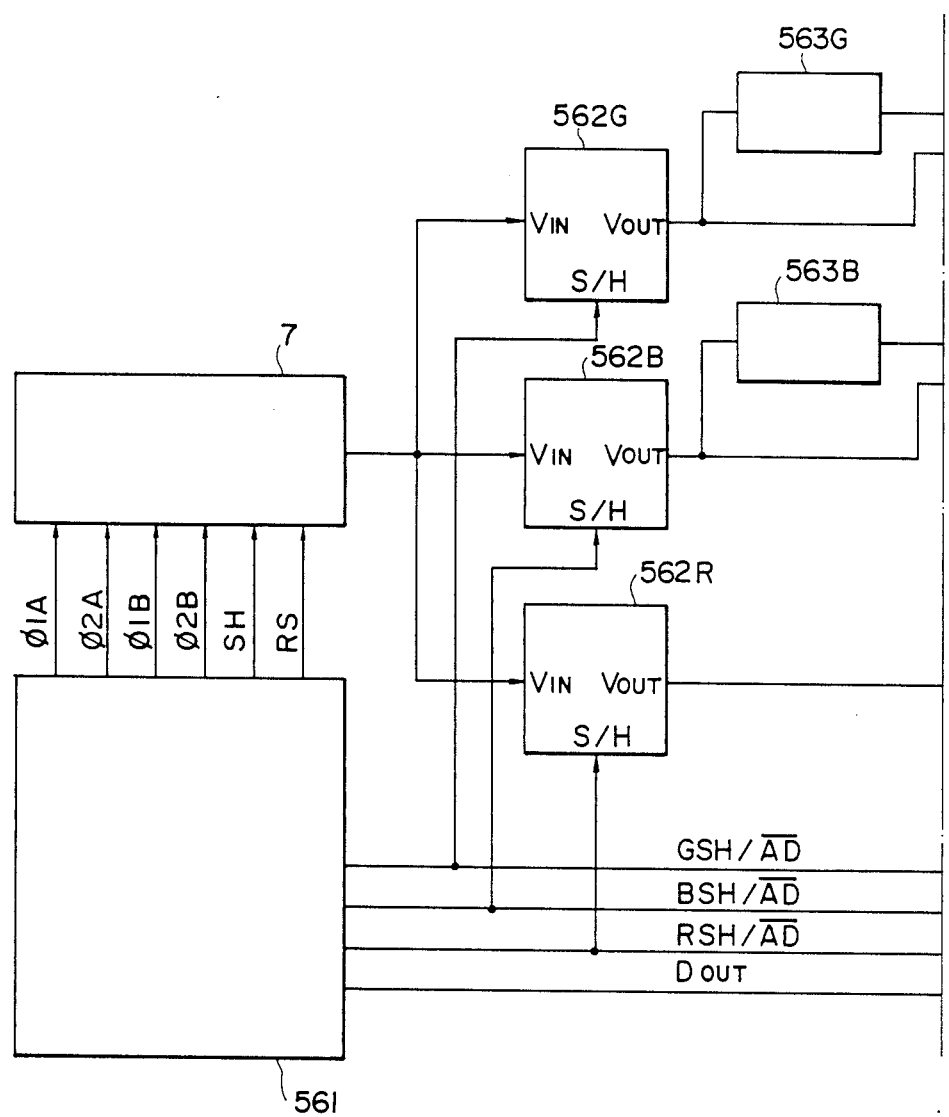
Figure 25:
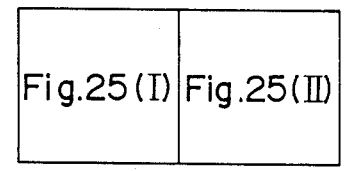
FIG. 25 is an illustration showing how to combine FIGS. 25(I) and 25(II)
Figure 25:
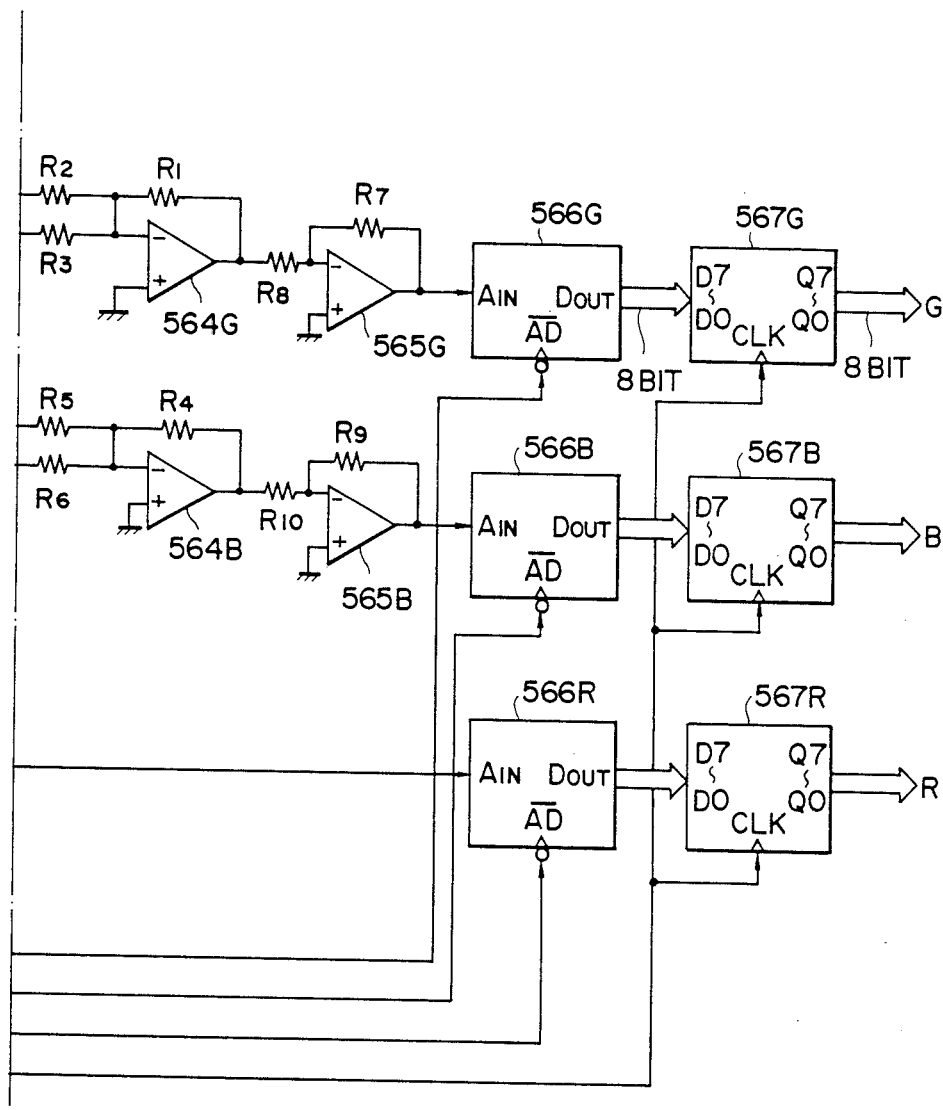

Therefore, when the clock pulse DOUT is supplied as shown in FIG. 24, an 8-bit data is output for G, B and R at the same time and input into the scanner interfaces 6r, 6g and 6b of FIG. 2, respectively. The shading correction circuit 101 of FIG. 2 has been already described, and such a shading correction may be carried out between 552$_G$, 552$_B$, 552$_R$ and 553$_G$, 553$_B$, 553$_R$. Another circuit example is shown in FIG. 25. In this case, since outputs from photoelectric elements are sampled and held by separate sample and hold circuits 562$_G$, 562$_B$ and 562$_R$, separately for green, blue and red, signals GSH, BSH and RSH are generated at a timing shown in FIG. 26. Delay lines 563$_G$ and 563$_B$ have a delay time of t$\theta$ which is the same as the time period of $\overline{\text{GSH/AD}}$, $\overline{\text{BSH/AD}}$. An element 564$_G$ and elements R$_1$, R$_2$ and R$_3$ (op-amp) and an element 565$_G$ and elements R$_7$ and R$_8$ (op-amp) constitute an adder, and, similarly, an element 564$_B$ and elements R$_4$, R$_5$ and R$_6$ (op-amp) and an element 565$_B$ and elements R$_9$ and R$_{10}$ (op-amp) constitute an adder. Resistors R$_1$ through R$_{10}$ have values to satisfy the following relationships.

R$_1$/R$_2$=1, R$_1$/R$_3$=2, R$_7$/R$_8$=⅓,

R$_4$/R$_5$=2, R$_4$/R$_6$=1, R$_9$/R$_{10}$=⅓.

Thus, we have output of 564$_G$: $-(G_n+2G_{n+1})$ output of 564$_B$: $-(2B_n+B_{n+1})$ output of 565$_G$: ⅓$(G_n+2G_{n+1})$ output of 565$_B$: ⅓$(2B_n+B_{n+1})$.

Accordingly, outputs of 565$_G$ and 565$_B$ become inputs to A/D converters 566$_G$ and 566$_B$. As a result, the data latch circuits 567$_G$, 567$_B$ and 567$_R$ supplies the following outputs.

$G=⅓G_n+⅔G_{n+1}$ $B=⅔B_n+⅓B_{n+1}$ $R=R_n$.

It is to be noted that this example is the case in which G and B data are corrected at the center of a photoelectric element having a R filter, so that this example corresponds to the case shown in FIG. 21c. A sample and hold function is carried out at the rising edge of signals $\overline{\text{GSH/AD}}$, $\overline{\text{BSH/AD}}$ and $\overline{\text{RSH/AD}}$, and an analog-to-digital conversion is carried out at the falling edge thereof.

Described more in detail with respect to the embodiment shown in FIG. 18, the detailed structure of the unity magnification type color image sensor 507 is illustrated in FIGS. 27, 28 and 31. FIG. 27a is a schematic plan view of the unity magnification type color image sensor 507 and FIGS. 27b and 27c are schematic front and side elevational views of the image sensor 507. In these figures, L$_0$ indicates an effective length, L$_1$ indicates an effective length of a chip 1, L$_2$ indicates an effective length of a chip 2, . . . , L$_5$ indicates an effective length of a chip 5. The chip 1 is located in the rear side of FIG. 18 and the chip 5 is located at the front side of FIG. 18. The photoelectric elements of the image sensor 507 are divided in five chips, and the light receiving surface of each of the photoelectric elements is inclined with respect to the optical scanning direction, as best shown in FIG. 28.

Figure 29I:
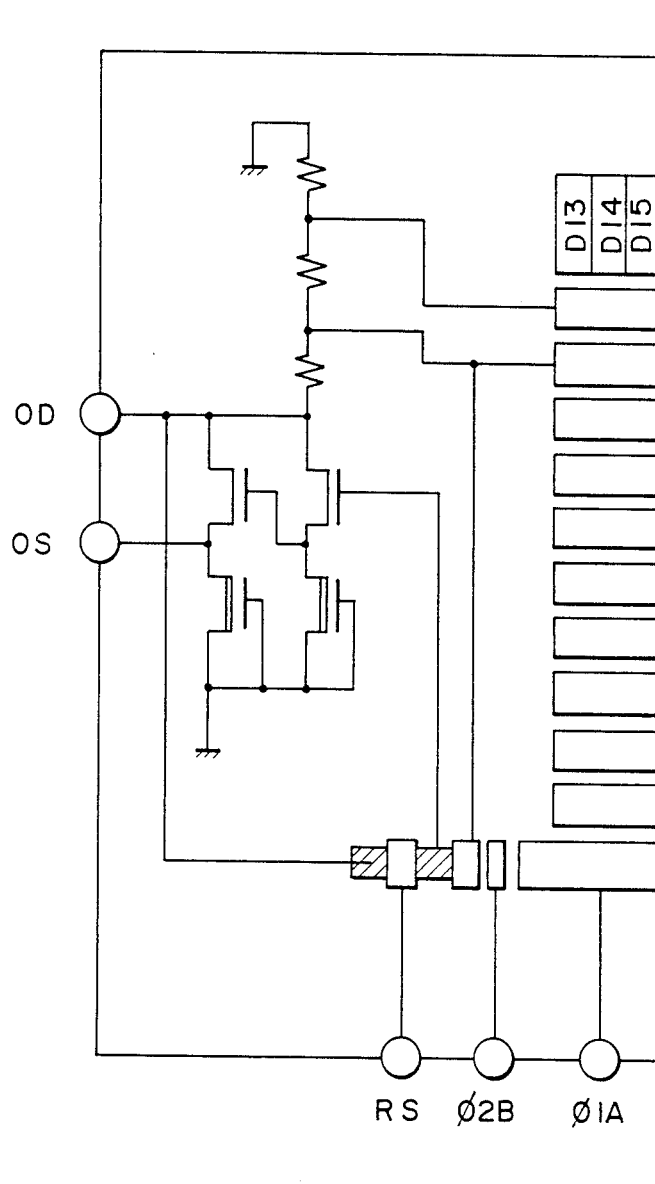
Figure 29:
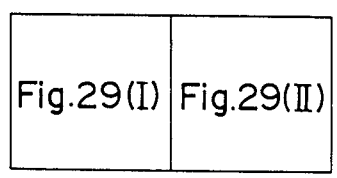
FIG. 29 is an illustration showing how to combine FIGS. 29(I) and 29(II)
Figure 29:
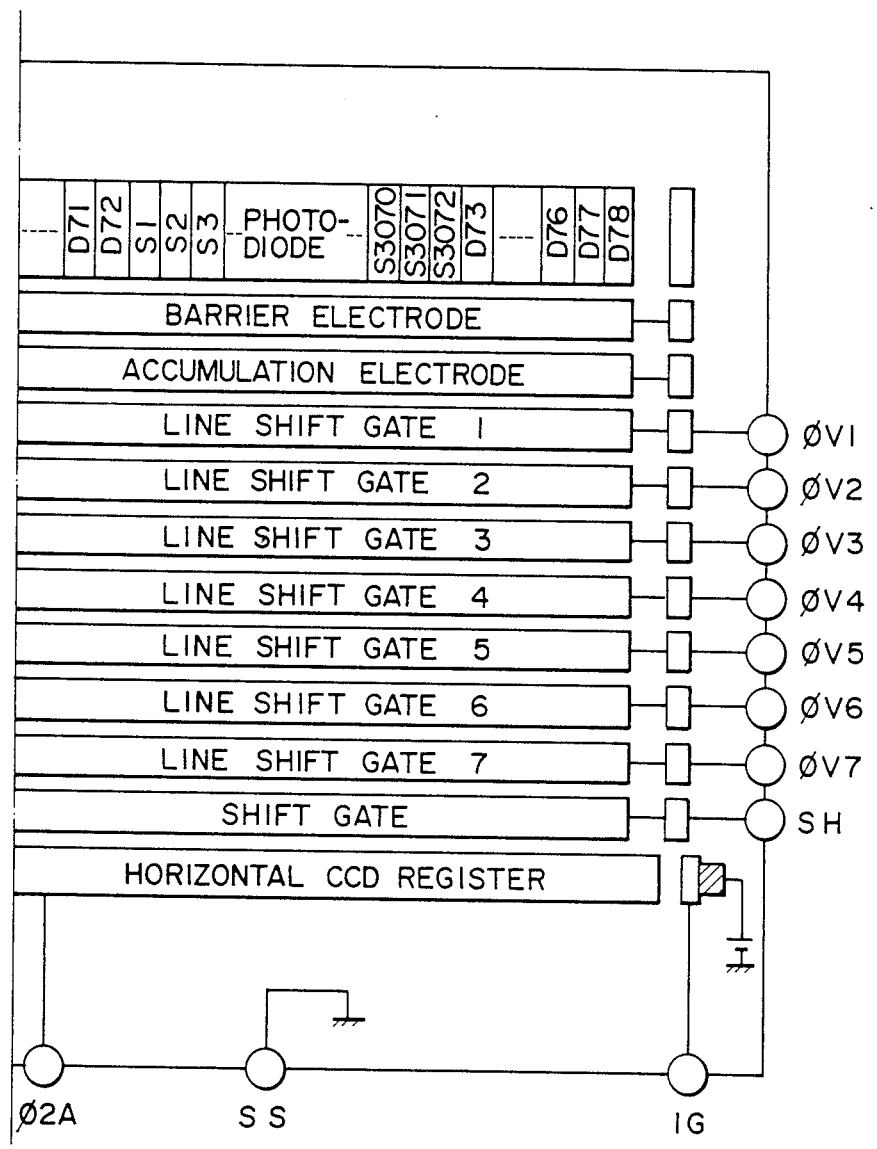
Figure 30I:
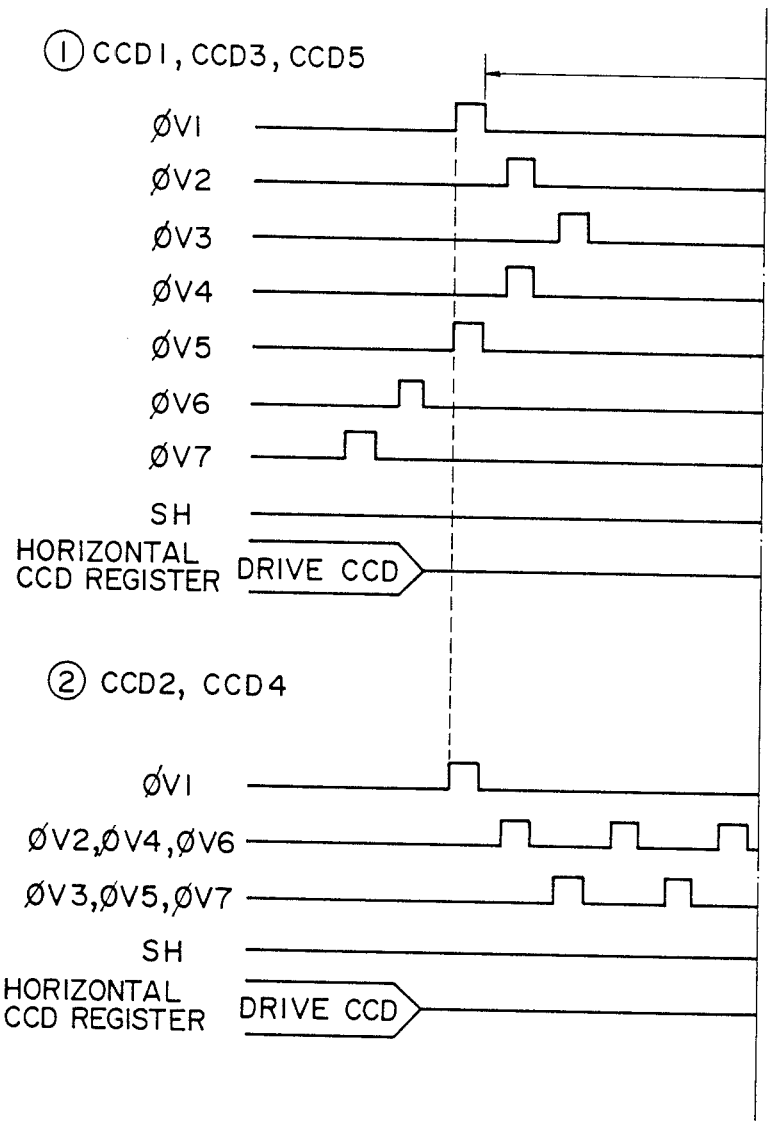
Figure 30:
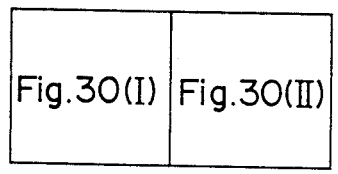
FIG. 30 is an illustration showing how to combine FIGS. 30(I) and 30(II)
Figure 30:
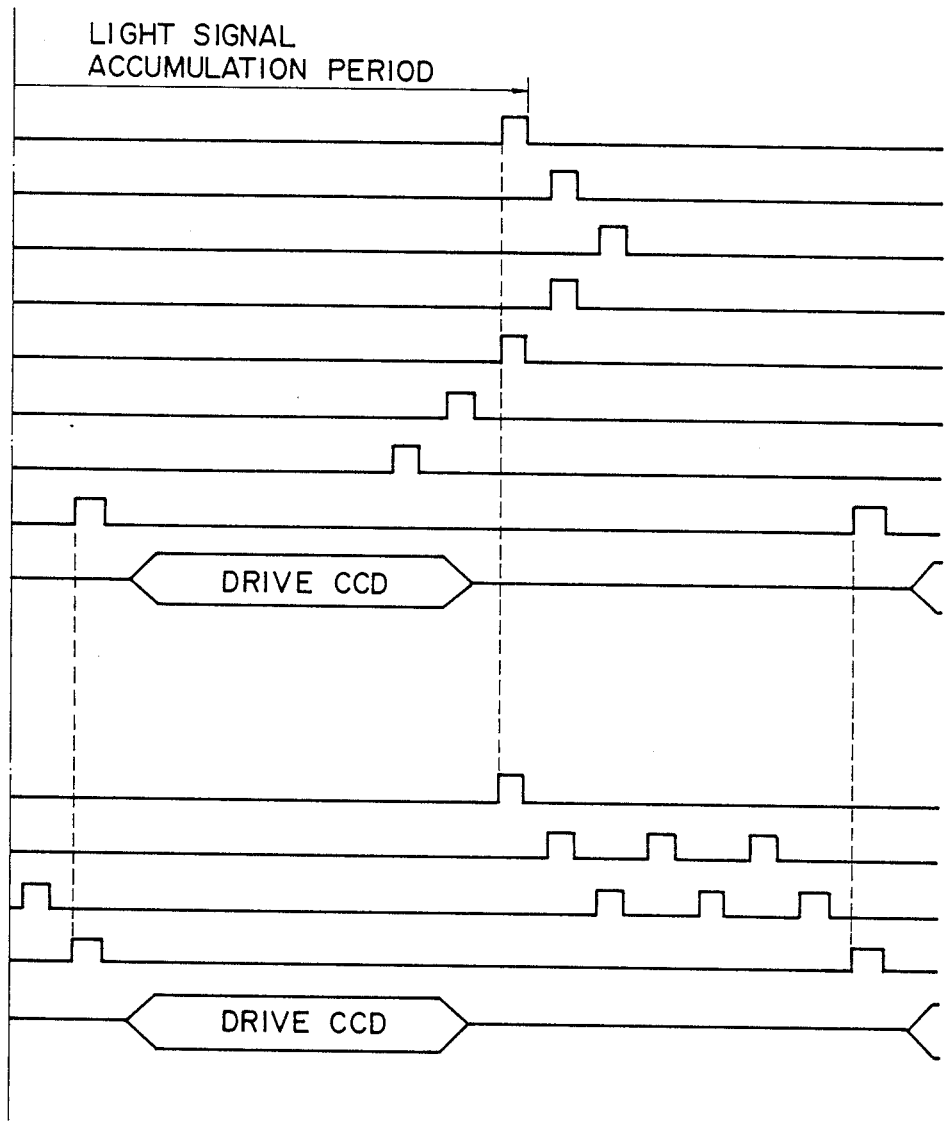

In applying the present invention to this example, as indicated in the timing chart of FIG. 30, CCD$_1$, CCD$_3$ and CCD$_5$ are driven with a delay of four lines with respect to CCD$_2$ and CCD$_4$, thereby obtaining outputs from respective chips at the same time. In addition, outputs from chips 1 through 5 of the color image sensor 507 in concert with time pulse generating circuit 581 are written in parallel in either set of two sets of memories 583a and 583b after passing through A/D converter 586 and demultiplexer 582 as shown in FIG. 31, while the data is serially output from the other memory to which no writing of data is carried out. Upon writing of all of the data, the write and read functions are switched between the two sets of memories. The following table 4 shows the designation of each of the pins illustrated in FIG. 29.

TABLE 4

| | |
|---|---|
| ∅1A | CLOCK (1st phase) |
| ∅02A | CLOCK (2nd phase) |
| ∅2B | FINAL STAGE CLOCK (2nd phase) |
| ∅V1 -V7 | LINE SHIFT GATE |
| SH | SHIFT GATE |
| RS | RESET GATE |
| OD | OUTPUT TRANSISTOR DRAIN |
| OS | OUTPUT TRANSISTOR SOURCE |
| SS | SUBSTRATE (GROUND) |
| IG | INPUT GATE (TEST PIN) |

In this manner, as an output of the multiplexer 84, there is obtained a total of 15,360 data (5,120 data for each color) in sequence for each line. Thus, thereafter, using a circuit similar to the latter half of the circuit shown in FIG. 22, where like reference numerals denote like elements correction may be carried out. Besides, since a shading correction circuit 585 with demultiplexer 587 is provided, the shading correction circuit 101 of FIG. 2 may be omitted.

Although the present invention has been described with respect to an image processing apparatus of the three color decomposition type, the present invention can be applied to any number of color decomposition type apparatus. In addition, in the above-described embodiments, color balance correction has been carried out by using two color data on opposite sides of a pixel of interest; however, four or six or more color data equally distributed on opposite sides of a pixel of interest may also be used to carry out a color balance correction. Besides, the present invention should not be limited only to an image sensor having a linear array. On the contrary, the present invention can also be applied to a two dimensional array image sensor. That is, the present invention is basically applicable to the case where two or more different color filters are arranged in a predetermined pattern with repetition.

Figure 32:
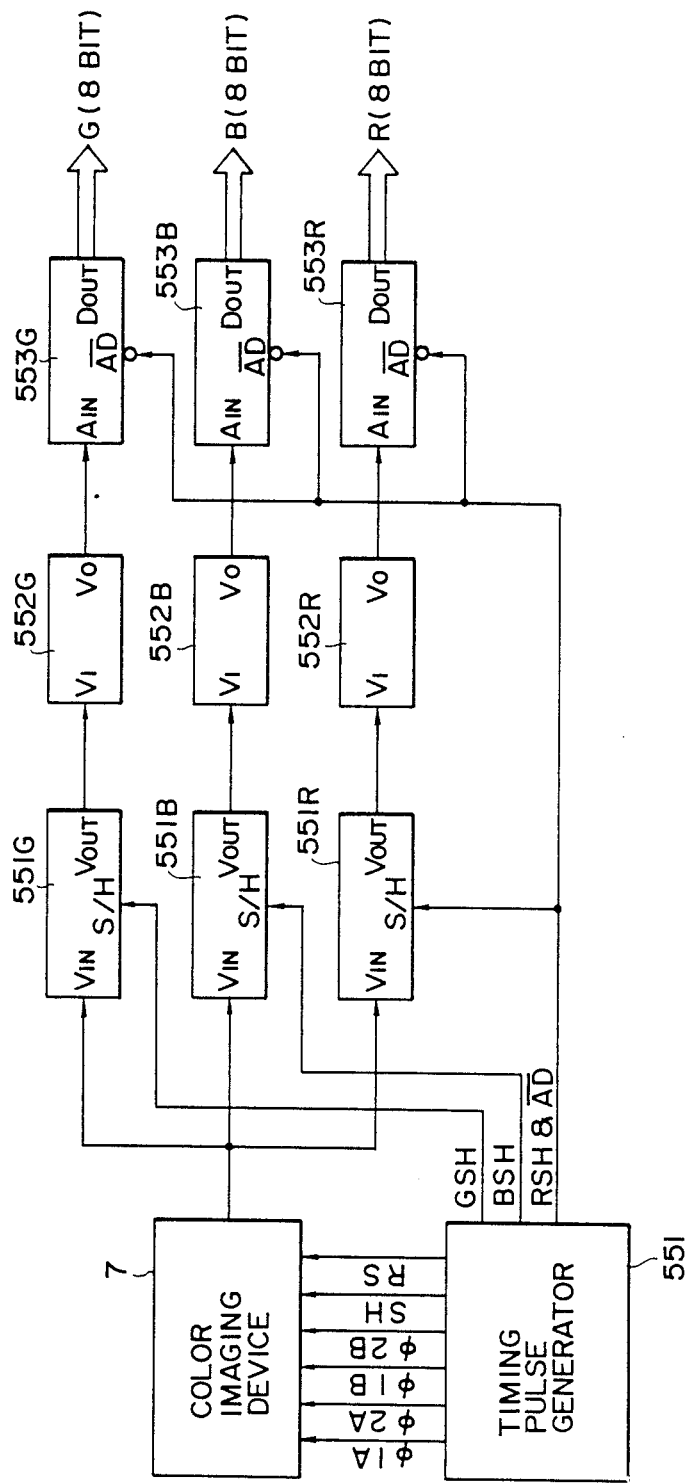
FIG. 32 is a block diagram showing a still further embodiment of the present invention.
Figure 33:
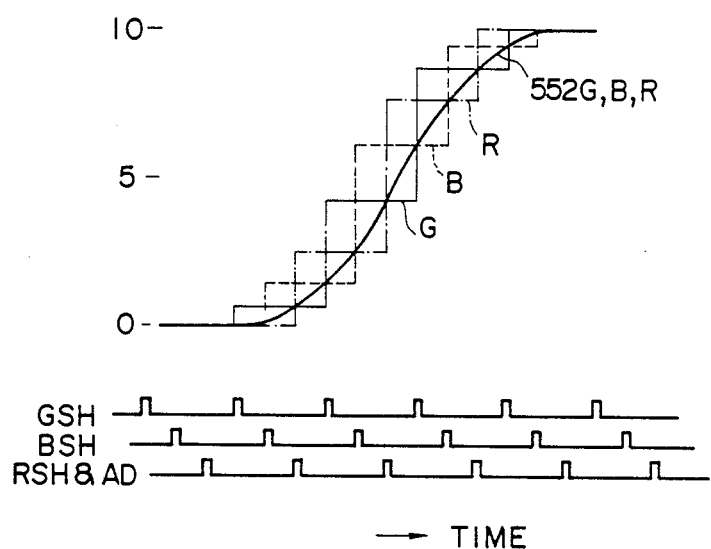
FIG. 33 is a schematic illustration showing various output waveforms obtained from the color image sensor 7.

FIG. 32 shows in block form an image processing circuit constructed in accordance with a still further embodiment of the present invention. Reference should be made to the timing chart shown in FIG. 23 for understanding the operation of the structure shown in FIG. 32. When the CCD 7 is driven at the timing shown in FIG. 23, there is obtained an output, such as G, B, R, G, ..., R, in sequence from the OS terminal. As described before, when the light image formed on the CCD 7 as shown in FIG. 20 is read, there is obtained an output as indicated in table 2. If this is represented along a time axis as shown in FIG. 33, an output for each color of G, B and R of the CCD 7, which is substantially equal to an output from each of the sample and hold circuits 551G, 551B and 551R, becomes a step-shaped waveform. If this waveform is passed through the corresponding one of functionally equivalent low pass filters 572G, 572B and 572R, these three outputs become substantially the same waveform and superimposed on top of each other. Thus, if these outputs are processed by A/D converters 573G, 573B and 573R at the same time, there are obtained substantially the same values for G, B and R. That is, the color balance distortion of up to 37% without correction has been removed almost completely, so that there are obtained data without color balance distortion. It is to be noted that, in the embodiment shown in FIG. 32, A/D conversion is carried out in synchronism with the falling edge of the RSH&AD signal; however, it may be carried out any other timing as long as it is the same time period as that of GSH (or BSH or RSH).

While the above provides a full and complete disclosure of the preferred embodiment of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A color image processing method using an image sensor including a plurality of photoelectric elements arranged in the form of an array and a plurality of filters, each of which is provided for the corresponding one of said plurality of photoelectric elements, said plurality of filters including at least two different kinds of first and second color-separating filters arranged in a predetermined pattern, said method comprising the steps of:
   obtaining a first color output from a first photoelectric element having said first color-separating filter for a pixel of interest of an original; and
   obtaining a second color output from each of a pair of second photoelectric elements, each having said second color-separating filter, located on opposite sides of said first photoelectric element with respect to a scanning direction; and
   processing said color outputs in a predetermined manner with respect to a positional relationship between said first and second photoelectric elements, thereby providing a processed second color output for said pixel of interest, thereby providing first and second color outputs for said same pixel of interest, and
   wherein coefficients to be multiplied to said second color output depending on the positional relationship between said first and second photoelectric elements are previously determined and these coefficients are stored in a memory.

2. The method of claim 1 wherein said image sensor receives light image information from an original through an optical system, whereby a gray distribution is created at a boundary between black and white areas of the original when focused on said image sensor, said gray distribution being approximated by a linear distribution with respect to a positional relationship between said first and second photoelectric elements.

3. A color image processing system, comprising:
   an image sensor including a plurality of photoelectric elements arranged in the form of an array and a plurality of filters, each of which is provided for the corresponding one of said plurality of photoelectric elements, said plurality of filters including at least two different kinds of first and second color-separating filters arranged in a predetermined pattern, said image sensor supplying an output from each of said plurality of photoelectric elements in a predetermined sequence;
   at least a pair of first and second low pass filters of substantially the same performance, said first low pass filter filtering an output from each of said photoelectric elements having said first color-separating filter one at a time and said second low pass filter filtering an output from each of said photoelectric elements having said second color-separating filter one at a time;
   at least a pair of first and second A/D converters which receive filtered signals from said first and second low pass filters, respectively, for converting said filtered signals into respective digital signals; and
   control means for controlling the operation of each of said image sensor, low pass filters and A/D converters, said control means controlling said A/D converters to carry out A/D conversion operations at the same time.

* * * * *